United States Patent

Sakata et al.

[11] Patent Number: 6,146,451
[45] Date of Patent: Nov. 14, 2000

[54] AIR-CLEANING FILTER, METHOD OF PRODUCING THE SAME, AND HIGH-LEVEL CLEANING DEVICE

[75] Inventors: Soichiro Sakata; Hideto Takahashi; Katsumi Sato, all of Kanagawa-ken, Japan

[73] Assignee: Takasago Thermal Engineering Co., Tokyo, Japan

[21] Appl. No.: 09/242,867

[22] PCT Filed: Jul. 3, 1998

[86] PCT No.: PCT/JP98/02999

§ 371 Date: May 12, 1999

§ 102(e) Date: May 12, 1999

[87] PCT Pub. No.: WO99/01201

PCT Pub. Date: Jan. 14, 1999

[30] Foreign Application Priority Data

| Jul. 3, 1997 | [JP] | Japan | 9-195157 |
| Jun. 19, 1998 | [JP] | Japan | 10-172690 |
| Jun. 30, 1998 | [JP] | Japan | 10-184338 |

[51] Int. Cl.[7] .................................................. B01D 53/04
[52] U.S. Cl. ........................... 96/135; 96/154; 55/385.2; 55/524; 55/DIG. 5
[58] Field of Search .................... 55/385.1, 385.2, 55/514, 516, 524, DIG. 5; 96/135, 153, 154

[56] References Cited

U.S. PATENT DOCUMENTS

| 2,038,071 | 4/1936 | Wilhelm | 96/153 X |
| 4,549,472 | 10/1985 | Endo et al. | 55/385.2 X |
| 4,992,084 | 2/1991 | Von Blücher et al. | 96/135 X |
| 5,194,414 | 3/1993 | Kuma | 96/153 X |
| 5,262,129 | 11/1993 | Terada et al. | 55/524 X |
| 5,435,958 | 7/1995 | Dinnage et al. | 55/524 X |
| 5,772,738 | 6/1998 | Muraoka | 96/135 X |
| 6,024,782 | 2/2000 | Freund et al. | 55/524 X |
| 6,033,301 | 3/2000 | Suwa | 55/385.2 X |

FOREIGN PATENT DOCUMENTS

| 2152829 | 4/1973 | France . | |
| 2241340 | 3/1973 | Germany . | |
| 48-37363 | 6/1973 | Japan . | |
| 57-056019 | 4/1982 | Japan | 96/153 |
| 58-146422 | 9/1983 | Japan . | |
| 59-183806 | 10/1984 | Japan . | |
| 61-103518 | 5/1986 | Japan . | |
| 5-023529 | 2/1993 | Japan | 96/154 |
| 9187493 | 7/1997 | Japan . | |
| 556170 | 11/1974 | Switzerland . | |
| 1399214 | 6/1975 | United Kingdom . | |

OTHER PUBLICATIONS

Takahashi, N., et al. Synthesis of Fraipontite, pp. 370–375. The Chemical Society of Japan, 1990.

Takahashi, N., et al. Structure of Synthetic Fraipointite, pp. 962–967. The Chemical Society of Japan, 1991.

Kinkead, D., et al. Forecast of Airborne Molecular Contamination Limits for the 0.25 Micro High Performance Logic Process Sematech, May 31, 1995.

*Primary Examiner*—Robert H. Spitzer
*Attorney, Agent, or Firm*—Patterson, Belknap, Webb & Tyler

[57] ABSTRACT

An air filter, a method for manufacturing the same, and also a high efficiency air cleaning apparatus employing the same are disclosed. The air filter includes a supporter and an inorganic material layer that is formed by fixing the powder of the fraipontite mineral to the surface of the supporter, using the powder of an inorganic substance as a binder. The method for manufacturing the filter includes the steps of immersing a supporter in a suspension in which the powder of the fraipontite mineral and the powder of an inorganic substance as a binder are dispersed as the suspensoid, and drying the supporter impregnated with the suspensoid, thereby forming an inorganic material layer fixed to the surface of the supporter. The fraipontite mineral adsorbs and removes gaseous acid or basic impurities in the air while the inorganic substance as a component of the inorganic material layer works as an adsorbent against gaseous organic impurities contained in the space of the air cleaning apparatus.

21 Claims, 29 Drawing Sheets

Fraipontite Mineral

◯ Inorganic Binder Particulate

AIR-CLEANING FILTER, METHOD OF PRODUCING THE SAME, AND HIGH-LEVEL CLEANING DEVICE

FIELD OF THE INVENTION

The present invention relates to an air filter capable of being installed in a high efficiency air cleaning apparatus, an air cleaning device or the like such as a clean room, a clean bench, a storage means (stocker) for half-finished products, etc., for removing gaseous inorganic and/or organic impurities contained in the limited space that is defined by the high efficiency air cleaning apparatus, the device or the like. The invention also relates to a method for manufacturing the air filter and also relates to the high efficiency air cleaning apparatus, the device or the like provided with the filter manufactured according to the method.

In the following description, the expression "air cleaning apparatus," and "device" seem to be too general, so that it would be described in terms of "clean room," "clean bench," "storage means (stocker)" or others having the function similar thereto, without altering the gist and scope of the invention, for more practical and better understanding of the invention.

BACKGROUND OF THE INVENTION

Today, the clean room, the clean bench, and the like are widely used for manufacturing a large scale integrated (LSI) circuit, a liquid crystal display (LCD) panel and so forth, all of which have to be carefully protected from specific impurities or contaminants contained in the ordinary air. In case of manufacturing products like these items, however, it is not rare that they are forced to be kept inside a carrier or a stocker in the form of a half-finished product after having passed through predetermined manufacturing steps. Consequently, they come to exposed to the inside atmosphere of the carrier or stocker until they are transferred to the next manufacturing step. Furthermore, it is also not rare that this intermediate storage or waiting state is continued over a period of several to several tens hours. Consequently, should the atmosphere of the clean room or the like be insufficiently cleaned, gaseous impurities contained therein would be deposited on the semiconductor substrate surface of LSI or glass substrate surface of LCD. Acid substances, alkaline substances, organic substances, and various dopants are considered as impurities that would give an ill influence to the performance of LSI or LCD when they are deposited on the substrate surface thereof. Especially, sulfur oxides SOx among acid substances reacts with ammonia gas contained, if any, in the clean room atmosphere to unfavorably form a thin cloudy matter consisting of ammonium sulfate over the surface of a silicon wafer, a glass substrate, a lens, a mirror, a hard disk, a magnetic disk, and so forth. Thus, this would give the ill influence to the manufacture of semiconductor elements, LCD substrates, and magnetic memory parts. The most popular sulfurous acid gas representing sulfur oxides may be generated from various sources. For instance, it may be generated from sulfuric acid that is used in the rinsing process carried out inside the clean room, and also it might be contained as an atmospheric pollutant or volcanic gas in the outdoor air introduced to the clean room. Boron B also may act as a contaminant against thin film transistors (TFT), and it contaminates the channel region of TFT to make the characteristic thereof worse.

According to one example of the actual measurement of various contaminants contained in the atmosphere of the ordinary clean room that is not provided with any chemical protective measure against gaseous contaminants, it is reported that there are contained in such atmosphere acid substances of about 100 ppt–1,000 ppt, basic substances of about 1,000 ppt–10,000 ppt, organic substances of about 1,000 ppt–10,000 ppt, and dopants of about 10 ppt–100 ppt, respectively.

According to the allowable concentration (ppt) of the chemical contaminant required for $0.25\mu$ process (after '98), which is disclosed in the article entitled "Forecast Of Airborne Molecular Contamination Limits For The 0.25 Micron High Performance Logic Process" of Technology Transfer #95052812A-TR published by SEMATECH (U.S.A.) on May 31, 1995, severe limitations are imposed on the concentration of various chemical contaminants. That is, with regard to acid substances, they should be limited to less than 180 ppt in the salicidation process, and less than 5 ppt in the contact formation process. As for basic substances, they should be limited to less than 1 ppb in the photolithographic process. With respect to the dopant, it should be limited to less than 0.1 ppt for the pre-gate oxidation process. As to organic substances, they should be limited to less than 1 ppb in the pre-gate oxidation process, and less than 2 ppb in the contact formation process.

Among these four chemical contaminants, almost all of acid substances, basic substances and dopants are water-soluble, so that they can be removed by means of the wet type rinsing (scrubber) or by means of chemical adsorption using a chemical filter that is formed of ion-exchange fiber or activated charcoal, to the surface of which a selected chemical is impregnated (referred to as "chemical impregnated activated charcoal" hereinafter). A cylindrical case filled up with chemical impregnated activated charcoal is well known as the most simple configuration of a chemical filter using chemical impregnated activated charcoal. Activated charcoal impregnated with potassium permanganate solution has been used as the filter media of a chemical filter for removing sulfur oxides SOx. Chemical filters of other types are available. For instance, some chemical filters are made in the form of a felt or a nonwoven fabric that is formed by interweaving chemical impregnated fibrous activated charcoal with the polyester fiber, using an organic binder, and the others are formed in the shape of a block or a sheet by binding chemical impregnated activated charcoal powder to an air permeable urethane foam or a nonwoven fabric with a proper adhesive. The chemical filter using chemical impregnated activated charcoal is disclosed in the Japanese unexamined patent publication No. 61-103518, which is incorporated by reference herein. This filter uses the acid cation exchange fiber and the basic anion exchange fiber as its basic filter media, and is made in the form of a nonwoven fabric, a sheet, or a felt. Various acid and basic ions can be ion-exchanged and removed with this filter.

On one hand, organic substances are generally insoluble in water, so that they may be basically removed by means of the physical adsorption function of activated charcoal.

In case of the wet type air rinsing system, an atomizer will require a rather larger initial cost for installation thereof and also require a considerable running cost for generating a high pressure spray, which can not be ignored. Also, it should be noted that this system relates to the humidity and temperature control of the clean room air. Consequently, in case of circulating the air through the clean room, if it is rinsed by this system, it is additionally required to control the humidity and temperature of the circulating clean room air and to remove tiny water droplets contained therein immediately after being rinsed thereby. Furthermore, the rinsing water has to be always kept clean and free from any of bacteria, water soluble contaminants, and so forth, so that it is required, for instance, to additionally arrange other facilities for preventing bacteria from being generated and/ or for condensing and separating water soluble contaminants.

In view of disaster prevention standpoint, however, it is not preferable, should rather be avoided, to install the chemical filter that uses chemical impregnated activated charcoal or ion exchange fiber, on the ceiling portion of the clean room, because they are inflammable. The prior art chemical filter generally includes, as its components, a nonwoven fabric, an organic binder for fixing activated charcoal to a sheet of filter media, a sealing member, and so forth. However, these components are apt to desorb gaseous organic impurities, which are readily mixed with the air once cleaned by passing through the chemical filter, and would never fail to give a wrong influence to the manufacture of semiconductor devices. Dusts flying away from the filter media are also one of wrong factors causing the product contamination. If a plurality of processes which might cause various gaseous inorganic impurities, are executed in one clean room, the chemical filter is naturally required to have an excellent filtering performance against such gaseous inorganic impurities. At the same time, it is strictly required that the chemical filter never desorbs any of gaseous organic impurities by itself. In general, in order to block dusts which might fly away from the chemical filter, a particulate air filter is installed on the downstream side of the chemical filter. However, if such particulate air filter desorbs some gaseous organic impurities by itself, the function of the chemical filter would be in vain even though it is so excellent. Furthermore, the prior art chemical filter including basic chemicals and metals fails to remove sulfurous acid gas sufficiently.

In case of the chemical filter using the ion exchange fiber, gaseous organic substances might be desorbed from various additive agents included in the polymer fiber forming the ion exchange fiber. In this case, it sometimes takes place that a part of the ion exchange group is desorbed as sulfonic acid gas, carboxylic acid gas, phosphoric acid gas, ammonia gas, or amine gas.

Furthermore, in case of filtering the clean room air including both of acid and basic inorganic impurities by means of the prior art chemical filter that uses chemical impregnated activated charcoal or ion exchange fiber, it is required to separately prepare both of an adsorptive media for removing acid inorganic impurities and an adsorptive media for removing basic inorganic impurities.

Accordingly, an object of the invention is to provide an air filter that is excellent from the standpoint of disaster prevention, and is capable of removing both of organic and inorganic impurities contained in the object air, and desorbs neither gaseous inorganic impurities nor gaseous organic impurities by itself. Furthermore, the other object of the invention is to provide a method for manufacturing such filters and a high efficiency clean room or the like installed with such filters as manufactured according to the above method.

Another object of the invention is to provide an air filter that is able to work for a long time and efficiently remove sulfurous acid gas which could not be sufficiently removed by the prior art chemical filter.

SUMMARY OF THE INVENTION

According to the invention, there is provided an air filter including a supporter and an inorganic material layer that is formed by fixing the powder of the fraipontite mineral to the surface of the supporter, using the powder of an inorganic substance as a binder.

Furthermore, according to the invention, there is provided an air filter including a supporter, a first inorganic material layer formed of the powder of the fraipontite mineral and the powder of an inorganic substance as a binder, and a second inorganic material layer formed of the powder of an inorganic substance, wherein either the first inorganic material layer or the second inorganic material layer is directly fixed to the surface of the supporter, and the remaining inorganic material layer is additionally fixed to the surface of the first fixed inorganic material layer.

Further, according to the invention, there is provided an air filter including a supporter and a layer formed of a plurality of pellets fixed to the surface of the supporter, wherein the pellet is formed by pelletizing a mixture of the powder of the fraipontite mineral and the powder of an inorganic substance as a binder.

Still further, according to the invention, there is provided an air filter including a supporter and a layer formed of a plurality of pellets fixed to the surface of the supporter, wherein the pellet is first formed by pelletizing a mixture of the powder of the fraipontite mineral and the powder of an inorganic substance as a binder and is then coated with the powder of an inorganic substance, or the pellet is first formed by pelletizing the powder of an inorganic substance and is then coated with the powder of the fraipontite mineral, using the powder of an inorganic substance as a binder.

Still further, according to the invention, there is provided an air filter including a casing filled up with a plurality of pellets, wherein the pellet is formed by pelletizing the powder of the fraipontite mineral, using the powder of an inorganic substance as a binder, or the pellet is first formed by pelletizing the powder of the fraipontite mineral, using the powder of an inorganic substance as a binder and is then coated with the powder of an inorganic substance, or the pellet is first formed by pelletizing the powder of an inorganic substance and is then coated with the powder of the fraipontite mineral, using the powder of an inorganic substance as a binder.

Still further, according to the invention, there is provided an air filter including a supporter and an inorganic material layer that is formed by fixing a mixture to the surface of the supporter, using an inorganic substance as a binder, the mixture consisting of the powder of the fraipontite mineral and the powder of manganese oxide and/or permanganate.

Still further, according to the invention, there is provided an air filter including a supporter, a first inorganic material layer formed of the powder of the fraipontite mineral and an inorganic substance as a binder, and a second inorganic material layer formed of the powder of manganese oxide and/or permanganate and the powder of an inorganic substance as a binder, wherein either the first inorganic material layer or the second inorganic material layer is directly fixed to the surface of the supporter, and the remaining inorganic material layer is additionally fixed to the surface of the first fixed inorganic material layer.

Still further, according to the invention, there is provided an air filter including a supporter and a layer formed of a plurality of pellets fixed to the surface of the supporter, wherein the pellet is formed by pelletizing a mixture of the powder of the fraipontite mineral and the powder of manganese oxide and/or permanganate, using the powder of an inorganic substance as a binder.

Still further, according to the invention, there is provided an air filter including a supporter and a layer formed of a plurality of pellets fixed to the surface of the supporter, wherein the pellet is first formed by pelletizing the powder of the fraipontite mineral, using the powder of an inorganic substance as a binder and is then coated with the powder of manganese oxide and/or permanganate, using the powder of an inorganic substance as a binder, or the pellet is first formed by pelletizing the powder of manganese oxide and/or permanganate, using the powder of an inorganic substance as a binder, and is then coated with the powder of the fraipontite mineral, using the powder of an inorganic substance as a binder.

Still further, according to the invention, there is provided an air filter including a casing filled up with a plurality of pellets, wherein the pellet is first formed by pelletizing a mixture of the powder of the fraipontite mineral and the powder of manganese oxide and/or permanganate, using the powder of an inorganic substance as a binder, or the pellet is first formed by pelletizing the powder of the fraipontite mineral, using the powder of an inorganic substance as a binder and is then coated with the powder of manganese oxide/permanganate, using an inorganic substance as a binder, or the pellet is first formed by pelletizing the powder of manganese oxide and/or permanganate, using an inorganic substance as a binder and is then coated with the powder of the fraipontite mineral, using the powder of an inorganic substance as a binder.

The fraipontite mineral is aluminosilicate belonging to a 1:1 type layer clay mineral of serpentine subgroup and its composition is expressed by the following formulas (I) and (2). As shown in FIG. 1, the fraipontite mineral is a crystal having a double structure, of which one side exhibits solid basic properties while the other side has solid acid properties. These solid basic and acid sides respectively act as the adsorption site for acid and basic substances. According to the report by N. Takahashi, M. Tanaka and T. Sato, entitled "Structure of Synthetic Fraipontite" (The Chemical Society of Japan, 1991, No. 7, pp. 962–967), a single layer of the fraipontite mineral has a thickness of 7.1 angstroms.

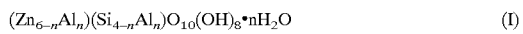
$(Zn_{6-n}Al_n)(Si_{4-n}Al_n)O_{10}(OH)_8 \cdot nH_2O$ (I)

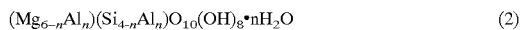
$(Mg_{6-n}Al_n)(Si_{4-n}Al_n)O_{10}(OH)_8 \cdot nH_2O$ (2)

In case of using solely or in combination the powder of the fraipontite mineral, the powder of an inorganic substance as a binder, and the powder of manganese oxide and/or permanganate in order to form the above-mentioned inorganic material layer or pellet layer for use in the filter according to the invention, adjacent powder particles make gaps or air permeable pores therebetween. When the object gas passes through the filter, it comes in and comes out such gaps or air permeable pores. While the object gas passes through the filter, the fraipontite mineral contained in the inorganic material layer acts on the object gas, thereby adsorbing and removing gaseous acid and/or basic impurities contained in the object gas. When the powder of manganese oxide and/or permanganate is contained in the inorganic material layer, it will act on and remove sulfur oxides SOx which is harmful for manufacture of semiconductor devices, magnetic disks, and so forth, even though contained in the object gas. For instance, sulfuric acid used in the rinsing process inside the clean room, atmospheric pollutants and volcanic gas contained in the outdoor air introduced into the clean room and so on will serve as a potential source of sulfurous acid gas, which reacts with ammonia gas in the atmosphere as mentioned above and gives the wrong influence to the manufacture of semiconductor devices, LCD substrates, magnetic recording parts, and so forth.

An inorganic substance used as a binder for forming the first or second inorganic material layers may be the same as or different from the inorganic substance for forming the second or first inorganic material layer. For instance, if the inorganic substance used as a binder for forming the first inorganic material is the clay mineral such as talc, kaolin mineral, bentonite, etc., the inorganic material layer for forming the second inorganic material may be selected from such clay mineral. On one hand, if the inorganic substance such as silica or the like having the strong affinity for the boric compound is included in both of the first and second inorganic material layers, the total quantity of silica or the like is naturally increased, so that the change with the passage of time with regard to the protection efficiency against the boric compound is naturally made smaller, thus making it possible to effectively remove the boric compound over a long period of time. In order to prevent the fraipontite mineral from its exfoliating and acting as a dust source, if the inorganic material layer that is directly fixed to the supporter surface of the filter i.e. the first inorganic material layer is formed including the powder of the fraipontite mineral, the outermost surface of it is preferably covered by another inorganic material layer i.e. the second inorganic material layer that is formed of, for instance, the powder of an inorganic substance or a mixture of the powder of an inorganic substance and the powder of manganese oxide and/or permanganate. In case of the pellet, if it is formed including the powder of the fraipontite mineral, it is preferable to coat its outermost surface in the same way as taken in respect of the inorganic material layer. Especially, in case of forming the outermost layer or coat layer including silica gel, the most effective protection may be achieved against the dust that is caused by exfoliation of the fraipontite mineral.

Gaseous acid and/or basic impurities in the clean room air can be adsorbed and removed by means of the fraipontite mineral. On the other hand, gaseous organic impurities such as DOP, DBP, siloxane and so forth, which contaminate the surface of the substrate, can be adsorbed and removed by properly selecting an inorganic substance as a binder, which includes micropores and/or mesopores. Accordingly, the filter according to the invention is applicable to even the atmosphere including various chemical contaminants which cause the surface contamination of the substrate, and may capture almost all of such.

In case of making use of the fraipontite mineral for removing gaseous acid and/or basic impurities contained in the atmosphere, as shown in FIG. 2, a single layer or stacked several layers of the fraipontite mineral are preferably arranged in random around an inorganic binder particulate without overlapping with each other, such that the object air to be cleaned may come in contact with the adsorption site that exists on the surface of the single layer or stacked several layers of the fraipontite mineral. The object air may come in contact with the fraipontite mineral directly or through the inorganic material layer, which is formed of the inorganic substance such as manganese oxide, permanganate, or the like, and includes such air permeable gaps or pores that the object air can pass therethrough. Accordingly, the single layer or stacked several layers of the fraipontite mineral have to be evenly distributed inside a porous structure (i.e. inorganic material layer of the invention) such that the object air entering and coming out of this porous structure may come in contact with the adsorption site existing on the surface of the microcrystal (shape: circular, thickness: several tens angstroms, diameter: 100 angstroms to 1 micrometer) of the fraipontite mineral, thereby removing gaseous acid and/or basic impurities.

The microcrystal of the fraipontite mineral includes neither micropore nor mesopore capable of physically adsorbing gaseous organic impurities, thus it having no capability to adsorb and remove gaseous organic impurities.

It is preferable that the supporter for use in the filter according to the invention is made in the form of a honeycomb structure. It is also preferable that the honeycomb structure is formed of inorganic fiber as the indispensable requirement therefor. Furthermore, if the supporter is made of ceramics, it will be provided with a strong and hard surface, which is preferable from the standpoint of installation and maintenance of the filter. The term "honeycomb structure" as used herein stands for not only a structure with the shape of a honeycomb but also any structure including a plurality of cells the air can flow therethrough, for instance a structure having a grid shape in section, a structure formed of a plurality of corrugated sheets and flat sheets which are stacked alternately, and so on. Furthermore, the term "supporter" is not limited to the honeycomb structure but may be a three dimensional mesh structure like rock wool. In this case, the powder of the fraipontite mineral is preferably fixed not only to the surface of the mesh structure but also to the inside thereof.

Manganese oxide as used in the filter according the invention, may preferably be any one selected from tri-manganese tetraoxide ($Mn_3O_4$), di-manganese trioxide ($Mn_2O_3$), and manganese dioxide ($MnO_2$). For instance, the most popular sulfurous acid gas representing the sulfur oxides is hardly neutralized with zinc or magnesium in the fraipontite mineral, if it is left as it is. If, however, sulfurous acid gas is oxidized by manganese oxides, sulfurous acid gas is transformed into sulfuric acid, which in turn, easily reacts with zinc or magnesium contained in the fraipontite mineral, thus being neutralized and removed. The oxidizing strength of manganese monoxide is not so large, so that it would not be expected that sulfurous acid gas is sufficiently removed with use of it.

In the next, how manganese dioxide $MnO_2$ removes sulfurous acid gas $SO_2$ will be explained in the following. At first, sulfurous acid gas in the air dissolves in moisture adsorbed by pores of the honeycomb structure according to the following formula.

$$SO_2+H_2O \rightarrow \leftarrow H_2SO_3$$

Then, sulfurous acid is immediately oxidized based on the synergistic effect between the reduction process by sulfurous acid and the oxidation process by manganese dioxide, thereby being transformed into sulfuric acid according to the next formula.

$$H_2SO_3+2MnO_2 \rightarrow H_2SO_4+Mn_2O_3$$

Sulfuric acid can be also produced by other manganese oxides than manganese dioxide $MnO_2$ according to the following reaction.

$$H_2SO_3+Mn_3O_4 (\text{tri-manganese tetraoxide}) \rightarrow H_2SO_4+3MnO$$

$$H_2SO_3+Mn_2O_3 (\text{di-manganese trioxide}) \rightarrow H_2SO_4+2MnO$$

Manganese oxides may transform sulfurous acid into sulfuric acid not only by its oxidizing function but also by its catalytic action. When manganese oxides act as a catalyst, its oxidation number is kept unchanged.

In the next, sulfuric acid as produced above, further reacts with zinc contained in the fraipontite mineral to produce zinc sulfate according to the following formula.

$$Zn+H_2SO_4 \rightarrow ZnSO_4+H_2\uparrow$$

The above chemical reaction formulas regarding manganese dioxide can be arranged as follows.

$$SO_2+H_2O+2MnO_2+Zn \rightarrow ZnSO_4+Mn_2O_3+H_2\uparrow$$

As mentioned above, sulfurous acid gas reacts with zinc and is removed producing a salt, thereby an environment suitable for manufacturing high precision electronic parts or the like being prepared. Since manganese dioxide is substantially insoluble in water, it is preferably prepared in the form of the bulk particulate so as to have a diameter of several microns.

During the above chemical reaction, the transformation of $MnO_2 \rightarrow Mn_2O_3$ takes place. Thus, there is fear that $Mn_2O_3$ might cover the surface of the bulk particulate of $MnO_2$ and might prevent manganese dioxide from carrying out its oxidizing process, thereby its function of adsorbing sulfur oxides being weakened. However, di-manganese trioxide ($Mn_2O_3$) is soluble in the acid (sulfuric acid in this case), so that the fresh surface of manganese dioxide can be always provided by the above-mentioned action of sulfuric acid. This process can take place when tri-manganese tetraoxide ($Mn_3O_4$) or di-manganese trioxide ($Mn_2O_3$) is used in place of manganese dioxide ($MnO_2$), so that the above fear is eliminated.

Permanganate used in the filter according to the invention, may preferably be either $M^I MnO_4$ ($M^I$: alkali metal) or $M^{II}(MnO_4)_2$ ($M^{II}$: alkaline earth metal). Sulfurous acid is immediately oxidized with the synergistic effect between the oxidation process by permanganate and the reduction process by sulfurous acid and is transformed into sulfuric acid, which, in turn, causes the neutralizing reaction with zinc or magnesium contained in the fraipontite mineral, thereby removing sulfurous acid gas in the same as described above in connection with manganese oxides.

The inorganic substance used in the filter according to the invention, may preferably be the one selected from talc, kaolin mineral, bentonite, diatom earth, silica, alumina, mixture of silica and alumina, aluminum silicate, activated alumina, porous glass, hydrated magnesium silicate clay mineral having a crystal structure of the ribbon type, activated clay, and activated bentonite. These inorganic substances can be advantageously used for adsorbing and removing gaseous organic impurities. The powder of the fraipontite mineral has no self-bonding property, so that a certain binder has to be additionally used, if it is pelletized or fixed to the surface of the supporter to form a layer thereon. The above-mentioned silica may be replaced by silica gel, while alumina may be replaced by alumina gel. Similarly, the mixture of silica and alumina may be replaced by the mixed gel consisting of silica gel and alumina gel.

The inorganic substance preferably has the pore volume of 0.2 cc/g or more, and the specific surface area of 100 m²/g or more, respectively, in its pore diameter range of 15 to 300 angstroms. If inorganic substance selected as such is used as a binder for the inorganic material layer or the pellet formed of the powder of the fraipontite mineral, the inorganic substance serves as a kind of an adhesive for mechanically fixing the powder of the fraipontite mineral to the surface of the supporter, or as a bonding agent for pelletizing the powder of the fraipontite mineral. Furthermore, such inorganic substance may provide a porous structure, through which the object gas to be cleaned can reach acid and/or basic points that exist on the surface of the crystal layer of the fraipontite mineral.

The specific surface area and the total volume of the pore of which the diameter is in range of 15 to 300 angstroms, are measured with regard to various inorganic substances capable of being used as a binder, by means of the BET method and the nitrogen gas adsorption method, respectively. Table 1 shows the measurement result thereof.

TABLE 1

| Powder Sample | Specific Area (m²/g) by BET Method | Pore Volume (cc/g) by N₂ Adsorption Pore size: 15–300 angstrom | |
|---|---|---|---|
| diatom earth | 200 | 0.25 | Group (I) |
| silica gel | 400 | 0.61 | |
| alumina gel | 250 | 0.60 | |
| aluminum silicate | 225 | 0.60 | |
| activated alumina | 300 | 0.30 | |
| porous glass | 400 | 0.15 | |
| sepiolite | 295 | 0.33 | |
| activated clay | 300 | 0.37 | |
| activated bentonit | 87 | 0.23 | |
| talc | 28 | 0.07 | Group (II) |
| kaolin mineral | 21 | 0.06 | |
| bentonite | 23 | 0.03 | |

In the above measurement, silica gel is used as the powder sample on behalf of silica, and alumina gel is used as the powder sample in place of alumina. Similarly, the mixture of silica gel and alumina gel is used as the powder sample in place of the mixture of silica and alumina. The reason why the measurement is carried out with regard to the pore in its pore diameter range of 15 to 300 angstroms, is that the pore in this range functions well as a physical adsorbent against gaseous organic impurities. A number of gaps or air permeable pores are formed between the adjacent powder of the fraipontite mineral, and also between the adjacent powder of the inorganic substance as a binder, and further between the powder of the fraipontite mineral and the powder of the inorganic substance as a binder. The object air to be cleaned may flow through these gaps or air permeable pores and reach the adsorption site existing on the surface of the microcrystal of the fraipontite mineral, where gaseous acid impurities as well as gaseous basic impurities contained therein are adsorbed and removed. During this process, the object air comes to encounter a countless number of pores which exist on the powder surface of the inorganic substance used as a binder and have a pore diameter in the above-mentioned range, thereby gaseous organic impurities contained in the object air being adsorbed and removed. Accordingly, besides the removal of both gaseous acid and basic impurities, which is one of the main purposes of the invention, the removal of gaseous organic impurities can be secondarily achieved by properly selecting the pore of the powder of the inorganic substance used as a binder, and employing the inorganic substance belonging to the group (I) as shown in Table 1.

It will be understood from Table 1 that the specific surface area and the pore volume of the inorganic binder belonging to the group (I) are considerably larger than those of the inorganic binder belonging to the group (II). Therefore, the inorganic binder of the group (I) is superior to those of the group (II) in respect of the physical adsorption function against gaseous inorganic impurities. The inorganic binders of the group (II), for instance talc, kaolin mineral, and bentonite are selected and used primarily taking account of air permeability of the porous structure (e.g. inorganic material layer) constructed therewith. Most of air permeable pores that are formed between adjacent binder particulates and also between the binder particulate and the adsorbent particulate, have a size of about 500 angstroms or more. In other words, such air permeable pore is in the macropore range and less contributes to the physical. Furthermore, the particulate surface of the inorganic binder such as talc, kaolin mineral, and bentonite, includes few pores capable of performing the physical adsorption of gaseous organic impurities. Consequently, the inorganic binder of the group (II) is primarily used for the purpose of mechanically holding the powder of the fraipontite mineral on the surface of the supporter. The quantity of the powder of the fraipontite mineral to be held on the supporter surface is preferably increased as much as possible in order to sufficiently remove gaseous inorganic impurities. On the other hand, the quantity ratio of the inorganic binder to the powder of the fraipontite mineral is preferably made as less as possible. However, if the quantity of the inorganic binder is reduced excessively, the powder of the fraipontite mineral is incompletely held on the supporter surface, which might cause the powder of the fraipontite mineral to peel off and make it act as a kind of a dust source. For instance, when forming the inorganic material layer by fixing the powder of the fraipontite mineral to the supporter surface, using bentonite as an inorganic binder along with silica as an inorganic adhesion assisting agent, if the weight ratio of the powder of the fraipontite to the entire inorganic material layer exceeds 75%, it is found that the mechanical strength for holding the inorganic material layer on the supporter surface is impracticably weakened. In short, the role of the inorganic binder of the group (II) is to firmly hold the inorganic material layer on the supporter surface and at the same time, to secure such excellent air permeability that the object gas can reach the powder surface of fraipontite mineral with ease, but is not required to physically adsorb gaseous organic impurities. In case of the inorganic binder of the group (I), the air permeable pores that are formed between adjacent binder particulates and also between the binder particulate and the adsorbent particulate, have a size similar to that of the air permeable pore formed with the inorganic binder of the group (II). Thus, the excellent air permeability is secured and the object gas can reach with ease the adsorption site existing on the microcrystal surface of the fraipontite mineral, so that removal of gaseous acid impurities and gaseous basic impurities is carried out without being disturbed or prevented by existence of the inorganic binder of the group (I).

The strength of the physical adsorption by the pore against gaseous molecules is increased in the order of macropore, mesopore, and micropore. It is said in general that the macropore hardly contributes to the physical adsorption. The particulate of the inorganic binder of the group (I) has on its surface the pore suitable for carrying out the physical adsorption against gaseous molecules, namely the micropore with the pore diameter of 20 angstroms or less, and the mesopore with the pore diameter in the range of 20 to 500 angstroms, so that gaseous organic impurities such as DOP, DBP, BHT, siloxsane which are unable to be removed by the powder of the fraipontite mineral and cause the surface contamination of the substrate, can be physically adsorbed and removed at the powder surface of the inorganic binder group (I).

Similar to the case of the inorganic binder of the group (I), the quantity (weight) of the powder of the fraipontite mineral has an upper limit value when forming the inorganic material layer along with the inorganic binder of the group (I). For instance, when forming the inorganic material layer by fixing the powder of the fraipontite mineral to the supporter surface, using silica gel as an inorganic binder, if the weight ratio of the powder of the fraipontite mineral to the entire inorganic material layer exceeds 72%, it is found that the mechanical strength for holding the inorganic material layer on the supporter surface is impracticably weakened. In the filter, if its supporter is coated with the inorganic material layer or the pellet layer including the powder of the inorganic binder of the group (I), gaseous organic impurities can be adsorbed and removed thereby. Therefore, even if the supporter includes a material that desorbs gaseous organic impurities, they can be adsorbed and removed by the inorganic material layer or the pellet layer covering the supporter, so that gaseous organic impurities are never mixed again with the once cleaned object air on the downstream side of the filter.

In the filter of the invention, either the first inorganic material layer or the second inorganic material layer may include an inorganic adhesion assisting agent. Also, either the core portion of the pellet or the coating layer thereof may include an inorganic adhesion assisting agent. The inorganic adhesion assisting agent is preferably the one selected from sodium silicate, silica, and alumina. In this case, silica sol may be used on behalf of silica and alumina sol may be used in place of alumina.

According to the invention, there is provided a method for manufacturing an air filter, which includes the steps of: immersing a supporter in a suspension in which the powder of the fraipontite mineral and the powder of an inorganic substance as a binder are dispersed as the suspensoid; and drying the supporter impregnated with the suspensoid, thereby forming an inorganic material layer fixed to the surface of the supporter.

Furthermore, according to the invention, there is provided a method for manufacturing an air filter, which includes the steps of: immersing a supporter in a suspension in which the powder of the fraipontite mineral and the powder of an inorganic substance as a binder are dispersed as the suspensoid; drying the supporter impregnated with the suspensoid, thereby forming the first inorganic material layer fixed to the surface of the supporter; immersing the supporter with the first inorganic material layer in a suspension in which the powder of an inorganic substance is dispersed as the suspensoid; and drying the supporter impregnated with the suspensoid, thereby forming the second inorganic material layer fixed to the surface of the first inorganic material layer; or forming the second inorganic material layer so as to be first fixed to the surface of the supporter; and forming the first inorganic material layer so as to be fixed to the surface of the second inorganic material.

Still further, according to the invention, there is provided a method for manufacturing an air filter, which includes the steps of: immersing a supporter in a suspension in which the powder of the fraipontite mineral, the powder of manganese oxide and/or permanganate and the powder of an inorganic substance as a binder are dispersed as the suspensoid; and drying the supporter impregnated with the suspensoid, thereby forming an inorganic material layer fixed to the surface of the supporter.

Still further, according to the invention, there is provided a method for manufacturing an air filter, which includes the steps of: immersing a supporter in a suspension in which the powder of the fraipontite mineral and the powder of an inorganic substance as a binder are dispersed as the suspensoid; drying the supporter impregnated with the suspensoid, thereby forming the first inorganic material layer fixed to the surface of the supporter; immersing the supporter with the first inorganic material layer in a suspension in which the powder of manganese oxide and/or permanganate and an inorganic substance as a binder are dispersed as the suspensoid; and drying the supporter impregnated with the suspensoid, thereby forming the second inorganic material layer fixed to the surface of the first inorganic material layer; or forming the second inorganic material layer so as to be first fixed to the surface of the supporter; and forming said first inorganic material layer so as to be fixed to the surface of the second inorganic material. In this method, any one of the inorganic substances classified into the group (I) is preferably included in either the first inorganic material layer or the second one.

According to this method, the filter may be constituted only with the material which desorbs none of gaseous organic impurities. Also, except the case that permanganate is used, the filter may be constituted substantially only with incombustible material.

According to the invention, there is provided a high efficiency air cleaning apparatus for keeping a specific space or room at a level of required cleanliness, which includes an air circulation path, the filter as described in the above, and a particulate filter, wherein the filter is properly installed on a portion of the space or room, and the particulate filter is arranged on the upstream side of the space or room and on the downstream side of said filter, whereby the space or room is cleaned by circulating the air therein through the air circulation path. According to this high efficiency air cleaning apparatus as described in claim 20, the particulate with a size of submicron order, gaseous acid impurities, and gaseous basic impurities, and also gaseous organic impurities, if any, which are contained in the air circulating through the space or room, can be adsorbed and removed, thereby enabling the surface of the substrate handled in the space or room to be prevented from such contaminants as mentioned above.

Furthermore, any combustible material such as activated charcoal, ion exchange fiber is not used in this high efficiency air cleaning apparatus, so that the apparatus is excellent from the disaster prevention standpoint of view except the case that permanganate is used. Therefore, the above-mentioned filter and the particulate filter may be safely installed on the ceiling portion of the space or room.

PREFERRED EMBODIMENTS OF THE INVENTION

The invention will now be described by way of examples and preferred embodiments in the following with reference to the accompanying drawings. In the following description, the term "filter" represents a filter for use in removal of gaseous impurities in the air. On one hand, a filter for use in removal of airborne dusts and particles in the air will be expressed in terms of "particulate filter."

Figure 3:
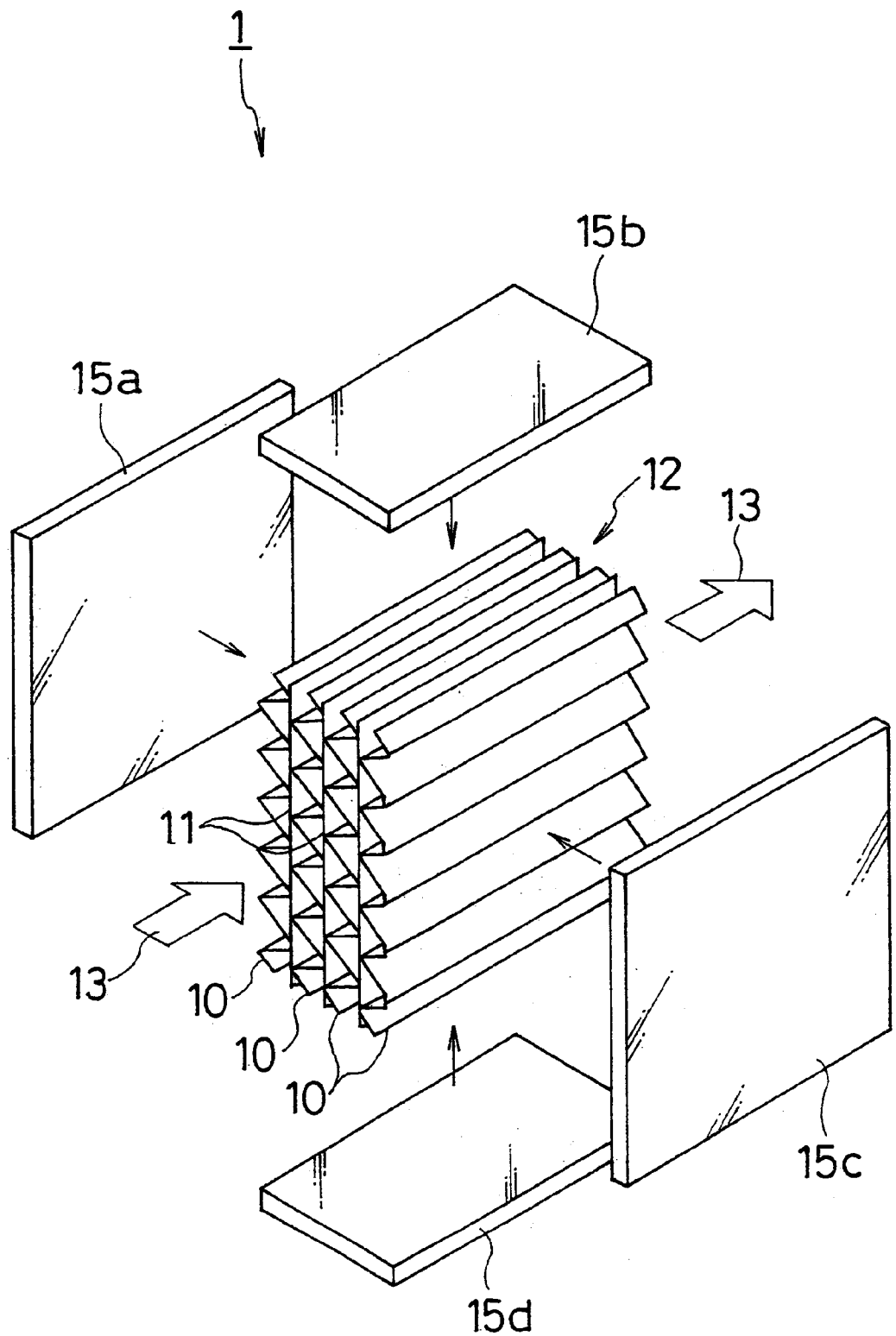
FIG. 3 is a schematic exploded view of a filter according to an embodiment of the invention.

FIG. 3 is a schematic exploded view of the filter 1 according to the invention. As shown, the filter 1 has a honeycomb structure (i.e. supporter of adsorbents) 12 that is formed by stacking a plurality of corrugated sheets 10 and thin flat sheets 11 in an alternate fashion. On one hand, frame members 15a, 15b, 15c, 15d made of aluminum are assembled into a box like external frame that opens in the flow direction of the object air to be filtered (as shown by arrows 13). The honeycomb structure 12 is then put into this external frame such that corrugated sheets 10 and thin flat sheets 11 are arranged roughly in parallel with the flow of the object air to be filtered. The outer shape and dimension of the filter 1 may be arbitrarily designed to meet the space available for installing thereof. The entire surface of the honeycomb structure 12 may optionally have one of the following layers. That is:

[1] An inorganic material layer that is formed by fixing the powder of the fraipontite mineral to the entire surface of the honeycomb structure 12, using the powder of an inorganic substance as a binder;

[2] An inorganic double layer including a first inorganic material layer that is formed by fixing the powder of the fraipontite mineral to the entire surface of the honeycomb structure 12, using the powder of an inorganic substance as a binder, and a second inorganic material layer that is formed by fixing the powder of an inorganic substance to the surface of the first inorganic material layer;

[3] An inorganic double layer including a first inorganic material layer that is formed by fixing the powder of an inorganic substance to the entire surface of the honeycomb structure 12, and a second inorganic material layer that is formed by fixing the powder of the fraipontite mineral to the surface of the first inorganic material layer, using the powder of an inorganic substance as a binder;

[4] A pellet layer that is formed by fixing pellets to the entire surface of the honeycomb structure 12, the pellet being formed by pelletizing the powder of the fraipontite mineral, using the powder of an inorganic substance as a binder;

[5] A pellet layer that is formed by fixing pellets to the entire surface of the honeycomb structure 12, the pellet being formed by pelletizing the powder of the fraipontite mineral, using the powder of an inorganic substance as a binder, and then coating its surface with the powder of an inorganic substance;

[6] A pellet layer that is formed by fixing pellets to the entire surface of the honeycomb structure 12, the pellet being formed by pelletizing the powder of an inorganic substance, and then coating its surface with the powder of the fraipontite mineral, using the powder of an inorganic substance as a binder;

[7] An inorganic material layer that is formed by fixing a mixture of the powder of the fraipontite mineral and the powder of manganese oxide and/or permanganate to the entire surface of the honeycomb structure 12, using the powder of an inorganic substance as a binder;

[8] An inorganic double layer including a first inorganic material layer that is formed by fixing the powder of the fraipontite mineral to the entire surface of the honeycomb structure 12, using the powder of an inorganic substance as a binder, and a second inorganic material layer that is formed by fixing the powder of manganese and/or permanganate to the surface of the first inorganic material layer, using the powder of an inorganic substance as a binder;

[9] An inorganic double layer including a first inorganic material layer that is formed by fixing the powder of manganese oxide and/or permanganate to the entire surface of the honeycomb structure 12, using the powder of an inorganic substance as a binder, and a second inorganic material layer that is formed by fixing the powder of the fraipontite mineral to the surface of the first inorganic material layer, using the powder of an inorganic substance as a binder;

[10] A pellet layer that is formed by fixing pellets to the entire surface of the honeycomb structure 12, the pellet being formed by pelletizing a mixture of the powder of the fraipontite mineral and the powder of manganese oxide and/or permanganate, using the powder of an inorganic substance as a binder;

[11] A pellet layer that is formed by fixing pellets to the entire surface of the honeycomb structure 12, the pellet being formed by pelletizing the powder of the fraipontite mineral, using the powder of an inorganic substance as a binder, and then coating the surface of the pellet with the powder of manganese oxide and/or permanganate, using the powder of an inorganic substance as a binder; or

[12] A pellet layer that is formed by fixing pellets to the entire surface of the honeycomb structure 12, the pellet being formed by pelletizing the powder of manganese oxide and/or permanganate, using the powder of an inorganic substance as a binder, and then coating the surface of the pellet with the powder of the fraipontite mineral, using the powder of an inorganic substance as a binder.

Manganese oxides as used in the above may be the one selected from tri-manganese tetraoxide ($Mn_3O_4$), di-manganese trioxide ($Mn_2O_3$), and manganese dioxide ($MnO_2$), and permanganate is preferably either $M'MnO_4$ ($M'$: alkali metal) or $M''(MnO_4)_2$ ($M''$: alkaline earth metal). The powder of inorganic substance used as a binder may be preferably selected and prepared from the group of talc, kaolin mineral, bentonite, diatom earth, silica, alumina, mixture of silica and alumina, aluminum silicate, activated alumina, porous glass, hydrated magnesium silicate clay mineral having a crystal structure of the ribbon type, activated clay, and activated bentonite. Silica gel may be used on behalf of silica. Alumina gel may be used in place of alumina. Similarly, the mixture of silica and alumina may be replaced by the mixed gel of silica gel and alumina gel. The powder of the above-mentioned inorganic substance used as a binder, is referred to as "inorganic binder" hereinafter.

Figure 4:
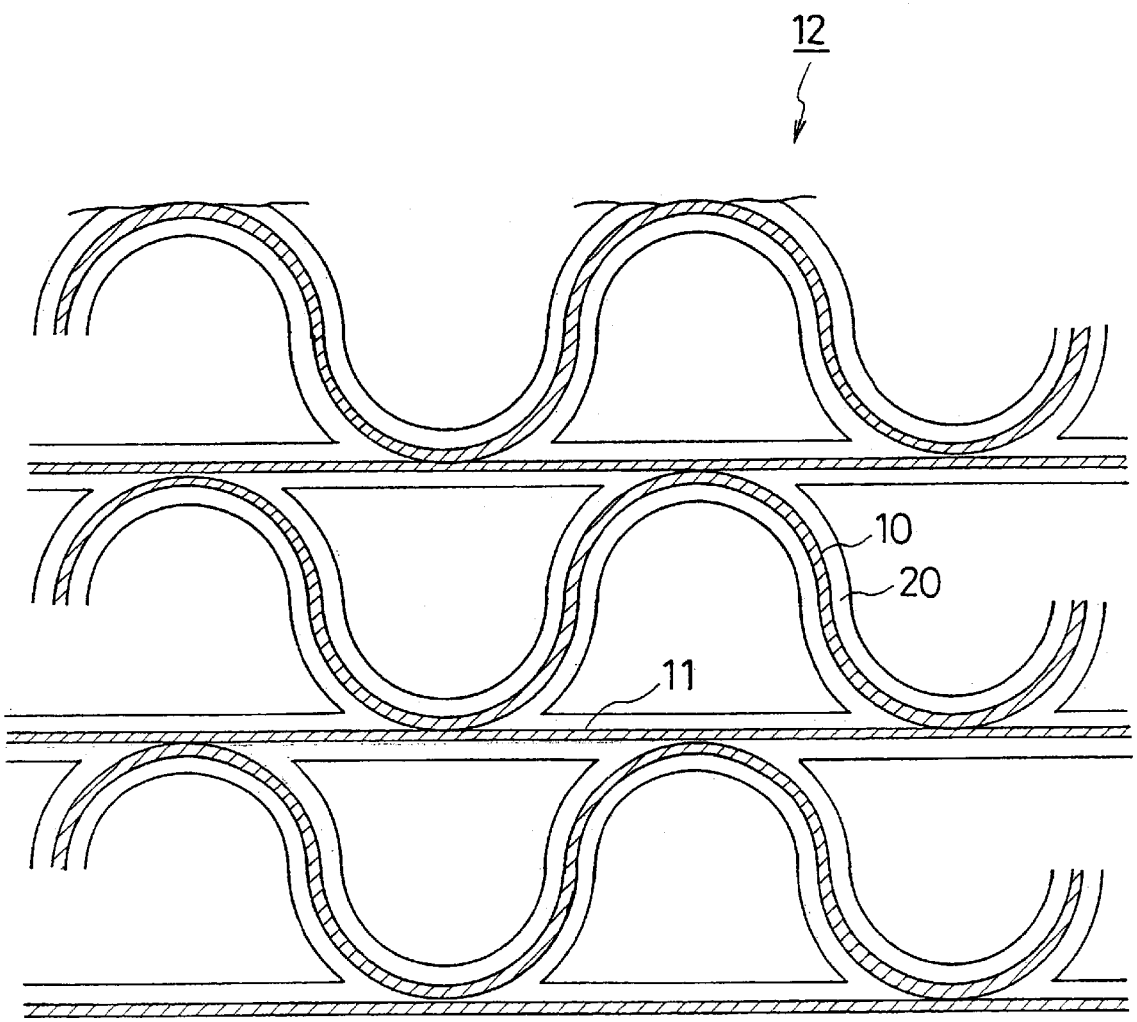
FIG. 4 is a partly enlarged sectional view of a filter including an inorganic material layer that is formed by fixing the powder of the fraipontite mineral to the honeycomb structure of the filter, using an inorganic binder.

Now, an example of a method for manufacturing the filter 1 will be explained in the following. At first, three materials i.e. the inorganic fiber (ceramic fiber, glass fiber, silica fiber, alumina fiber), organic material (mixture of pulp and fused Vinylon), and calcium silicate are mixed with each other at a weight ratio of 1:1:1. Then, a roll of thin paper-like filter media sheet having a thickness of 0.3 mm is formed of the above mixture by means of a wet type paper making method. In preparation of the above mixture, calcium silicate may be replaced by clay mineral having a fibrous crystal structure, for instance sepiolite, palygorskite, each of which includes magnesium silicate as a main component thereof. The filter media sheet is then processed by a corrugating machine and transformed into a corrugated filter media sheet 10. A plurality of corrugated filter media sheets 10 and thin flat filter media sheets 11 are alternately stacked up and mutually fixed with a suitable adhesive, thereby a honeycomb structure 12 being formed as shown in FIG. 3. The honeycomb structure 12 is then treated by heat for about one hour in an electric furnace controlled to keep a temperature of about 400° C. With this heat treatment, all the organic components contained in the filter media are removed away. This removal of organic components causes a limitless number of tiny pores or recesses of a micron size to come out over the entire surface of the honeycomb structure 12, thus it being made porous. These pores will serve as receptacles allowing particulates of the adsorbent and the inorganic binder to rest therein later. In the next, the porous honeycomb structure 12 is immersed, for a several minutes, into a suspension in which the powder of the fraipontite mineral and the inorganic binder are dispersed. After this, the honeycomb structure 12 is dried through another heat treatment at a temperature of about 300° C. for about one hour. In this way, as shown in FIG. 4, there is finished the filter 1, which includes an inorganic material layer 20 formed on each surface of both corrugated and flat filter media sheets 10 and 11. The above-mentioned suspension may include an inorganic adhesion assisting agent, for instance at least one of sodium silicate, silica, and alumina. Silica sol may be used in place of silica while alumina sol may be used on behalf of alumina. The inorganic adhesion assisting agent plays a role of firmly fixing the powder of the fraipontite mineral and the inorganic binder to the surface of the honeycomb structure 12 (including the inside surface of a cell as an element of the honeycomb structure 12 (the same in the following)). The filter 1 as finished in the way like the above neither includes any inflammable material as its constituent, nor desorbs any of gaseous organic impurities causing surface contamination of the product, because they are completely removed away from materials constituting the filter during the above-mentioned heat treatment. Thus, the filter 1 never desorbs gaseous organic impurities by itself.

In the next, another method for manufacturing the filter 1 will be explained in the following. Up to formation of the honeycomb structure 12, all the manufacturing steps are identical to those which are described in the above. The method that is going to be explained, is characterized in that pellets formed by pelletizing the powder of the fraipontite mineral are fixed to the entire surface of the honeycomb structure 12, using an adhesive. In case of pelletizing the powder of the fraipontite mineral, there is first prepared a mixture which consists of the powder of the fraipontite mineral, an inorganic binder, a proper quantity of water, and an inorganic adhesion assisting agent. When kneading this mixture, it is transformed into a material that has clayey viscosity and plasticity and is suitable for pelletization. The sort of the inorganic binder and the inorganic adhesion assisting agent may be the same as used in the previously described method.

The pellet having another structure different from the above-mentioned is applicable to the filter 1. Difference exists in the surface structure of the pellet. To be more specifically, the surface of the pellet formed of the fraipontite mineral and the inorganic substance is coated with the powder of an inorganic adsorbent, thereby forming an inorganic material layer capable of adsorbing and removing gaseous organic impurities. In this case, the inorganic substance which constitutes the inside of the pellet may be selected from the group (II) of Table 1 as described before.

Figure 5:
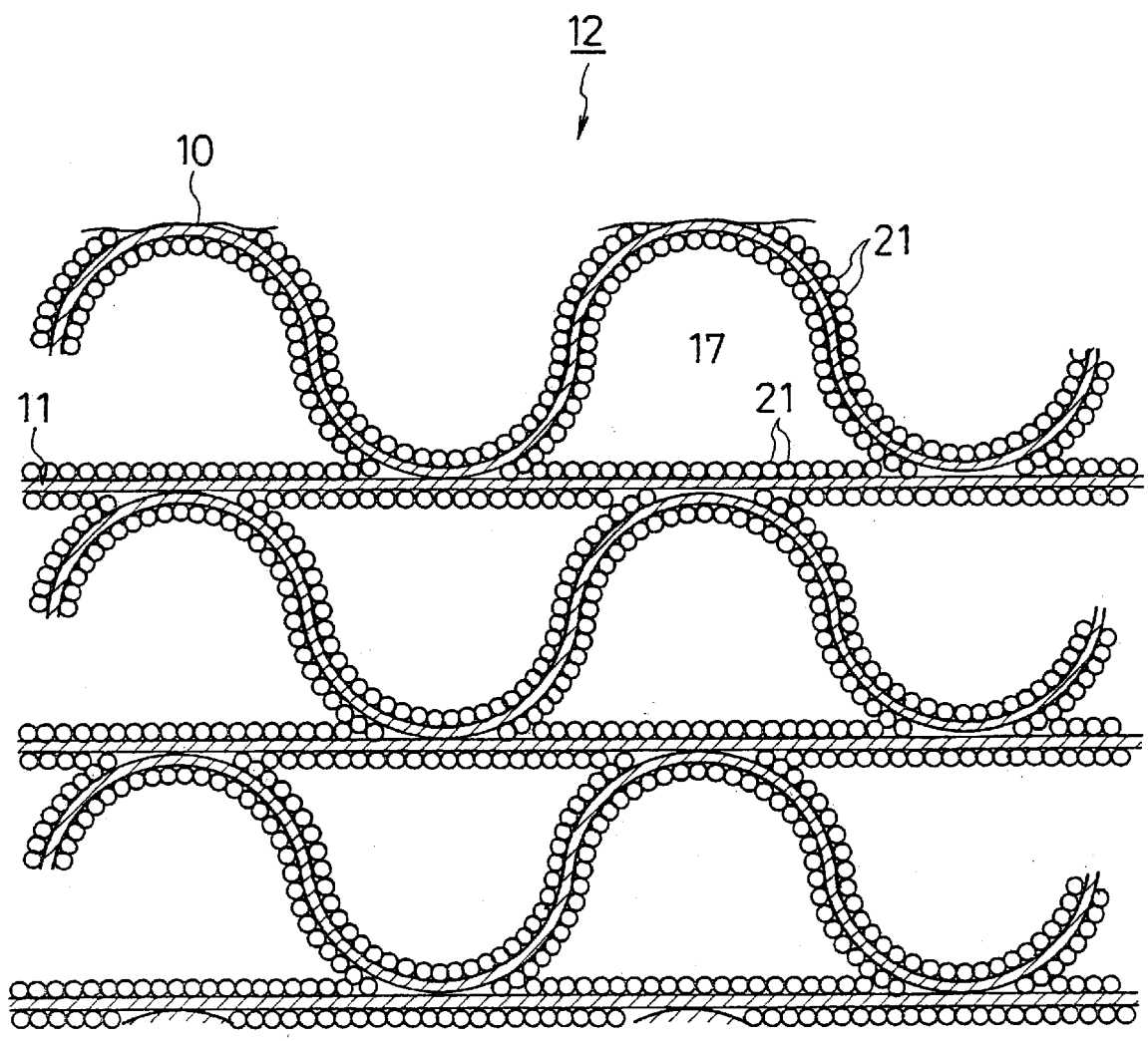
FIG. 5 is a partly enlarged sectional view of a filter including pellets fixed to the surface of the honeycomb structure of the filter, the pellet being formed by pelletizing the powder of the fraipontite mineral, using an inorganic substance as a binder.

FIG. 5 is a partly enlarged sectional view of a filter 1 including the honeycomb structure 12, to the surface of which there are fixed a number of pellets 21 formed by pelletizing the powder of the fraipontite mineral, using the inorganic binder. Pellets 21 are fixed to the entire surface of each of corrugated 10 sheets and thin flat sheets 11, using an incombustible adhesive. In this embodiment, the object air to be cleaned is made to flow through the thin cylindrical space 17 having an approximately semicircular cross section. The honeycomb structure 12 now having pellets 21 fixed to the surface thereof is then treated by heat in an electric furnace that is controlled so as to keep a temperature of about 100° C. or less, which is lower than the heat-resisting temperature of the adhesive, for about 2 hours, thereby completely driving out gaseous organic impurity components which are contained in the adhesive and may cause the surface contamination. In this way, filter 1 is finished.

The filter 1 as finished in the above includes nothing inflammable as its constituents, so that even if it is installed on the ceiling portion of the clean room, the safety from the disaster prevention standpoint can be remarkably enhanced comparing to the case of using the prior art chemical filter employing activated charcoal, ion exchange fiber, etc., which are inflammable. The cross section of the individual air path formed in the honeycomb structure is not limited to the semicircular shape. It may be designed to have an arbitrary shape.

Figure 6:
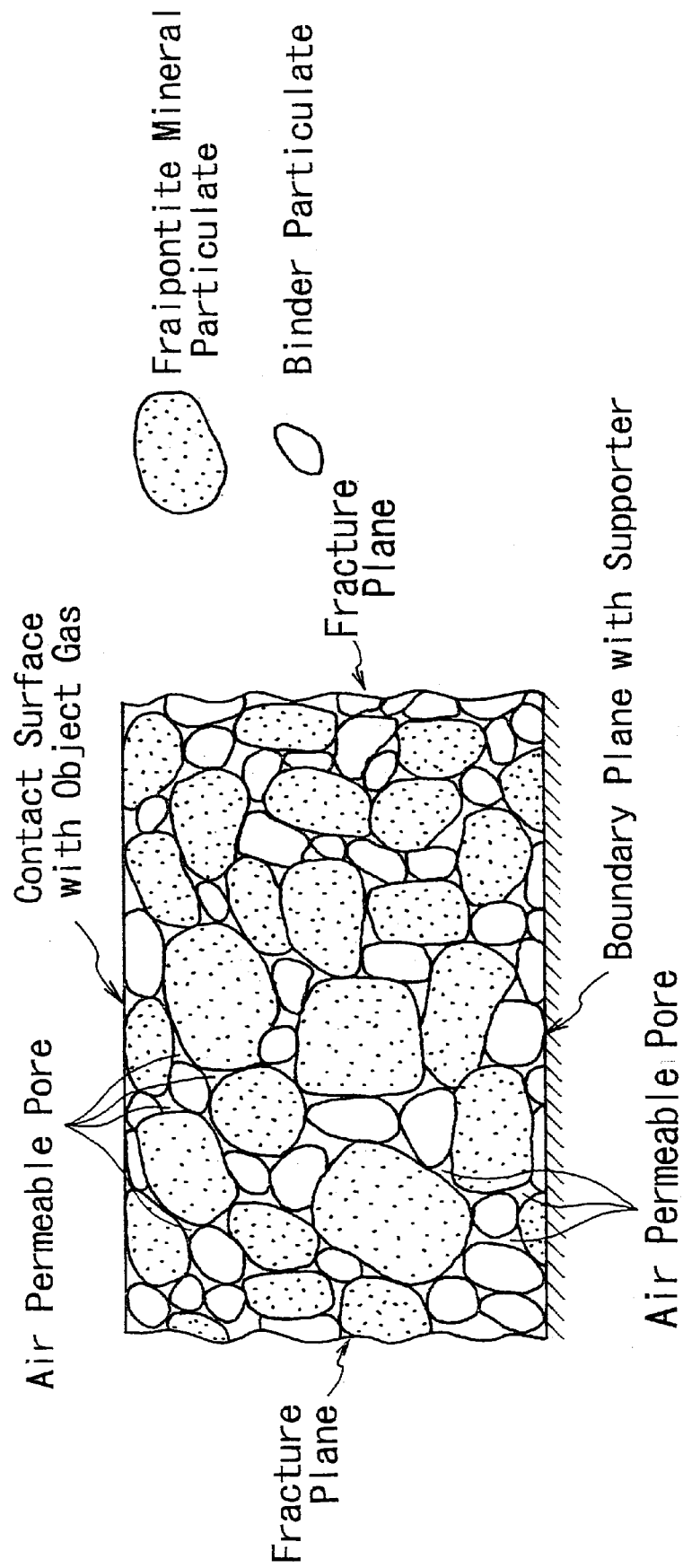
FIG. 6 is a sectional enlarged view of an inorganic material layer that is formed by fixing the powder of the fraipontite mineral to the surface of a supporter, using an inorganic substance as a binder.

FIG. 6 is a partly enlarged sectional view of an inorganic material layer that is formed by fixing the powder of the fraipontite mineral to the surface of a supporter, using an inorganic binder. The object air to be cleaned flows into the inside of the inorganic material layer from its surface (contact face with the object air) through air permeable pores formed between particulates of the powder of fraipontite mineral and the inorganic binder, and reversely flows out therefrom to the outside. During this process, gaseous acid impurities and gaseous basic impurities are removed by the particulates of the fraipontite mineral, while molecules of the gaseous organic impurities are physically adsorbed and removed by the pore existing on the surface of the inorganic binder, especially when the inorganic substance belonging to the above-mentioned group (I) is used as a binder.

In order to remove gaseous acid impurities, gaseous base impurities, and gaseous organic impurities at one time, the filter 1 has to be constructed such that the surface of its honeycomb structure 12 is provided with an inorganic material layer 20 that is formed by fixing the powder of the fraipontite mineral thereto, using the inorganic binder, which preferably includes pores, the majority of which falls in the range of the mesopore or the micropore, or such that the surface of the honeycomb structure 12 is provided with a pellet layer that is formed by fixing the pellet 21 thereto, pellet being formed by pelletizing the powder of the fraipontite mineral, using the same inorganic binder as mentioned above.

Figure 7:
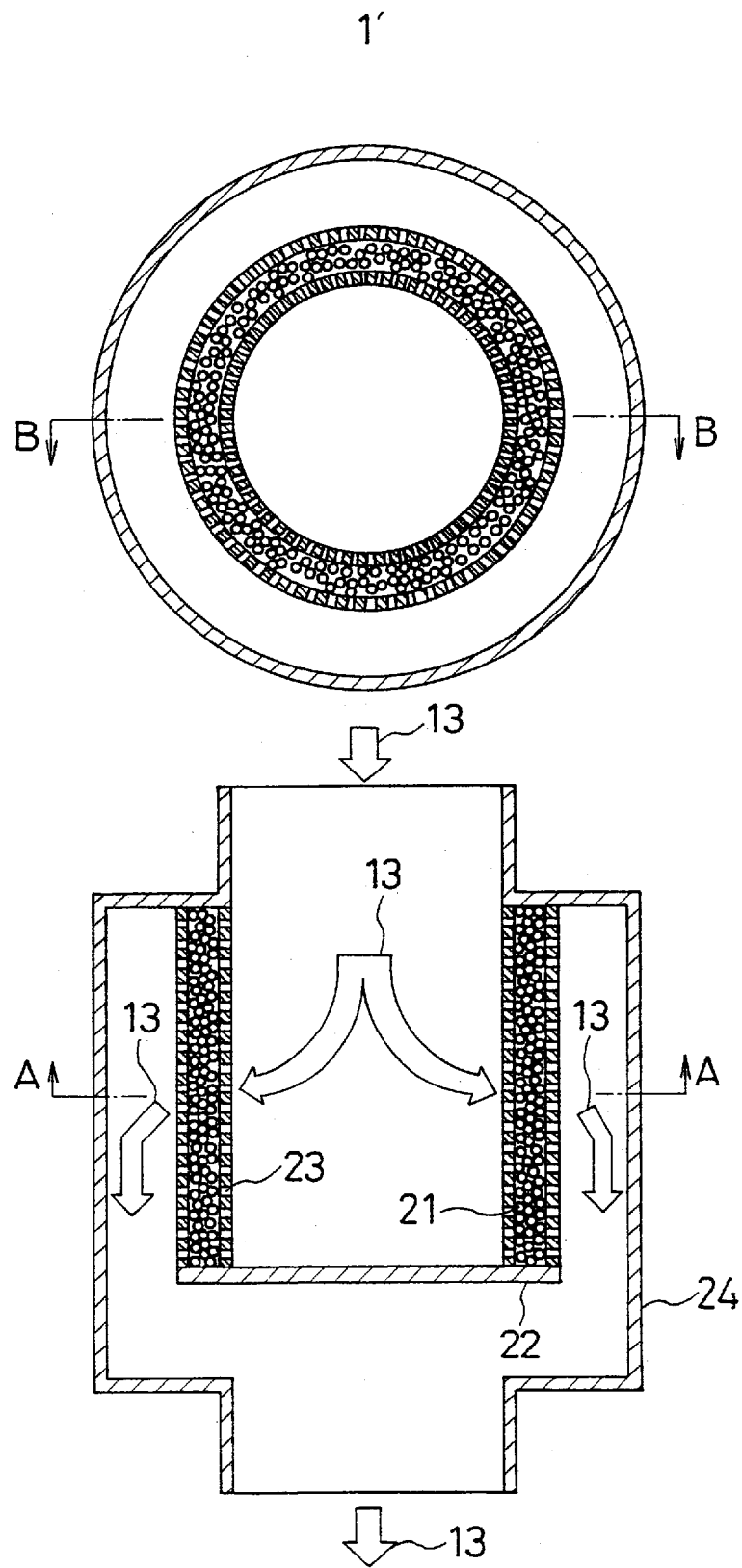
FIG. 7 is transverse and longitudinal sectional views of a cylinder type air filter having a double cylindrical casing which is filled up with pellets pelletized from the powder of the fraipontite mineral.

Furthermore, the object of the invention can be also achieved by a filter 1' of the cylinder type, of which an example is shown in FIG. 7 including A—A and B—B sectional views of it. As shown in the figure, a casing 22 of the double cylinder type has a number of vent openings 23 on its side face. This casing 22 is filled up with the pellet 21 that is pelletized from the powder of the fraipontite mineral, using the inorganic binder which includes pores belonging to the range of the mesopore or the micropore. The object air to be cleaned first flows in the inner cylinder of the casing 22, then passes through an adsorbent layer formed of the pellet 21, further flows through the space defined between the outer cylinder of the casing 22 and the outermost cylinder 24, and finally flows out therefrom. Arrows 13 in the figure indicates the flow direction of the object air.

Figure 1:
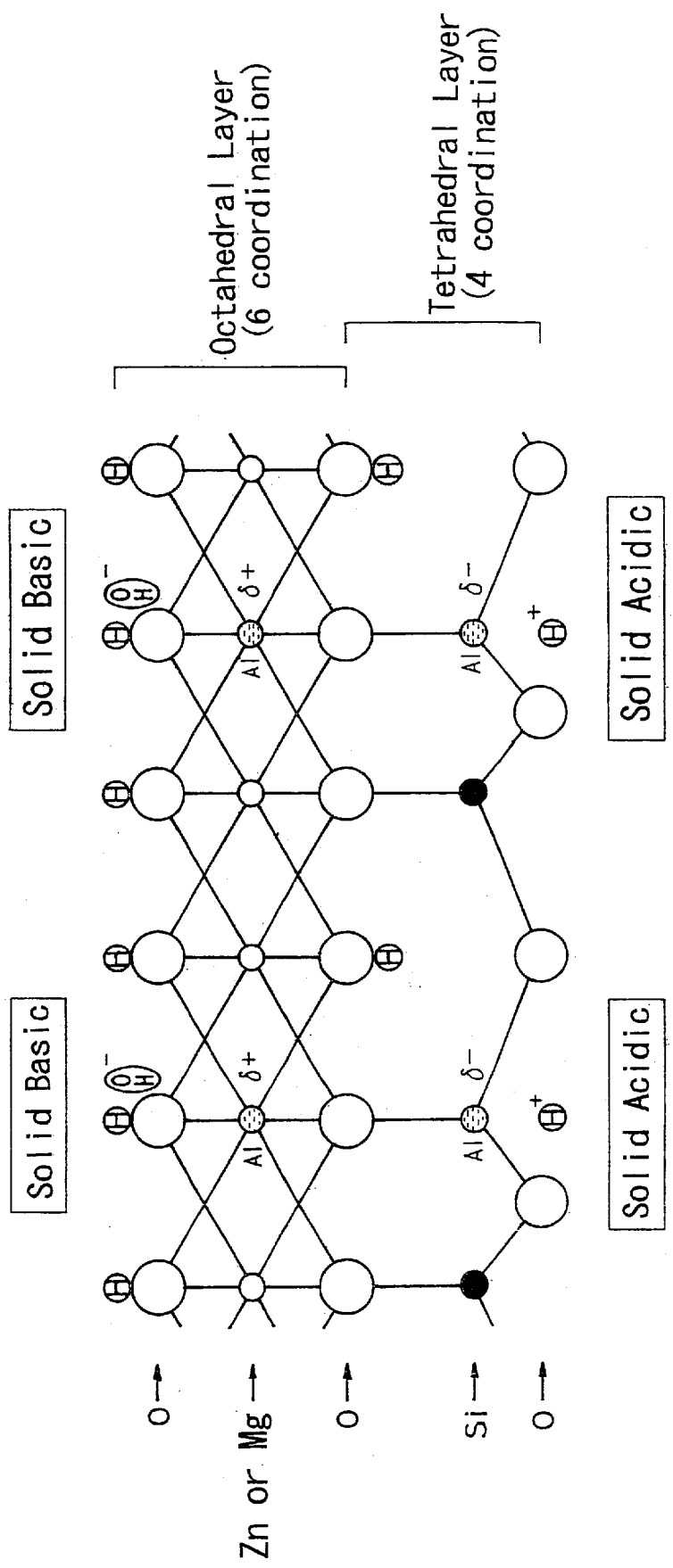
FIG. 1 is a diagram for explaining the fraipontite mineral, the microcrystal of which has such a double structure that one side of it shows a solid basic properties while the other shows a solid acid properties.
Figure 2:
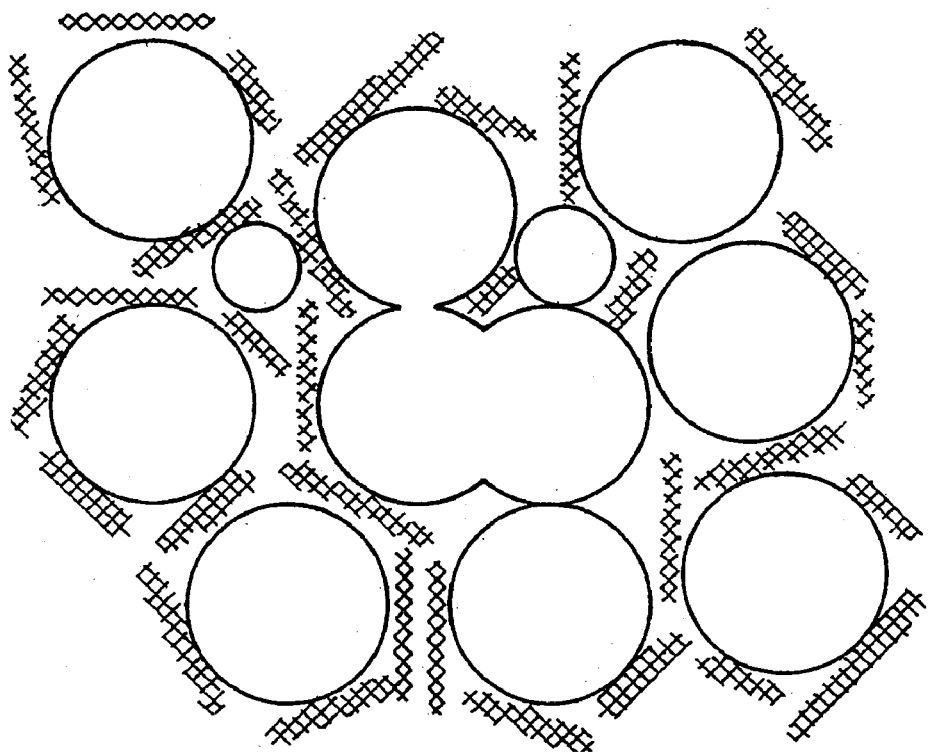
FIG. 2 is an enlarged view of an inorganic material layer in which a single layer or stacked several layers of the fraipontite mineral having the double structure are arranged in random around the inorganic binder particulate, without overlapping with each other.
Figure 2:

In case of industrially synthesizing microcrystals of the fraipontite mineral, of which each consists of several to several tens unit layers of the fraipontite mineral having such a double structure as shown in FIG. 1, two kinds of methods are available, one making use of hydrothermal reaction and the other making use of co-precipitation. These methods are discussed in detail in a report by N. Takahashi, M. Tanaka and T. Sato, entitled "Synthesis of Fraipontite" (The Chemical Society of Japan, 1990, No. 4, pp. 370–375).

The above-mentioned filters 1 and 1' may be formed by making use of the powder of synthetic fraipontite microcrystal produced by such methods as described above. To be more specifically, the filter 1 may be formed by first mixing the powder of synthetic fraipontite microcrystal with the powder of acid-treated montmorillonite (activated clay) as an inorganic binder and then fixing the mixed powder to the entire surface of the honeycomb structure 12. Also, the filter 1 may be formed by first pelletizing the pellet 21 from the above mixed powder and then fixing the pellet 21 to the entire surface of the honeycomb structure 12. On one hand, if the casing 22 is filled up with the pellet 21, the filter 1' may be completed. For instance, the microcrystal of the synthetic fraipontite mineral as used in the above examples has a circular shape, a thickness of several tens angstroms and a diameter of 100 angstroms to 1 micrometer, while the powder of the montmorillonite has a size of several tens nanometers. Montmorillonite is a clay mineral having a chemical composition expressed as $Al_4Si_8(OH)_4 \cdot nH_2O$ and its name comes from a place name "Montmorillon" in France, where it is produced. When montmorillonite is treated by acid, its pore volume in the range of the pore diameter of 15 to 300 angstroms become about 0.37 cc/g and its specific surface area becomes about 300 $m^2/g$, and the pore volume in the range of the pore diameter of 40 to 600 angstroms comes to occupy 22% of the total pore volume. Therefore, if the acid-treated montmorillonite (activated clay) is used as a binder for the powder of the fraipontite mineral, the pore of this binder makes it possible to physically adsorb gaseous organic impurities that can not be adsorbed by the fraipontite mineral only.

In Table 1, talc, kaolin mineral and bentonite of the binder group (II) have a large volume in the range of the macropore, but have a small inner surface area and volume in the range of the micropore and mesopore, thus their physical adsorption function being made naturally weaker. Similarly, bentnite of the binder group (II) has a large volume in the range of the macropore, but has a small inner surface area and volume in the range of the micropore and mesopore, thus its physical adsorption function being made naturally weaker. On the other hand, in the inorganic binder group (I) of Table 1, sepiolite belonging to hydrated magnesium silicate clay mineral having a crystal structure of the ribbon type, includes the micropore of 10 angstroms and the mesopore of 200 angstroms, and its inner surface area and volume are so large, thus its physical adsorption function being made stronger, naturally. Accordingly, the large physical adsorption function may be provided by the powder of inorganic substances belonging to the binder group (I) of Table 1 such as diatom earth, silica (silica gel), alumina (alumina gel), a mixture of silica and alumina (mixture of silica gel and alumina gel), aluminum silicate, activated alumina, porous glass, hydrated magnesium silicate clay mineral having a crystal structure of the ribbon type, acid-treated montmorillonite (activated clay), and activated bentonite. As shown in Table 1, these inorganic substances have the pore volume of 0.2 cc/g or more in their pore diameter range of 15 to 300 angstroms, or the specific surface area of 100 $m^2/g$ or more. Of course, the powder of these inorganic substances may be preferably used for forming the second inorganic material layer which is formed over the first inorganic material layer including the powder of the fraipontite mineral.

In order to prepare the pellet which is formed of the powder of the fraipontite mineral and the powder of the inorganic binder having an effective pore diameter in the range of the mesopore or micropore, and is to be fixed to the supporter surface of the filter, these two kinds of powder are first mixed with city water to make a clayish mixture. This clayish mixture is then processed with the help of a pelletizing machine to produce the pellet having a diameter of 0.3 to 0.8 mm. The pellet is then blown against the supporter with a high speed air jet, thereby the filter as shown in FIG. 5 being formed. In this case, the surface of the supporter is preferably pretreated with an incombustible inorganic adhesive. In this case, it is not always needed that the supporter is in the form of the honeycomb structure. It may have such a three-dimensional mesh structure such as rock wool. This mesh structure may show a high resistance against the object air flowing therethrough, but it may give the object air more chances to get in contact with adsorbents than the honeycomb structure.

In the next, an example of another method for manufacturing the filter 1, will be explained in the following. At first, the porous honeycomb structure 12 including a countless number of tiny pores with a size in the order of microns is manufactured by means of the steps similar to the steps mentioned above. Up to formation of the inorganic material layer, all the manufacturing steps are executed in the same way as described in the above, thus explanation thereof being omitted. In the next, this porous honeycomb structure 12 is immersed, for a several minutes, in a suspension in which the powder of the fraipontite mineral and the powder or an inorganic binder like talc, kaolin mineral, bentonite, etc. are dispersed. After this, the honeycomb structure 12 is treated by heat at about 300° C. for about one hour, thereby forming the first inorganic material layer 25. Subsequently, the honeycomb structure which is now provided with the first inorganic material layer 25, is again immersed for several minutes, in another suspension in which there is dispersed the powder of an inorganic substance having the effective pore diameter of mesopore or micropore, for instance the powder of diatom earth, silica, alumina, a mixture of silica and alumina, aluminum silicate, activated alumina, porous glass, hydrated magnesium silicate clay mineral having a crystal structure of the ribbon type, activated clay, activated bentonite, or the like. After the process of this immersion, the honeycomb structure 12 is again treated by heat at about 300° C. for about one hour, thereby forming the second inorganic material layer 26. In the formation of the second material layer, silica may be replaced by silica sol, alumina may be replaced by alumina sol, and the mixture of silica and alumina may be replace by the mixture of silica sol and alumina sol, respectively. Sepiolite or palygorskite may be used as hydrated magnesium silicate clay mineral having a crystal structure of the ribbon type. In this way, there can be obtained the honeycomb structure 12 coated with the first inorganic material layers 25 and second inorganic material layers 26. The powder of the inorganic substance used for forming the first and second inorganic material layers 25 and 26, may be mixed with at least one inorganic adhesion assisting agent, for instance sodium silicate, silica, or alumina. In this case, however, silica sol may be used in place of silica while alumina sol may be used in place of alumina. The inorganic adhesion assisting agent plays a rote of firmly fixing the powder of the fraipontite mineral and the inorganic binder to the surface of the honeycomb structure 12 or firmly fixing the powder forming the second inorganic material layer 26 to the first inorganic material layer 25. The filter 1 manufactured in the way as mentioned above neither includes any inflammable material as its constituent, nor desorbs any of gaseous organic impurities causing surface contamination of the product because they are completely driven out from materials constituting the filter during the above-mention heat treatment. Thus, the filter 1 never desorbs gaseous organic impurities by itself.

Figure 8:
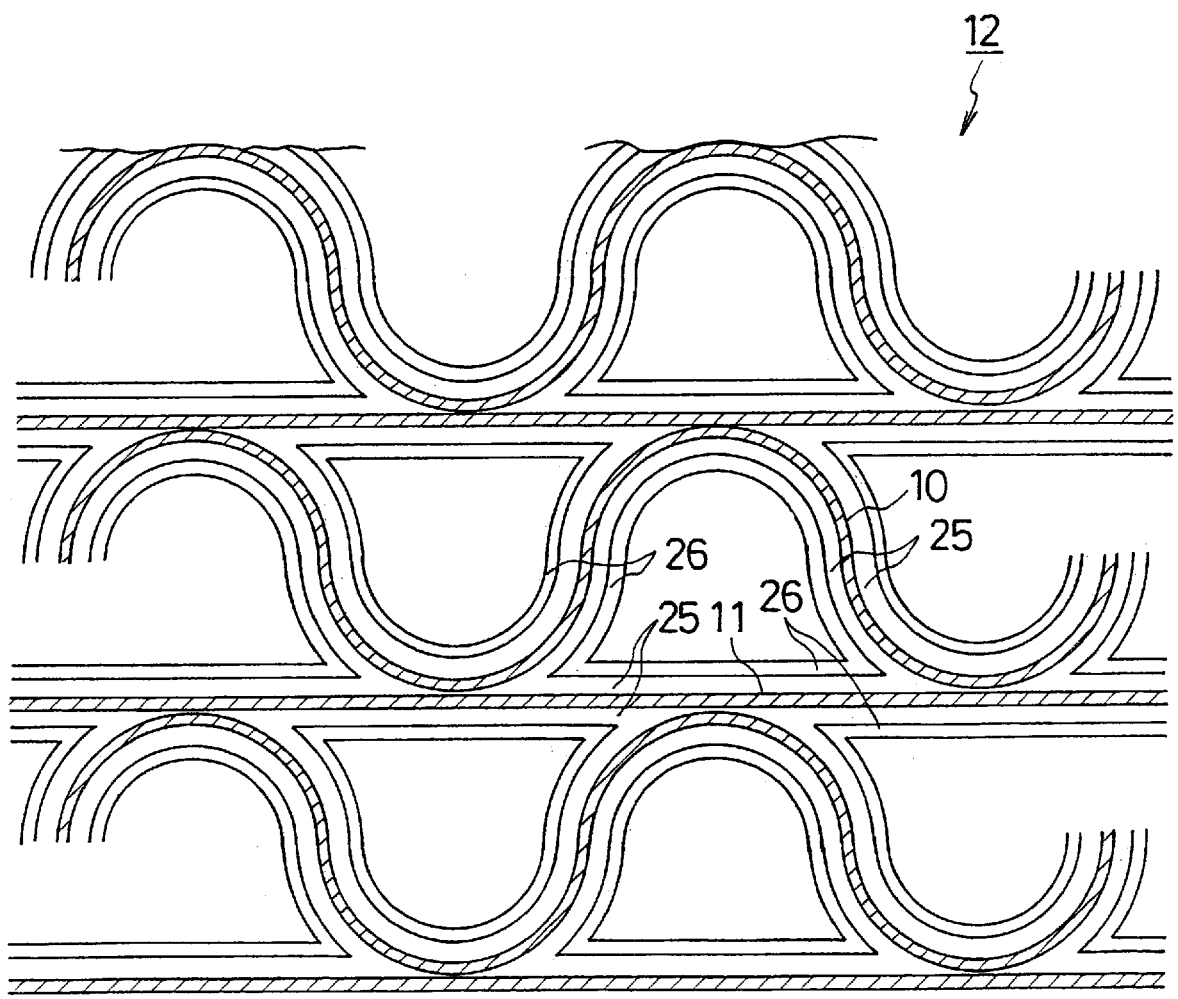
FIG. 8 is a partly enlarged sectional view of a filter including a honeycomb structure formed by alternately stacking a plurality of corrugated sheets and thin flat sheets, a first inorganic material layer that is formed by fixing the powder of the fraipontite mineral to the surface of the honeycomb structure, using an inorganic binder, and a second inorganic material layer that is formed by fixing the inorganic adsorptive powder to the surface of the first inorganic material layer.

FIG. 8 shows a partly enlarged sectional view of a filter 1 including a honeycomb structure 12 formed by alternately stacking a plurality of corrugated sheets 10 and thin flat sheets 11, wherein the first inorganic material layer 25 is formed by fixing the powder of the fraipontite mineral to the surface of the honeycomb structure with an inorganic binder, and the second inorganic material layer 26 is formed by fixing the powder of an inorganic substance having an effective pore diameter in the range of mesopore or micropore to the surface of the first inorganic material layer 25. The effective pore diameter of the inorganic binder for use in the formation of the first inorganic material layer 25 may be different from that of the inorganic adsorptive powder used for forming the second inorganic material layer 26, and may be in the range of macropore having no contribution to physical adsorption. For instance, clay minerals such as talc, kaolin mineral, and bentonite as shown in the group (II) of Table 1, hardly include pores contributing to physical adsorption, but they may be used as the inorganic binder for the first inorganic material layer 25. Also, inorganic adhesion assisting agents such as sodium silicate, silica, and alumina may be used for the same purpose. However, in case of silica sol or alumina sol that is a suspension including mono-dispersed primary particles with a size of a nanometer to several tens nanometers, if it is fixed to the supporter surface and then dried, it is transformed into a three dimensional aggregate as an ensemble of primary particles, thus, silica sol and alumina sol being transformed into silica gel and alumina gel, respectively. In this sense, in case of forming the first and second inorganic material layer 25 and 26, silica sol and alumina sol as an inorganic adhesion assisting agent may be solely used as a binder in the same manner as silica gel and alumina gel which are capable of adsorbing gaseous organic impurities. The powder of the fraipontite mineral included in the first inorganic material layer 25 is apt to peel off because of its layer structure, so that this sometimes unfavorably plays a role of a dust source. This inconvenience can be avoided by coating the first inorganic material layer 25 with the second one 26.

Figure 9:
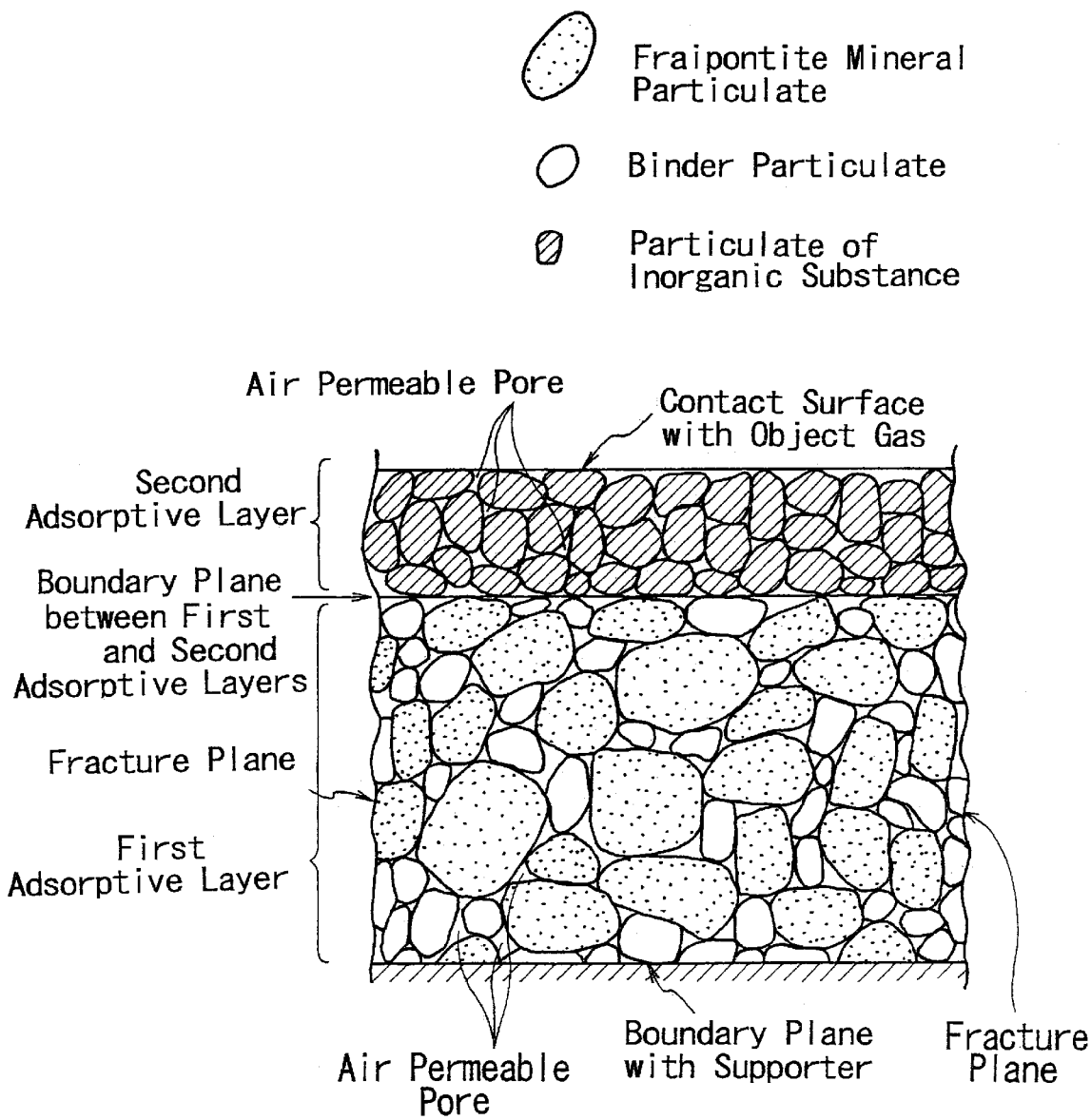
FIG. 9 is a partly enlarged sectional view of a complex layer including the first and second inorganic material layers.

FIG. 9 is a partly enlarged sectional view of a complex layer including the first and second inorganic material layers. As shown in the figure, the second inorganic material layer 26 is provided with the capability to adsorb and remove gaseous organic impurities, so that even though the supporter is constructed including some organic materials, there is no chance for gaseous organic impurities as desorbed therefrom to penetrate through the second inorganic material layer 26 and to be mixed with the once cleaned object air on the downstream side thereof.

In the next, there will be described another example of a method for manufacturing the filter 1. In this example, the honeycomb structure manufactured by the above-mentioned method and the three-dimensional mesh structure such as rock wool are made use of as a supporter, and the pellet formed of the fraipontite mineral is fixed to the surface of such supporters with an adhesive. The pellet is prepared as follows. That is, a mixture of the powder of the fraipontite mineral and an inorganic binder is pelletized by means of a pelletizing machine, and then, the surface of the pellet is coated with the powder of an inorganic substance having an effective pore diameter in the range of mesopore or micropore. This coating is carried out by a dipping method. To be more specifically, the above pellet formed of the powder of fraipontite mineral is first dipped in a suspension in which the powder of the inorganic substance for use in coating is dispersed, and is then taken out from the suspension and dried. In order to increase the mechanical strength of the coating, the above suspension may contain an inorganic adhesion assisting agent in the sol state together with the powder of the inorganic substance for use in coating so that the resultant coating comes to include both of the powder of the inorganic substance and the inorganic adhesion assisting agent. The sort of the powder of the inorganic substance and the inorganic adhesion assisting agent for use in coating may be selected as previously mentioned.

Figure 10:
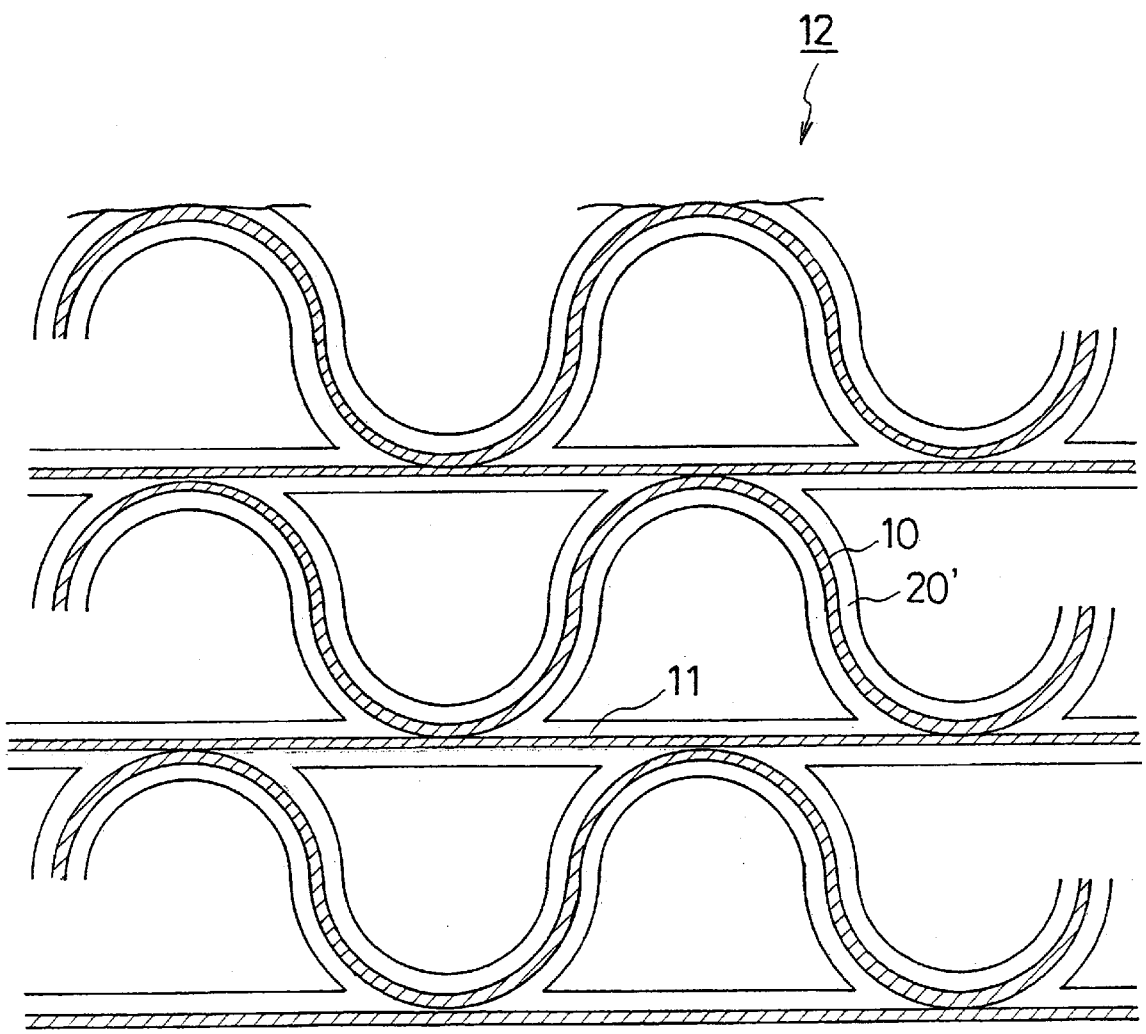
FIG. 10 is a partly enlarged sectional view of a filter including a honeycomb structure, to the surface of which the powder of the fraipontite mineral and the powder of manganese oxide and/or permanganate are fixed, using an inorganic binder to form an inorganic material layer.

In the next, there will be described still another example of a method for manufacturing the filter 1. In this example, the honeycomb structure 12 manufactured by the method as mentioned before is made use of as a supporter. In this example, the honeycomb structure 12 is immersed for a several minutes in a suspension in which the powder of the fraipontite mineral, the powder of manganese oxide and/or permanganate, and an inorganic binder are dispersed. After this process of immersion, the honeycomb structure 12 is taken out from the suspension, and then is treated by heat at about 300° C. for about one hour. In this way, the powder of the fraipontite mineral and the powder of manganese oxide and/or permanganate are fixed to each surface of the corrugated sheets 10 and the flat sheets 11 of the honeycomb structure 12 with the inorganic binder to form an inorganic material layer 20' as shown in FIG. 10. In this way, the filter 1 is completed. The above suspension may contain at least one inorganic adhesion assisting agent such as sodium silicate, silica, and alumina. In this case, however, silica sol may be used in place of silica, and also alumina sol may be used in place of alumina. The role of the inorganic adhesion assisting agent is to firmly fix the powder of the fraipontite mineral and the powder of manganese oxide and/or permanganate to the surface of the honeycomb structure 12 (including the inside surface of a cell as an element of the honeycomb structure 12 (the same in the following)). The filter 1 manufactured in the way as mentioned above does not include any inflammable material as its constituent except the case of using permanganate, thus enhancing safety from the standpoint of disaster prevention. Also, the filter 1 does not desorb any of gaseous organic impurities because they are completely driven out from materials constituting the filter 1 during the above-mentioned heat treatment, thus no surface contamination of the product being caused. The cross section of the individual air path formed in the honeycomb structure is not limited to the semicircular shape. It may be designed so as to have an arbitrary shape. It is preferable to use either $M^I MnO_4$ ($M^I$: alkali metal) or $M^{II}(MnO_4)_2$ ($M^{II}$: alkaline earth metal) as permanganate. Water solubility of permanganate of potassium, rubidium and caesium is relatively small, which is about 11 g per water of 100 g (25° C.), but other permanganate is soluble in water very well. In case of the filter 1 provided with a honeycomb structure 12 that is immersed in a suspension in which the powder of permanganate which is soluble well in water and the powder of the fraipontite mineral are dispersed, and is then taken out therefrom and dried, the particle of permanganate included in the inorganic material layer 20' can no longer maintain its own configuration and fixedly rests in the gap or air permeable pore formed in the adjacent portion of the powder of the fraipontite mineral and the powder of the inorganic binder. Manganese oxide is insoluble in water. Accordingly, if using in combination the powder of the fraipontite mineral and the powder of permanganate in place of using in combination the powder of the fraipontite mineral and the powder of manganese oxide, there can be provided the filter 1 that never desorbs any of gaseous organic impurities.

Figure 11:
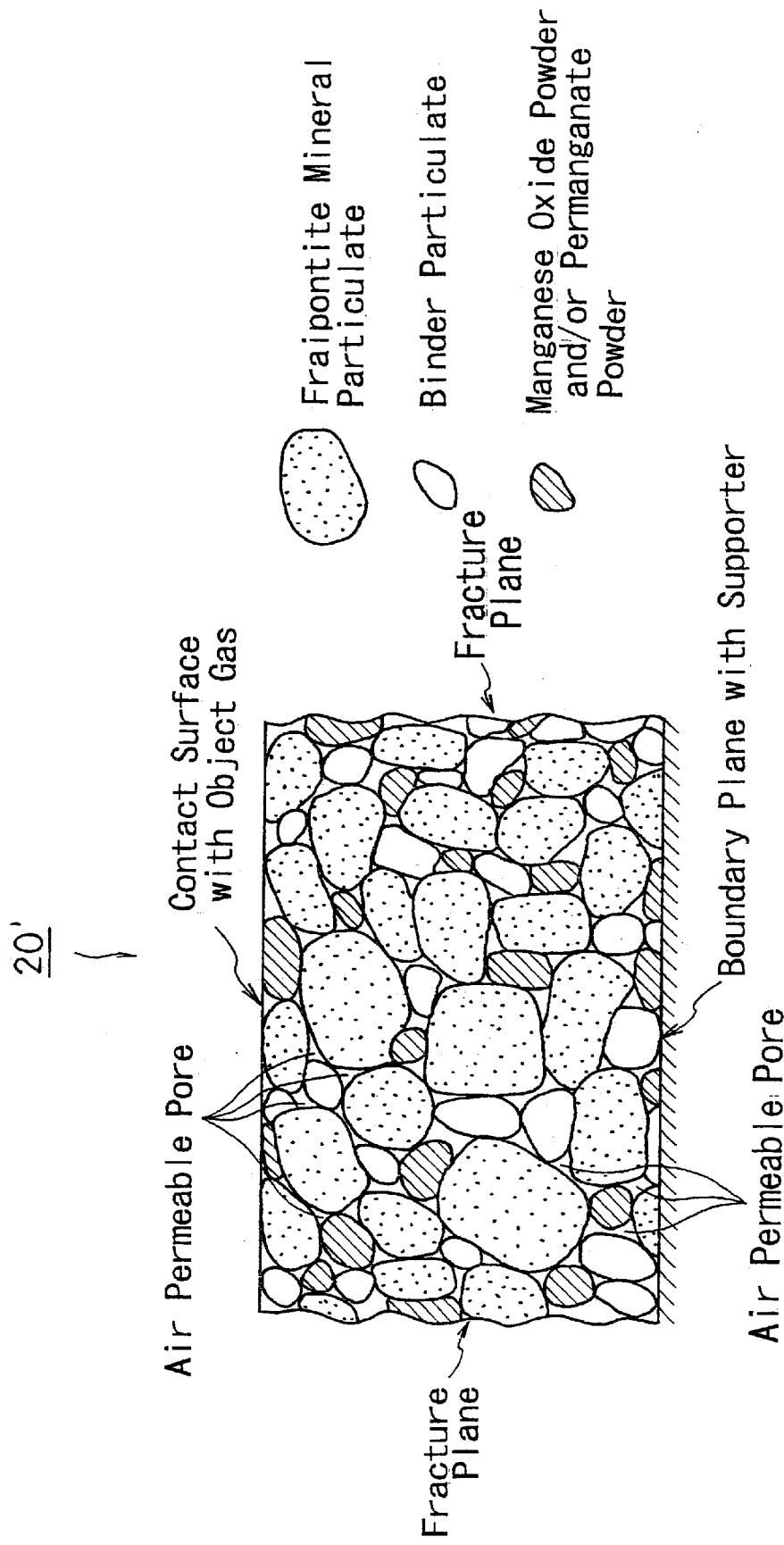
FIG. 11 is a partly enlarged sectional view of an inorganic material layer that is formed by fixing the powder of the fraipontite mineral and the powder of manganese oxide and/or permanganate to the surface of a supporter, using an inorganic binder.

FIG. 11 is a partly enlarged sectional view of the inorganic material layer 20' as shown in FIG. 10. The object air to be cleaned flows into the inside of the inorganic material layer 20' from its surface (contact face with the object air) through air permeable pores formed between the powder of the fraipontite mineral, the powder of manganese oxide and/or permanganate and the powder of inorganic binder, and flows out therefrom to the outside. During this process, gaseous acid and basic impurities are removed by the powder of the fraipontite mineral while molecules of gaseous organic impurities are physically adsorbed and removed by the pore that is suitable for physical adsorption and exists on the surface of the inorganic binder particulate. In this case, sulfur oxides such as sulfurous acid gas can be removed by the fraipontite mineral owing to presence of manganese oxide and/or permanganate.

In the next, there will be described an example of still another method for manufacturing the filter 1. Up to formation of the honeycomb structure 12, all the manufacturing steps are carried out in the same way as described in the above, thus explanation thereof being omitted. In this manufacturing method, the pellet formed by pelletizing a mixture of the powder of the fraipontite mineral and the powder of manganese oxide and/or permanganate is fixed to the surface of the honeycomb structure 12 with an adhesive. In case of pelletizing the pellet by using the powder of the fraipontite mineral and the powder of manganese oxide and/or permanganate, these two kinds of powder and an inorganic binder are mixed up, adding an inorganic adhesion assisting agent and a proper quantity of city water thereto, thereby forming a clayish and plastic mixture capable of being pelletized. This mixture is then processed with the help of a pelletizing machine, thereby producing the pellet having a diameter of 0.3 to 0.8 mm. The pellet is then blown against the supporter surface with a high speed air jet, thereby the pellet being fixed to the entire surface of the honeycomb structure 12. In this case, the surface of the supporter is preferably pretreated with an incombustible inorganic adhesive. The sort of the inorganic binder and the inorganic adhesion assisting agent as use in this example may be the same as used in the method as previously explained.

Figure 12:
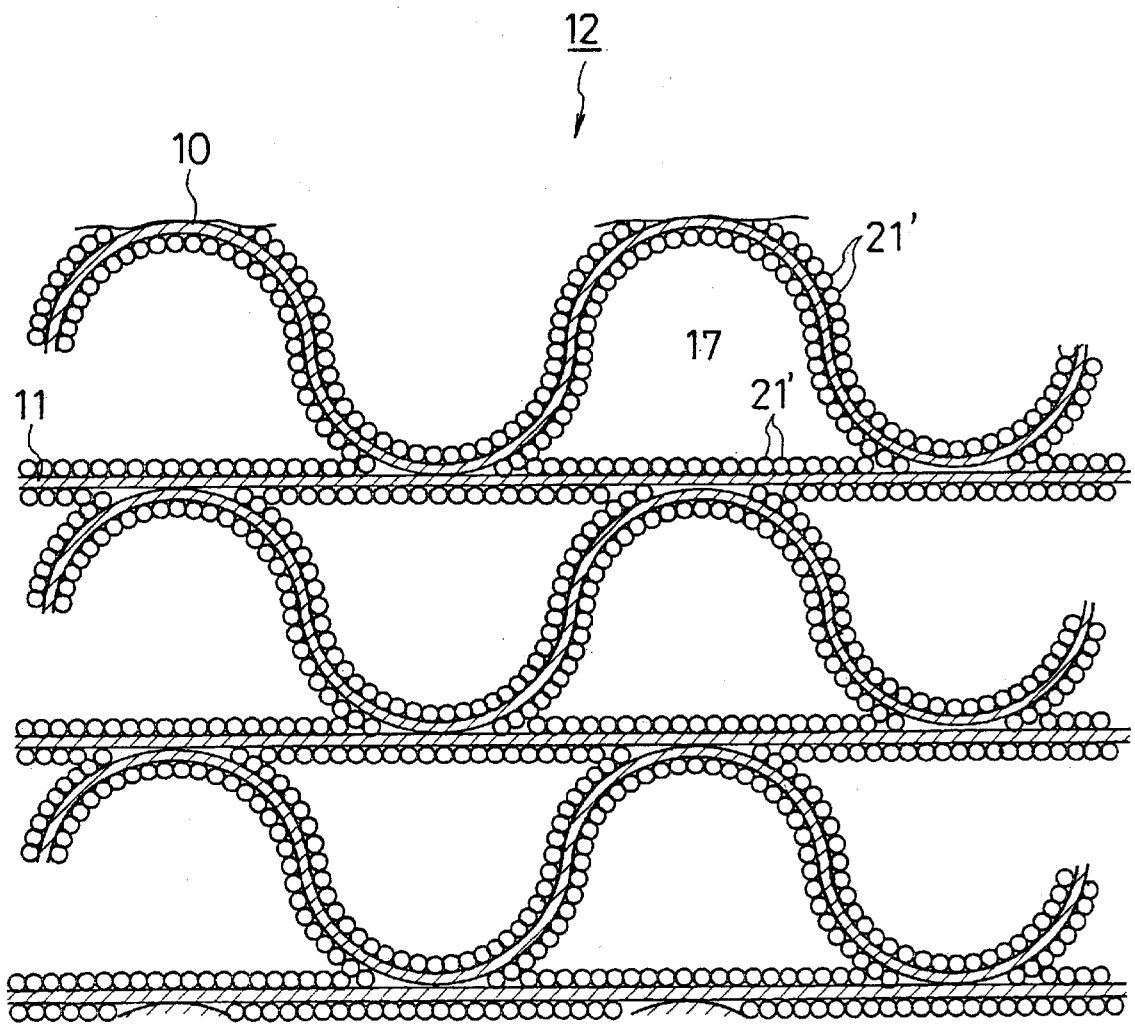
FIG. 12 is a partly enlarged sectional view of a filter including a honeycomb structure, the surface of which is fixed with pellets formed by pelletizing a mixture of the powder of the fraipontite mineral and the powder of manganese oxide and/or permanganate, using an inorganic binder.

FIG. 12 is a partly enlarged sectional view of a filter 1 having the honeycomb structure 12, to the surface of which there is fixed the pellet 21' that is formed by pelletizing a mixture of the powder of the fraipontite mineral and the powder of manganese oxide and/or permanganate, using an inorganic binder. The pellet 21' is fixed to the entire surface of each of corrugated sheets 10 and thin flat sheets 11, using an incombustible adhesive. The object air to be cleaned comes to pass through the thin cylindrical space 17 having an approximately semicircular cross section. Then, the honeycomb structure 12 with the pellet 21' fixed to the surface thereof is treated by heat in an electric furnace controlled to have a temperature of less than about 100° C., which is lower than the heatproof temperature of the adhesive, for about 2 hours, thereby thoroughly driving out and removing gaseous organic impurity components, which are contained in the adhesive and may cause the surface contamination. In this way, the filter 1 is finished. As previously explained in connection with FIG. 11, the filter 1 formed by this example method can adsorb and remove gaseous acid, basic impurities and gaseous organic impurities, and sulfur oxides such as sulfurous acid gas can be removed by the fraipontite mineral owing to presence of manganese oxide and/or permanganate.

Figure 13:
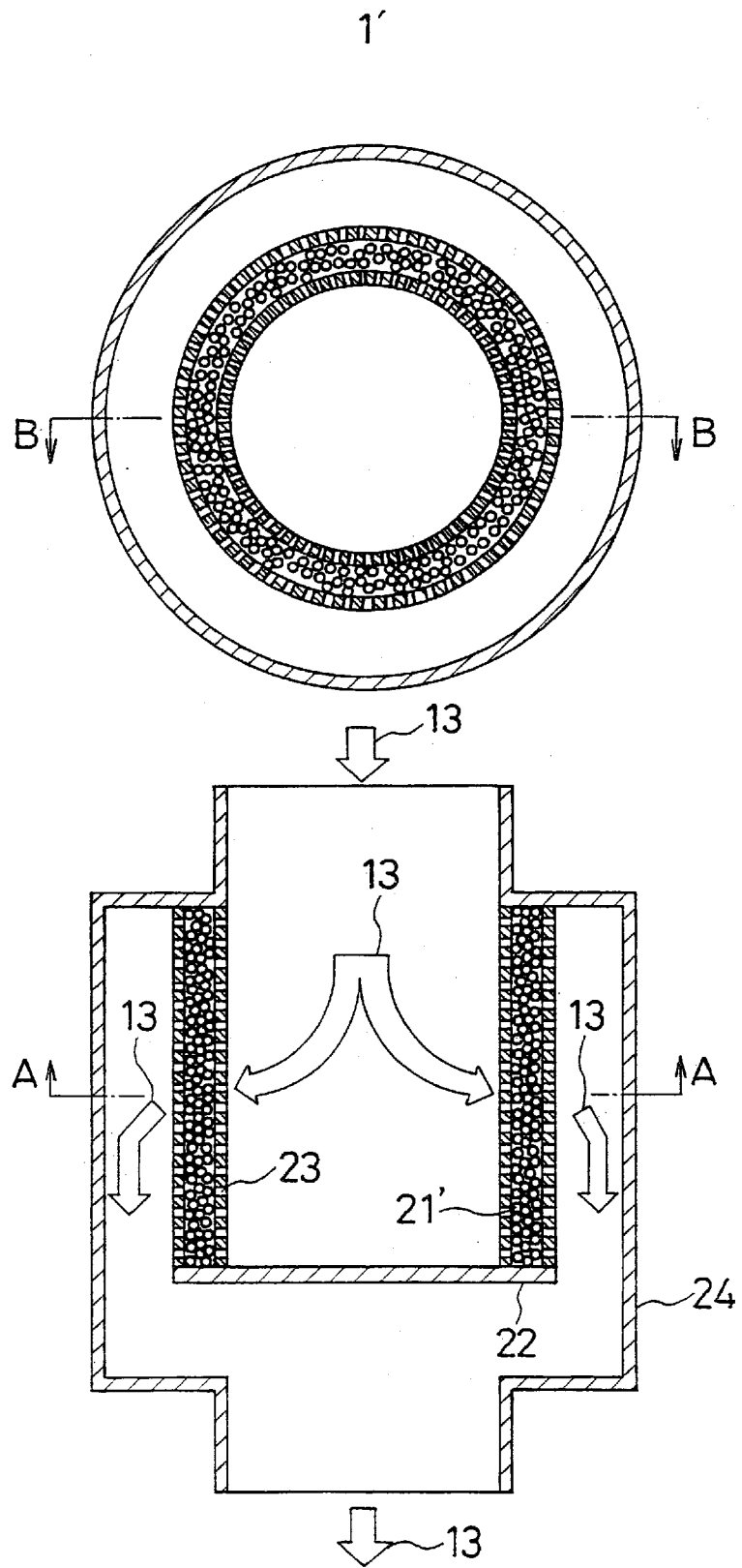
FIG. 13 is transverse and longitudinal sectional views of a cylinder type air filter having a double cylindrical casing which is filled up with pellets pelletized from the powder of the fraipontite mineral and the powder of manganese oxide and/or permanganate.

The object of the invention can be also achieved by a filter 1' of the cylinder type, of which an example is shown in FIG. 13 including A—A and B—B sectional views of it. As shown in the figures, a double cylinder type casing 22 having a number of vent openings 23 on its side, is filled up with the pellet 21' that is pelletized from the powder of the fraipontite mineral and the powder of manganese oxide and/or permanganate, using an inorganic binder having pores, the majority of which is in the range of the mesopore or the micropore. The object air to be cleaned first flows in the inner cylinder of the casing 22, then passes through an adsorbent layer formed of the pellet 21', further flows through the space defined between the outer cylinder of the casing 22 and the outermost cylinder 24, and finally flows out therefrom. Arrows 13 indicate the flowing direction of the object air. The configuration of the casing 22 is not limited to such a double cylindrical casing as shown in FIG. 13. For instance, a casing may be assembled by using a pleated metal sheet provided with a number of small vent openings. At first, a casing body is assembled by oppositely disposing two of such metal sheets in parallel with each other keeping a predetermined gap therebetween, and then, the gap is filled up with the pellet 21'. Such casing has a structure similar to a high efficiency particulate air filter (HEPA) or an ultra low penetration air filter (ULPA). Therefore, a large air volume can be treated at a low vent resistance if the effective vent area (filtration area) i.e. the effective area of the pleated metal sheet is increased.

Accordingly, the above-mentioned filters 1 and 1' can be formed by using the powder of synthetic fraipontite microcrystal produced by such methods as described above. To be more specifically, the powder of synthetic fraipontite microcrystal is first mixed with the powder of manganese oxide and/or permanganate and the powder of acid-treated montmorillonite (activated clay) as an inorganic binder, wherein the microcrystal of the above synthetic fraipontite powder has a circular plate shape with a thickness of several tens angstroms and a diameter of 100 angstroms to 1 micrometer while the above montmorillonite powder has a diameter of several tens nanometers. The filter 1 may be formed by fixing the above mixed powder on the entire surface of the honeycomb structure 12, or by first pelletizing the above mixed powder to form the pellet 21' and subsequently fixing them to the entire surface of the honeycomb structure 12. The filter 1' may be formed by filling up the casing 22 with the pellet 21'.

In the next, an example of still another method for manufacturing the filter 1 will be explained in reference with FIG. 14. Up to formation of the honeycomb structure 12, all the manufacturing steps are carried out in the same way as described in the above, thus explanation thereof being omitted. First of all, the honeycomb structure 12 is immersed, for a several minutes, in a suspension in which the powder of the fraipontite mineral and an inorganic binder are dispersed. After this process of immersion, the honeycomb structure 12 is treated by heat at about 300° C. for about one hour, thereby forming the first inorganic material layer 25'. Subsequently, the honeycomb structure 12 which is now provided with the first inorganic material layer 25' is further immersed, for several minutes, in another suspension, in which the powder of manganese oxide and/or permanganate and an inorganic binder are dispersed. After this immersion process, the honeycomb structure 12 is again treated by heat at about 300° C. for about one hour, thereby forming the second inorganic material layer 26'. The powder of the inorganic substance used for forming the first and second inorganic material layers 25' and 26' may be mixed with at least one inorganic adhesion assisting agent, for instance sodium silicate, silica, or alumina. In this case, however, silica sol may be used in place of silica while alumina sol may be used in place of alumina. The inorganic adhesion assisting agent plays a role of firmly fixing the powder of the fraipontite mineral and the inorganic binder forming the first inorganic layer 25' to the surface of the honeycomb structure 12 or firmly fixing the powder of manganese oxide and/or permanganate and the inorganic binder forming the second inorganic material layer 26' to the first inorganic material layer 25'.

Figure 14:
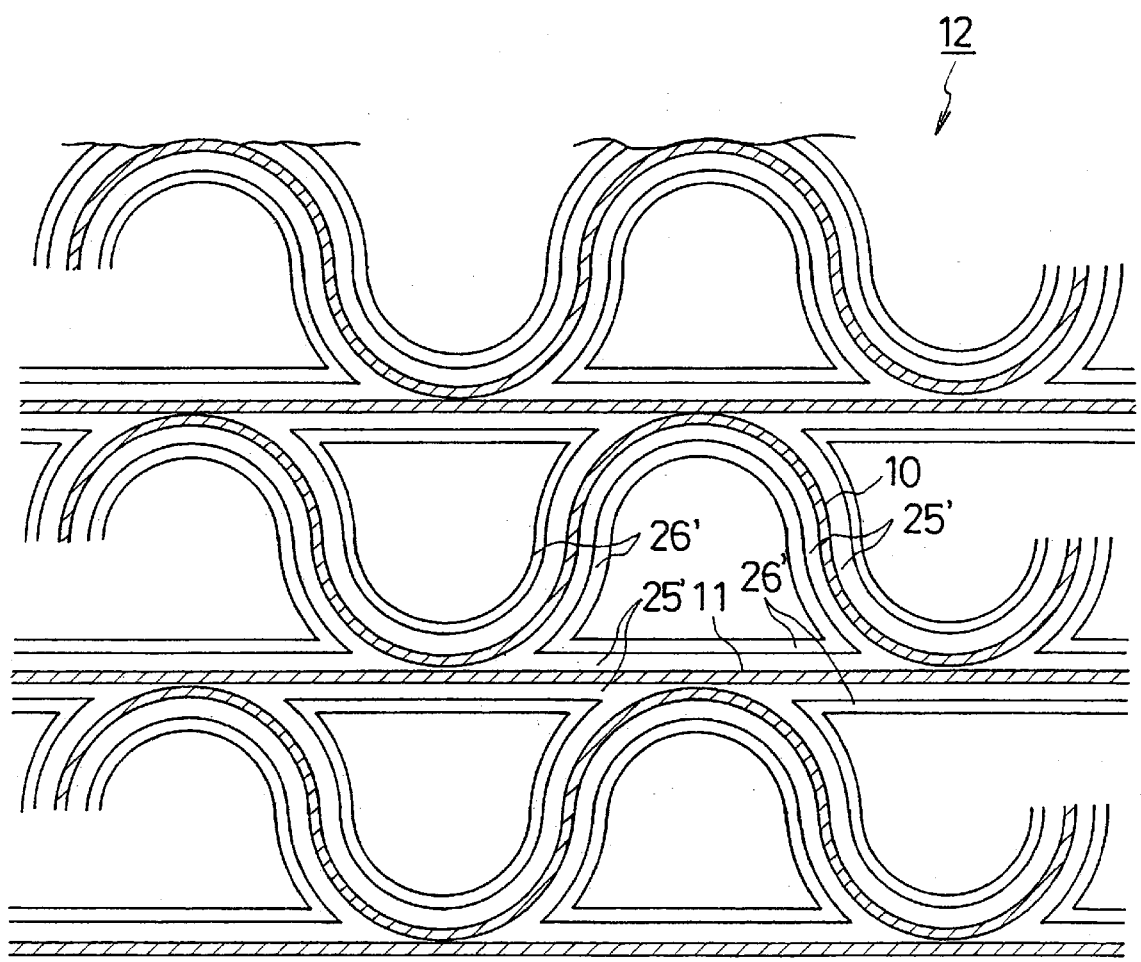
FIG. 14 is a partly enlarged sectional view of a filter including a honeycomb structure formed by alternately stacking a plurality of corrugated sheets and thin flat sheets, a first inorganic material layer that is formed by fixing the powder of the fraipontite mineral to the surface of the honeycomb structure, using an inorganic binder, and a second inorganic material layer that is formed by fixing the powder of manganese oxide and/or permanganate to the surface of the first inorganic material layer, using an inorganic binder.

As shown in FIG. 14, the filter 1 formed in such a way as mentioned above includes a honeycomb structure 12 formed by alternately stacking a plurality of corrugated sheets 10 and thin flat sheets 11, wherein the first inorganic material layer 25' is formed by fixing the powder of the fraipontite mineral to the surface of the honeycomb structure 12, using an inorganic binder, and the second inorganic material layer 26' is formed by fixing the powder of manganese oxide and/or permanganate to the surface of the first inorganic material layer 25', using an inorganic binder. If the powder of inorganic substance as shown in the group (I) of the Table 1 is used as an inorganic binder when forming the first and second inorganic material layers 25' and 26', such binder includes pores having the excellent physical adsorption function, so that they may physically adsorb gaseous organic impurities that can be adsorbed by neither the powder of the fraipontite mineral nor the powder of manganese oxide and/or permanganate. The inorganic binder as shown in the group (I) of the Table 1 may be replaced by the inorganic adhesion assisting agent in the sol state such as silica sol and alumina sol. The reason is as follows. Silica sol or alumina sol is a suspension including mono-dispersed primary particles with a size of a nanometer to several tens nanometers. However, it is once fixed to the supporter surface and then dried, it is transformed into a three dimensional aggregate as an ensemble of primary particles, so that silica sol and alumina sol are transformed into silica gel and alumina gel, respectively. Thus, they come to show the physical adsorption function. In this sense, in case of forming the first and second inorganic material layers 25' and 26', silica sol and alumina sol as an inorganic adhesion assisting agent may be solely used as a binder in the same manner as silica gel and alumina gel which are capable of adsorbing gaseous impurities.

Sulfur oxides such as sulfurous acid gas are transformed into sulfuric acid by manganese oxide and/or permanganate and leaches toward the inorganic material layer 25' adjacent to the supporter, thereby being removed by the fraipontite mineral. Other gaseous acid impurities and gaseous basic impurities are adsorbed and removed by the fraipontite mineral in the inorganic material layer 25'.

Figure 15:
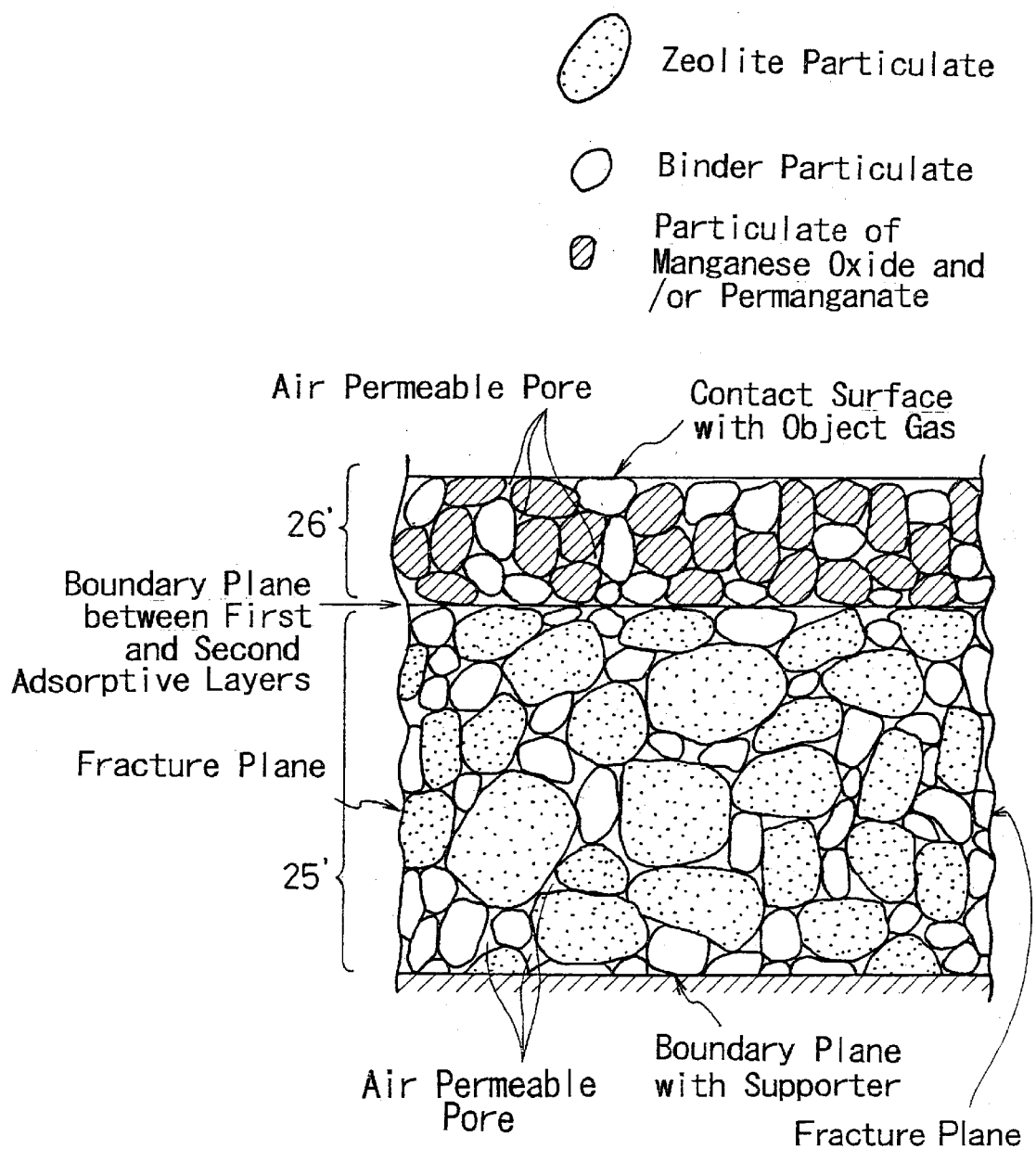
FIG. 15 a partly enlarged sectional view of a complex layer consisting of first and second inorganic material layers according to the invention.

FIG. 15 is a partly enlarged sectional view of the first inorganic material layer 25' and the second inorganic material layer 26' of the filter 1 formed according to the method as mentioned above. The drawback of the first inorganic material layer 25' is that the fraipontite mineral is apt to peel off because of its layer structure. However, this may be advantageously avoided by coating the first inorganic material layer 25' with the second one 26'. Since either the first inorganic material layer 25' or the second inorganic material layer 26' includes one of inorganic binders as shown in the group (I) of Table 1, gaseous organic impurities may be adsorbed and removed by the filter 1 even though such are desorbed by the supporter.

In the next, there will be described an example of still another method for manufacturing the filter 1. Up to formation of the honeycomb structure 12, all the manufacturing steps are carried out in the same way as previously described in the above, thus explanation thereof being omitted. In this method, the pellet is first formed by using the powder of the fraipontite mineral. Then, this pellet is coated with the powder of manganese oxide and/or permanganate. Finally, this coated pellet is fixed to the surface of the honeycomb structure 12 with an inorganic adhesive. To be more specifically, pelletization of the pellet is carried out as follows. The powder of the fraipontite mineral and an inorganic binder are mixed up with an inorganic adhesion assisting agent and a proper quantity of city water, thereby forming a clayish and plastic mixture, which is now ready for being pelletized. This mixture is then processed with the help of a pelletizing machine, thereby producing the pellet having a diameter of 0.3 to 0.8 mm. Furthermore, the pellet is coated with a mixture of the powder of manganese oxide and/or permanganate and the powder of an inorganic substance as a binder. This coated pellet is then blown against the supporter with a high speed air jet, thereby fixing the pellet to the surface of the honeycomb structure 12. In this case, the surface of the supporter is preferably pretreated with an incombustible inorganic adhesive. The sort of the inorganic binder and the inorganic adhesion assisting agent as used in this example may be the same as used in the method as previously explained in the above. As previously explained in connection with FIG. 14, the filter 1 formed by this example method can adsorb and remove gaseous acid impurities, gaseous basic impurities, and gaseous organic impurities. Sulfur oxides such as sulfurous acid gas can be removed by the fraipontite mineral owing to presence of manganese oxide and/or permanganate.

The order of forming the first and second inorganic material layers on the surface of the honeycomb structure may be reversed without changing the protection efficiency against sulfuric acid gas. To be more specifically, in case of reversing the fixing order of the inorganic material layer in FIG. 14, the object gas to be cleaned flows into the inside of the inorganic material layer 25' from the surface of the inorganic material layer 26' (contact face with the object gas) through air permeable pores formed between the particulate of the fraipontite mineral and the same of the binder in the inorganic material layer 26'. Sulfur oxide such as sulfurous acid gas is transformed into sulfuric acid by manganese oxide and/or permanganate in the inorganic material layer 25', and sulfuric acid leaches out toward the powder of fraipontite mineral in the inorganic material layer 26', thereby being removed. Other gaseous acid and basic impurities are adsorbed and removed at the solid acid point and the solid basic point, respectively, which exist on the crystal layer surface of the fraipontite mineral in the inorganic material layer 26'.

Figure 16:
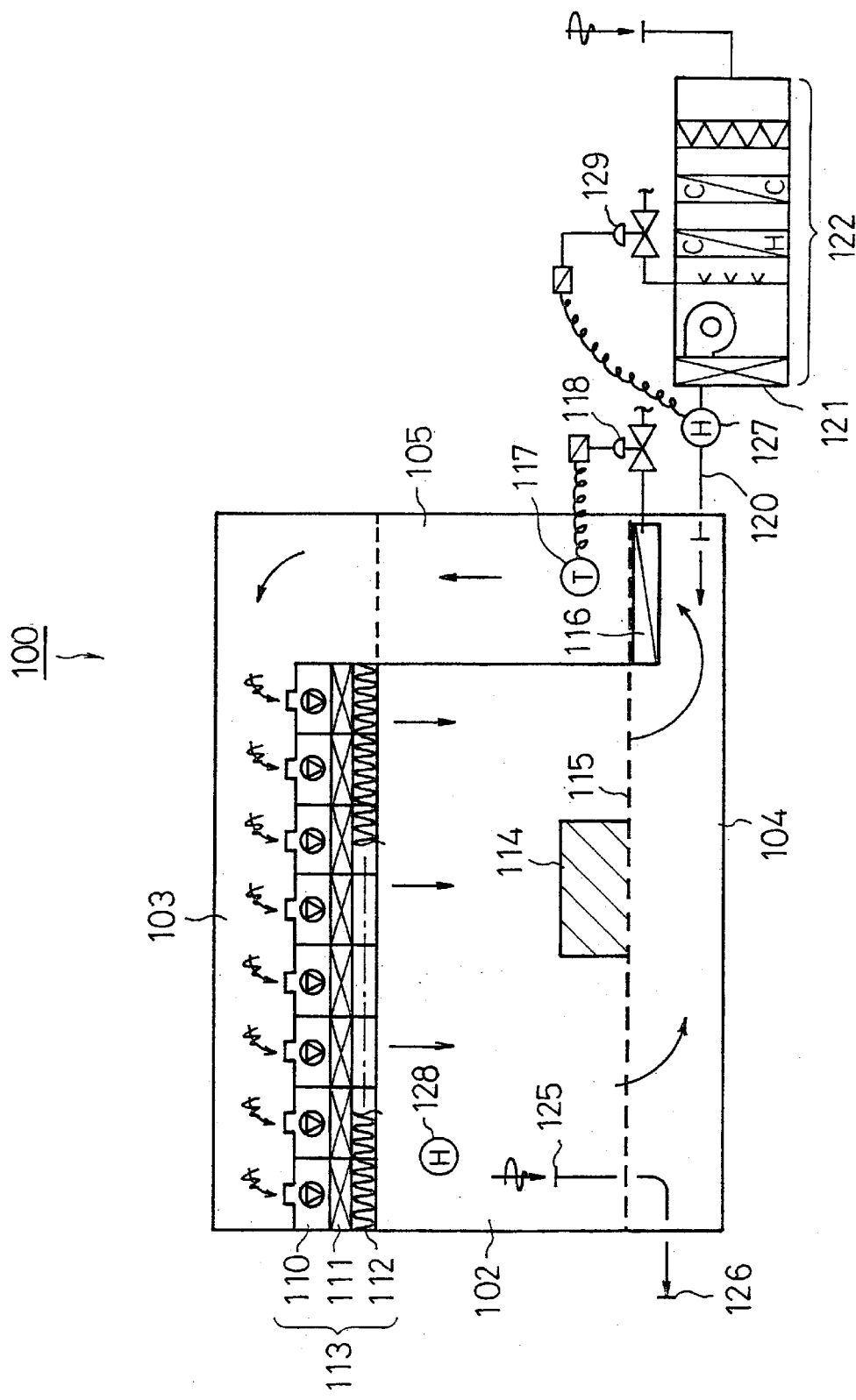
FIG. 16 is a schematic illustration for explaining a high efficiency air cleaning apparatus according to an embodiment of the invention.

FIG. 16 is a schematic illustration for explaining a high efficiency clean room 100 that is constructed according to an embodiment of the invention. Here, the clean room includes a clean room and a clean bench. The clean room 100 includes a working space 102 in which precise and delicate products such as LSI's and LCD's can be processed, a ceiling portion (supply plenum) 103 and an under-floor portion (return plenum) 104, which are respectively located at the top and bottom of the working space 102, and a return path 105 that is located on the side of the working space 102.

On the ceiling portion 103 is arranged a clean fan unit 113 which is provided with a fan unit 110, a filter 111 with good vent of the invention, and a particulate filter 112. A semiconductor manufacturing apparatus 114 is installed in the working space 102 and acts as a kind of a heat source. The under-floor portion 104 is partitioned off with grated panels 115 having a number of holes or perforations. A condensation coil of the non-dew type 116 is installed in the under-floor portion 104 in order to deal with the heat load caused by the semiconductor manufacturing apparatus 114. The non-dew type condensation coil 116 means an air cooler that enables the air to be cooled without causing any dew condensation on the surface of a heat exchanger. A temperature sensor 117 is set up in the return path 105 to detect the temperature therein. The flow regulating valve 118 of the non-dew type condensation coil 116 is controlled such that the temperature detected by the sensor 117 is kept at a predetermined level.

With operation of the fan unit 110 in the clean fan unit 113, the air in the clean room 100 begins to circulate at a properly regulated air flow rate in the following order, that is, ceiling portion 103—working space 102—under-floor portion 104—return path 105—ceiling portion 103. While the air is circulated through the clean room like this, the air is cooled by mean of the non-dew type condensation coil 116, and gaseous impurities and particulate impurities contained in the circulating air are removed by the filter 111 of the invention and particulate filter 112 which are provided in the clean fan unit 113, thereby the clean air having a suitably controlled temperature being continuously supplied to the working space 102.

The filter 111 of the invention is a filter that is formed in the same way as the filter 1 previously explained. Thus, the filter 111 includes the powder of the fraipontite mineral or includes a mixture of the powder of the fraipontite mineral and the powder of manganese oxide and/or permanganate. Therefore, the filter 111 can remove gaseous acid and basic impurities, and even gaseous organic impurities if any, contained in the air being circulated. This filter 111 may be constituted with incombustible materials except the case of using permanganate, and if the constituent of the filter 111 is treated by heat, desorption of gaseous organic impurities therefrom may be adequately suppressed to the acceptable level.

The particulate filter 112 is disposed downstream the filter 111 and removes particulate impurities. The outer frame and other constituents of the particulate filter 112 are made of only materials such as aluminum, ceramics, which cause no desorption of gaseous organic impurities.

The outdoor air is properly supplied to the under-floor portion 104 of the clean room 100 through an outdoor air introducing path 120, on the way of which a filter 121 of the invention is provided for removing gaseous impurities contained in the outdoor air as introduced. A unit type air conditioner 122 is disposed upstream the filter 121 for the purpose of removing dusts and airborne particulates in the introduced outdoor air and controlling the temperature and humidity of the outdoor air. A humidity sensor 127 is set up on the way of the outdoor air introducing path 120. A water supply pressure regulating valve 129, which is located in the humidity control portion of the unit type air conditioner 122, is controlled such that the humidity detected by the sensor 127 is kept at a preset value. On one hand, there is provided in the working space 102 another humidity sensor 128 for detecting the humidity of the atmosphere in the working space 102.

The outdoor air that is supplied to the under-floor portion 104 of the clean room 100 through the outdoor air introducing path 120, is led to the working space 102 via the return path 105 and the ceiling portion 103. The balance between the outdoor air volume introduced to the working space 102 and the air volume exhausted from the working space is suitably controlled, thereby keeping the inner pressure of the working space 102 at a preset value. The air of the working space 102 is exhausted from an exhaust opening 125 via a return gill 126.

The filter 111 of the invention includes no inflammable constituent except the case where permanganate is used. Therefore, the safety from the disaster prevention standpoint is remarkably improved even though the filter 111 is installed to cover the entire surface of the ceiling portion of the clean room as shown in FIG. 16, in comparison with the case where there is installed the conventional chemical filter, which employs the inflammable material such as activated charcoal and ion exchange fiber. Furthermore, if the filter 121 (FIG. 16) for cleaning the introduced outdoor air is constituted in the same way as the filter 111, the safety from the disaster prevention standpoint is further improved in comparison with case where there is used the conventional chemical filter which is constituted based on the inflammable material such as activated charcoal and ion exchange fiber.

In case of an ordinary particulate filter such as a medium efficiency air filter, a HEPA filter, and an ULPA filter, they generally use fibrous filter media containing a binder which includes some volatile organic substances, and also use a sealing material that is used for fixing the filter media to the filter frame and contains some volatile organic substances. Therefore, desorption of gaseous organic impurities is inevitable if they are used as they are. Accordingly, as to the particulate filter 112, it is most preferable to employ the filter media which includes no binder for use in the filter media. Should only the filter media including such binder be available, it is preferable to pretreat it by heat for driving out volatile organic substances therefrom before using it. Also, as to the sealing material for fixing the filter media to the filter frame, the same attention is to be paid in selection thereof. That is, it is preferable to select a sealing material that includes no volatile organic substance, or to employ such an air-tight pressure contact, which provides the seal between the filter media and the filter frame by means of a physical or mechanical means, instead of using a sealing material having the possibility of desorbing organic impurities.

Figure 17:
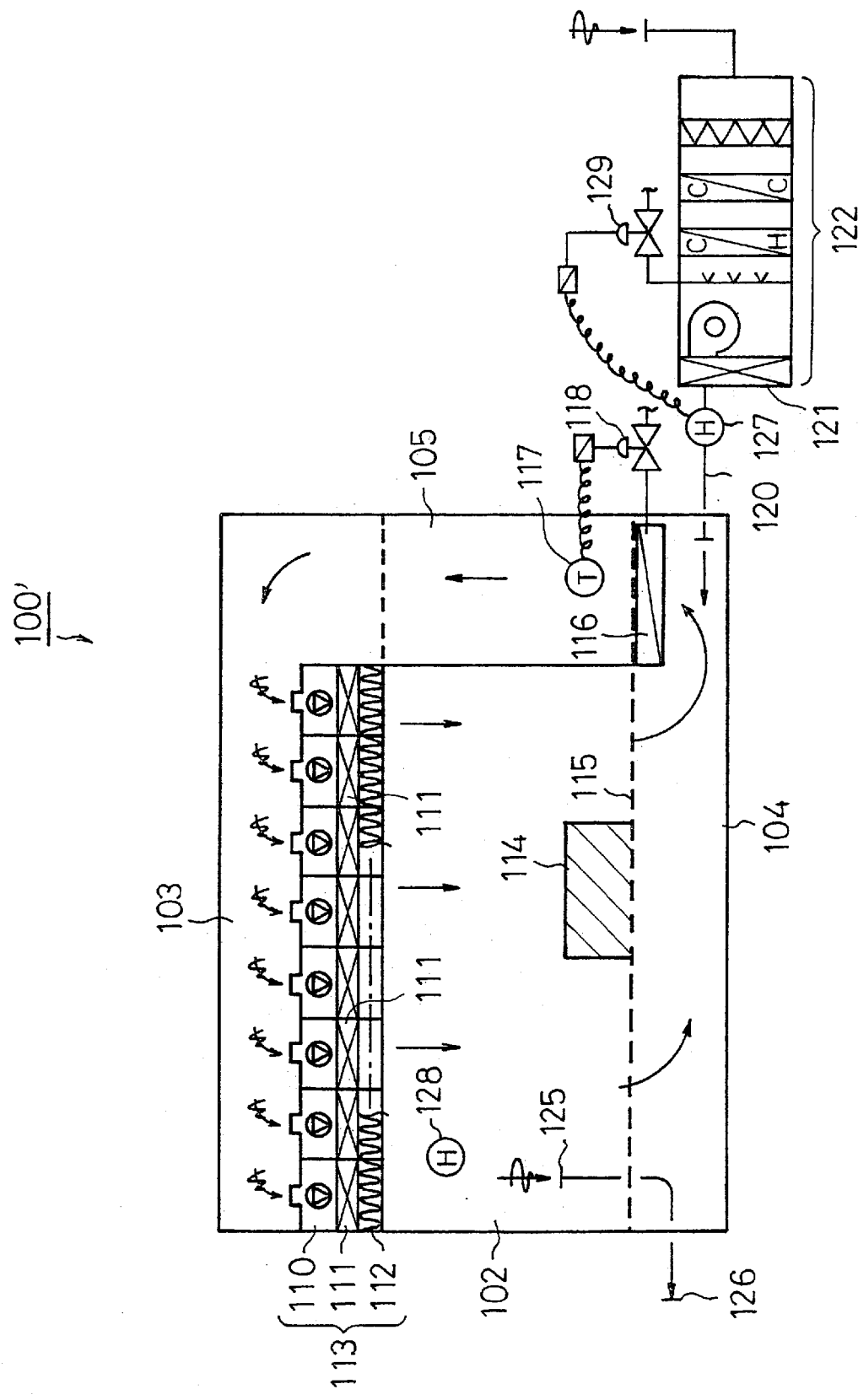
FIG. 17 is a schematic illustration for explaining a high efficiency air cleaning apparatus according to another embodiment of the invention.

FIG. 17 is a diagrammatic representation of a clean room 100' according to the other embodiment of the invention. The filter 111 used in this embodiment has a honeycomb structure that includes the powder of the fraipontite mineral or includes a mixture of the powder of the fraipontite mineral and the powder of manganese oxide and/or permanganate. In this example, however, the filter 111 is installed on the ceiling portion 103 of the clean room 100' to cover the ceiling portion 103 in part. Consequently, the number of filters as used in this example is reduced to a half of those which are used in the clean room 100 as shown in FIG. 16. Except the number of filters, there is no difference between both clean rooms 100 and 100' as shown in FIGS. 16 and 17. Therefore, identical parts of two clean rooms are designated with the same reference numerals, thus detailed explanation of the identical parts being not repeated.

Chemical contaminants to be removed by filtration are acid impurities, basic impurities, dopants, and organic impurities. A washing device, workers, and constitutional members of the clean room, which may exist in the clean room, more or less play a role of a gaseous impurity source inside the clean room. Also, even the outdoor air introduced to the clean room may play a role of an external contaminant source because of contaminants contained therein. Accordingly, the main role of the filter 111 is to remove gaseous contaminants generated in the clean room from the air circulating therethrough, thereby reducing the concentration of gaseous contaminants. On one hand, the role of the filter 121 disposed on the way of the outdoor air introducing path 120 is to remove gaseous contaminants contained in the outdoor air, thereby reducing the concentration of such gaseous contaminants in the clean room. When starting the operation of the clean room provided with the filter 111 and the filter 121, the initial concentration of chemical contaminants in the clean room shows a maximum value. However, it gradually goes down with the passage of time, due to removal of chemical contaminants from the circulating air, and finally it is stabilized when removal and generation of chemical contaminants come to equilibrium. Two of clean rooms 100 (FIG. 16) and 100' (FIG. 17) have a relation expressed as 2:1 with regard to the quantity of chemical contaminants which are removed by one cycle of the air circulation. In other words, the clean room 100' of which the ceiling portion is covered in part by the filter 111, takes a considerably longer time before its initial maximum contaminant concentration is gradually reduced and comes to equilibrium, in comparison with the clean room 100 of which the ceiling portion is entirely covered by the filter 111. Furthermore, in case of the clean room 100', the equilibrium concentration that it can reach finally, might become higher than that which the clean room 100 can achieve. However, in view of the initial cost for installation of the filter 111 and also the running cost, for instance the cost for periodical replacement of the filter 111, such filter arrangement as adopted in the clean room 100' as shown in FIG. 17 i.e. thinning-out installation of the filter would be not always a worthless matter, from the economical standpoint of view.

In the above, preferred embodiments of the invention has been discussed in terms of a clean room, in which all the processes for manufacturing semiconductor devices or LCD's can be carried out. However, the invention is not limited only to such a large scale cleaning apparatus. The invention is applicable to the air cleaning apparatus for use in a locally confined space, so-called, mini-environment, for instance a clean bench, a clean chamber, a storage means (stocker) for processing and/or storing clean products, etc. Also, the invention may be modified in compliance with various operational and environmental conditions such as an air volume to be cleaned, a ratio of the intake volume of the outdoor air to the air volume circulating through the clean room, generation of gaseous impurities inside the clean room, and so forth.

For instance, it is now expected that the manufacture of DRAM's of 256-megabyte and/or 1-gigabyte would start in 1999, using a gigantic silicon wafer with a diameter of 300 mm. In case of the apparatus used for manufacturing such a sophisticated semiconductor device, after introducing and setting the silicon wafer in a chemical reaction chamber of the apparatus, the inert gas such as highly purified nitrogen and argon is adequately supplied to the chemical reaction chamber from an inert gas source so as to fill it up therewith, before initiating predetermined various chemical reactions with the silicon wafer inside the apparatus. The inert gas itself is so highly purified that there is no possibility that it contaminates the surface of the silicon wafer. In order to control supply of such purified inert gas, however, a valve is provided between the chemical reaction chamber and the inert gas supplying source. Therefore, there is the possibility that the valve might work as a source of various chemical impurities. Accordingly, if the filter of the invention is provided on the way of the gas flow path i.e. between the valve and the chemical reaction chamber, it would remove various chemical contaminants which might be generated by the valve, thereby contributing to the prevention of the surface contamination and to improvement of product quality as well.

In the next, the function and effect of the filter according to the invention will be explained by way of some examples.

For comparatively studying the performance of different filters, the clean room air is filtered by using different kinds of filters, and cleanliness thereof is evaluated by measuring the change with the passage of time regarding the contact angle between a silicon dioxide film formed on a silicon wafer and a water droplet dropped thereon. To be more specifically, the clean room air to be evaluated is prepared according to four kinds of ways: at first prepared by filtering the clean room air, using two kinds of commercial chemical filters, one including the powder of activated charcoal impregnated with a chemical effective for removing gaseous inorganic impurities, and the other including fibrous activated charcoal also impregnated with solid chemical; secondly prepared by filtering the clean room air, using a chemical filter including ion exchange fiber; and thirdly prepared by filtering the clean room air, using the filter of the invention as shown in FIG. 3.

Figure 18:
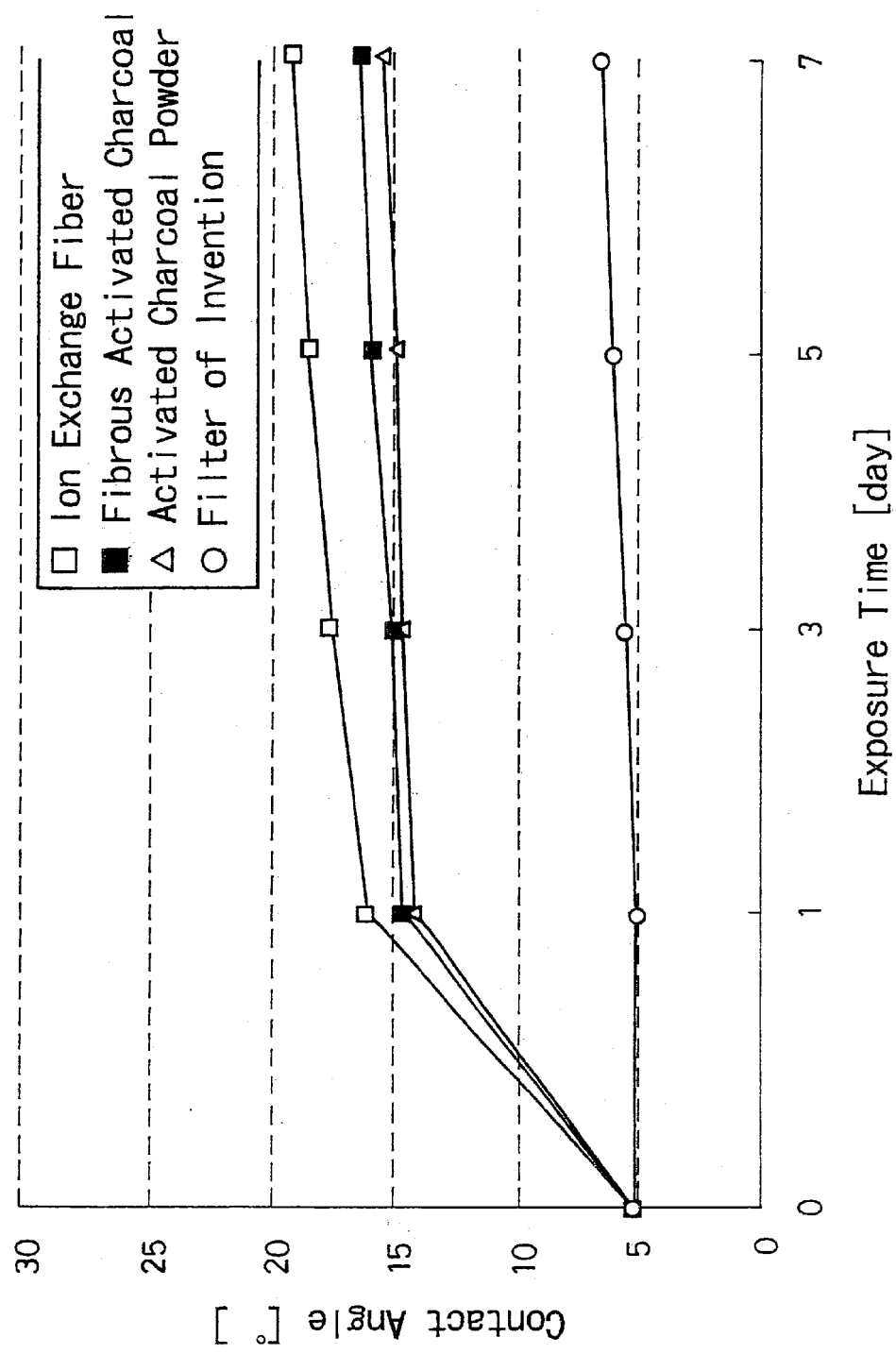
FIG. 18 is a graphical illustration showing the contact angle change with the passage of time with regard to a silicon wafer having a silicon dioxide surface when it is exposed to four kinds of clean room atmospheres i.e. the first and second atmospheres being respectively filtered by two different kinds of commercial activated charcoal filters, the third being filtered by a chemical filter using ion exchange fiber, and the fourth being filtered by a filter according to the invention.
Figure 19:
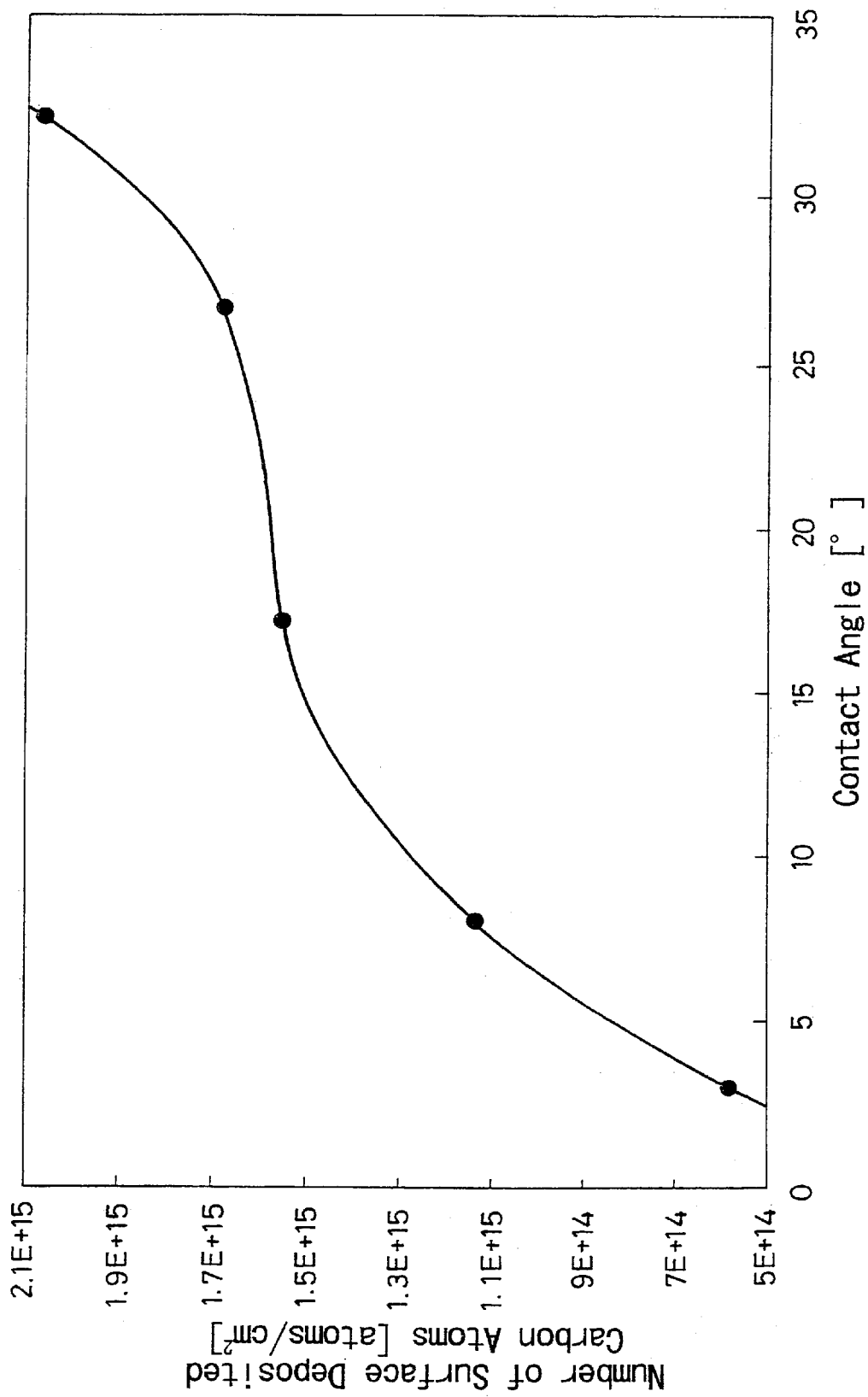
FIG. 19 is a graphical illustration showing a correlation between the contact angle measured by a method of dropping ultra pure water droplet and the surface contamination by organic substances measured by the X-ray photo electron spectroscopy (XPS), with regard to the glass substrate exposed to the clean room atmosphere.

FIG. 18 is a graphical illustration showing the results of the above evaluation on cleanliness of the clean room air. The contact angle is measured by dropping a pure water droplet on the substrate surface. This contact angle may be used as an index, by which the degree of organic contamination of the substrate surface can be determined with ease. If the silicon dioxide film and a glass plate are made free from any organic contaminant immediately after rinsing them, their surfaces have affinity for water. In other words, they become hydrophilic, thus making a small contact angle. Contrary to this, if their surfaces are once contaminated with organic substances, they come to shed water well. In other words, they become hydrophobic, thus making a large contact angle. When leaving a glass plate in the clean room air and measuring a contact angle between its surface and a very much purified water droplet dropped thereon with the passage of time, it is known that there exists a certain mutual relation as shown in FIG. 19 between the contact angle measured by water droplet method and the degree of surface contamination measured by the XPS (X-ray photoelectron spectroscopy) method. With regard to the silicon dioxide film formed on a silicon wafer, almost similar mutual relation exists between the contact angle and the surface contamination by organic impurities. Like this, there exists a very strong mutual relation between the water contact angle on the substrate surface and the surface contamination by the organic substance.

The following can be read from the measurement results as shown in FIG. 18. The ion exchange fiber is primarily used for adsorbing and removing water-soluble inorganic impurities, so that it can not adsorb any organic substance. What is worse, it even desorbs gaseous organic substances by itself. Consequently, when leaving a test piece (silicon wafer covered with a silicon dioxide film) all day long in the clean room air that is filtered by the ion exchange fiber filter, the contact angle is increased by about 10°. Two kinds of activated charcoal filters are used for primarily preventing the contamination by gaseous inorganic impurities, so that they also fail to adsorb organic substances contained in the object air. What is worse again, the activated charcoal filter even desorbs gaseous organic substances by itself. Therefore, the contact angle is increased by about 10° when leaving the test piece in the clean room air filtered thereby for only one day. On one hand, almost nothing happens about the contact angle after keeping the test piece all day long in the clean room air filtered by the filter of the invention as shown in FIG. 3. This means that the gaseous organic substance contained in the object air is adsorbed and removed by the filter of the invention, and also that the filter desorbs no gaseous organic substance by itself.

In case of the activated charcoal filter, gaseous organic impurities would be possibly desorbed from its constituent materials such as a filter media, an adhesive for fixing activated charcoal to the filter media sheet, a sealing material for fixing the filter media to the frame. On one hand, in case of the ion exchange fiber filter, gaseous organic impurities would be possibly desorbed from various additives included in the high-molecular fiber forming the filter. Thus, these gaseous organic impurities are easily mixed up with the air once cleaned by passing through the chemical filter. Furthermore, in case of the ion exchange fiber filter, it sometimes happens that a part of the ion exchange base is desorbed in the form of sulfonic acid, calboxylic acid, phosphoric acid, ammonium, or amine. In short, these prior art chemical filters allow desorption of gaseous organic impurities, so that such impurities are mixed up with the air once cleaned by the filter, even if such prior art filters succeed in removal of the acid or basic impurities of ppb order as well as dopants of ppt order while the clean room air passes through them. Therefore, there is possibility that the prior art chemical filter might even increase the concentration of gaseous organic impurities in the clean room air.

Performance of two kinds of filters according to the invention, one including a honeycomb structure (a) (referred to as "filter (a)" hereinafter) and the other including a honeycomb structure (b) (referred to as "filter (b)" hereinafter), which will be described later, is evaluated by having them filtered the clean room air containing HCl, $NH_3$, DOP, and decamethyl cyclopenta siloxane ($D_5$), each of which has a different concentration in the range of several hundred ppt to several ppb. The protection efficiency against HCl and $NH_3$ of each filter is evaluated based on the measurement of their concentration on both upstream and downstream sides of the honeycomb structure with the help of an ion chromatograph (IC). The protection efficiency against organic surface contaminants of each filter is also evaluated based on the measurement of the quantity of DOP and $D_5$ deposited on the surface of a silicon wafer, which is placed one each on both upstream and downstream sides of the honeycomb structure. Furthermore, the concentration of airborne particulates (the number of particulates with a diameter of 0.1 micrometers or more contained in the air of 1 ft$^3$) is measured on the downstream side of the honeycomb structure, wherein the number of airborne particulates is 10/ft$^3$ on the upstream side of the honeycomb structure. Table 2 indicates the results obtained by the above-mentioned measurements.

TABLE 2

| Contaminant | | Filter (a) | Filter (b) |
| --- | --- | --- | --- |
| Protection | HCl | 95% | 96% |
| Efficiency | $NH_3$ | 93% | 95% |
| Surface | DOP | ≧99% | 80% |
| Protection | $D_5$ | 90% | 50% |
| Conc. of Particulate on | | 10/ft$^3$ | 100/ft$^3$ |

TABLE 2-continued

| Contaminant | Filter (a) | Filter (b) |
| --- | --- | --- |
| Downstream Side: Particulate (≧0.1 micrometers) | | |

For evaluating the surface contamination, a p-type silicon wafer with a diameter of 4-inch is used as a test piece for measuring the quantity of organic surface contaminants deposited thereon. The test piece is rinsed, dried, and then exposed to the object air on both upstream and downstream sides of the filter. Measurement and analysis of organic contaminants deposited on the test piece are carried out by means of an elevated temperature gas desorption device and GC-MS (a gas chromatograph mass spectrometer) in combination. The protection efficiency against the surface contaminants of the filter is determined by means of the gas chromatograph as follows.

The protection efficiency=$(1-(B/A))\times100(\%)$ where
A: Area of the organic contaminant peak detected on the test piece surface placed on the upstream side of the filter, and
B: Area of the organic contaminant peak detected on the test piece surface placed on the downstream side of the filter.

Two kinds of filters (a) and (b) in this embodiment are respectively provided with the porous honeycomb structure as shown in FIG. 3. To be more specifically, this structure is formed by alternately stacking a plurality of corrugated sheets 10 and thin flat sheets 11. The filter has a depth of 10 cm along the direction of the air flow. The air passed through the filter at a face velocity of 0.6 m/sec, and the total effective sheet area per unit filter volume capable of acting on the air that passes through the filter (i.e. effective filtration area) is 3000 m$^2$/m$^3$.

The filter (a) has the first and second inorganic material layers on the surface of its porous honeycomb structure. The first inorganic material layer is formed by immersing the porous honeycomb structure in a suspension and then drying it, the suspension containing the powder of synthetic fraipontite crystallite (shape: circular, thickness: several tens angstroms, diameter: 100 angstroms to 1 micrometer), the powder of kaolinite (size: 3 micrometers) as an inorganic binder, and silica sol as an inorganic adhesion assisting agent. The second inorganic material layer is formed by immersing the above porous honeycomb structure already having the first inorganic material layer in another suspension and then drying it, the suspension containing the powder of acid-treated montmorillonite (activated clay) (size: 3 micrometers, effective pore diameter: 20 to 1000 angstroms), and silica sol as an inorganic adhesion assisting agent. The first inorganic material layer is formed to have a thickness of 100 micrometers, in which the weight ratio of its components is fraipontite mineral:kaolinite:silica= 70%:25%:5%. The second adsorption layer is formed to have a thickness of 10 micrometers, in which the weight ratio of its components is acid-treated montmorillonite:silica=87%:13%. The weight of an entire filter is 230 g/lit., and the weight of two inorganic material layers is 90 g/lit., thus the weight of two inorganic material layers corresponding to 39% of the entire filter weight.

The filter (b) also has an inorganic material layer on the surface of its porous honeycomb structure. This inorganic material layer is formed by immersing the honeycomb structure in a suspension and then drying it, the suspension containing the powder of the above-mentioned synthetic fraipontite mineral, the powder of kaolinite (size: 3 micrometers) as an inorganic binder, and silica sol as an inorganic adhesion assisting agent. Kaolinite used in the filter (b) has no other major effective pore than air permeable pores having a diameter of 1000 angstroms or more, so that it scarcely exhibits the physical adsorption function. On one hand, activated clay as used in the filter (a) has pores, of which the major effective pore diameter distributes in the range of 20 to 1000 angstroms, so that they may exhibit the physical adsorption function that is never inferior to that of activated charcoal.

Difference between filters (a) and (b) is only one point that the filter (b) is provided with nothing equivalent to the second inorganic material layer (activated clay layer) of the filter (a). As will be apparent from Table 2, regarding removal of gaseous HCl and $NH_3$, only the first inorganic material layer effectively works thereon, so that presence of the second inorganic material layer hardly influences the protection efficiency against gaseous HCl and $NH_3$. However, when it comes to protection of the substrate surface from DOP and decamethyl cyclopenta siloxane ($D_5$), which are the majority of organic contaminants detected on the test piece surface, the protection efficiency is remarkably changed depending on whether there is provided or not the second inorganic material layer having the excellent physical adsorption function. In short, the filter (a) can remove not only gaseous inorganic impurities but also the gaseous organic impurities at a time.

Table 3 comparatively shows the performance of various filters, which are manufactured according to the invention.

TABLE 3

| Gaseous Impurity | A | B | C | D | E | F |
|---|---|---|---|---|---|---|
| HCl | 96% | 95% | 94% | 93% | 96% | 95% |
| $NH_3$ | 95% | 93% | 92% | 91% | 95% | 93% |
| DOP | 80% | ≧99% | 98% | ≧99% | 98% | ≧99% |
| $D_5$ | 50% | 90% | 88% | 92% | 85% | 90% |

In the above Table 3, a mark "A" indicates a filter including a honeycomb structure that is provided on its surface with an inorganic material layer. This inorganic material layer is formed by fixing a mixture to the honeycomb structure surface, the mixture consisting of the powder of the fraipontite mineral, the powder of kaolinite as a binder, and alumina sol as an inorganic adhesion assisting agent.

A mark "B" stands for a filter of which the honeycomb structure is provided on its surface with an inorganic material layer. The inorganic material layer is formed by fixing a mixture to the honeycomb structure surface, the mixture consisting of the powder of the fraipontite mineral, the powder of acid-treated montmorillonite (activated clay) as a binder, and alumina sol as an inorganic adhesion assisting agent. A mark "C" represents a filter of which the honeycomb structure is provided on its surface with two inorganic material layers. The first inorganic material layer is formed in the same way as that of the honeycomb structure of the filter A, while the second one is formed by additionally fixing the powder of acid-treated montmorillonite to the first inorganic material layer. A mark "D" indicates a filter of which the honeycomb structure is provided on its surface with two inorganic material layers. The first inorganic material layer is formed in the same way as that of the honey-comb structure in the filter B, while the second one is formed by additionally fixing the powder of acid-treated montmorillonite to the first inorganic material layer. A mark "E" stands for a filter of which the honeycomb structure is provided on its surface with two inorganic material layers. The first inorganic material layer is formed by fixing the powder of acid-treated montmorillonite to the honeycomb structure surface, while the second one is formed by additionally fixing a mixture to the first inorganic material layer, the mixture consisting of the powder of the fraipontite mineral, the powder of kaolinite as a binder, and alumina sol as an inorganic adhesion assisting agent. In short, the order of forming the inorganic material layer of the filter E is made just opposite to the order in case of the filter C. A mark "F" is a filter of which the honeycomb structure is provided on its surface with two inorganic material layers. The first inorganic material layer is formed by fixing the powder of acid-treated montmorillonite to the honeycomb structure surface, while the second one is formed by additionally fixing a mixture to the first inorganic material layer, the mixture consisting of the powder of the fraipontite mineral, the powder of acid-treated montmorillonite as a binder, and alumina sol as an inorganic adhesion assisting agent. In short, the order of forming the inorganic material layer of this filter F is made just opposite to the order in case of the filter D.

Figure 20:
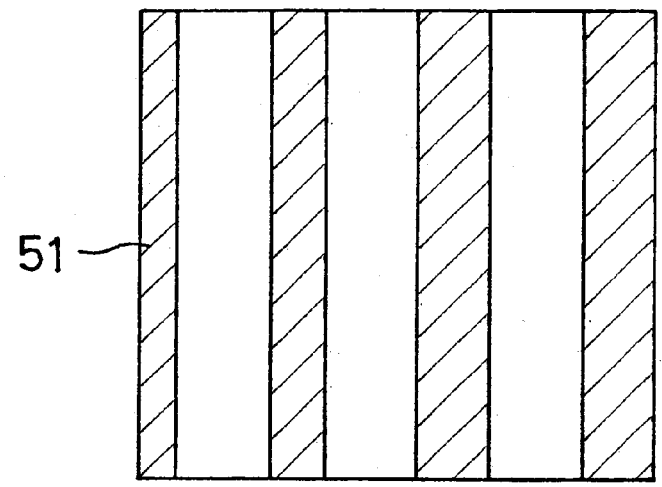
FIG. 20 is a structural view in section of an inorganic material layer according to the embodiment A of the invention.
Figure 21:
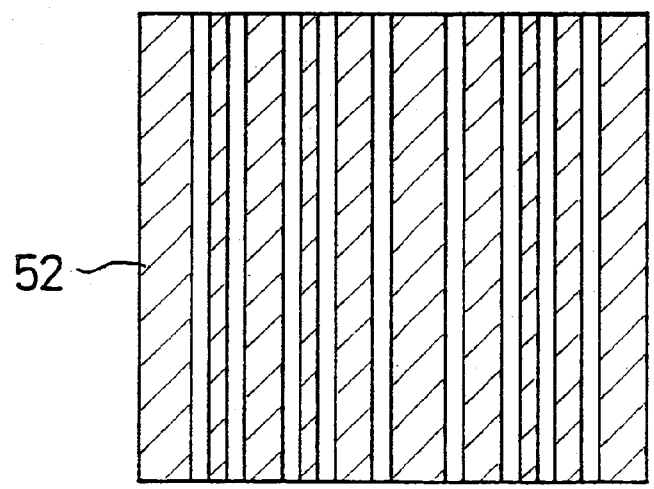
FIG. 21 is a structural view in section of an inorganic material layer according to the embodiment B of the invention.
Figure 22:
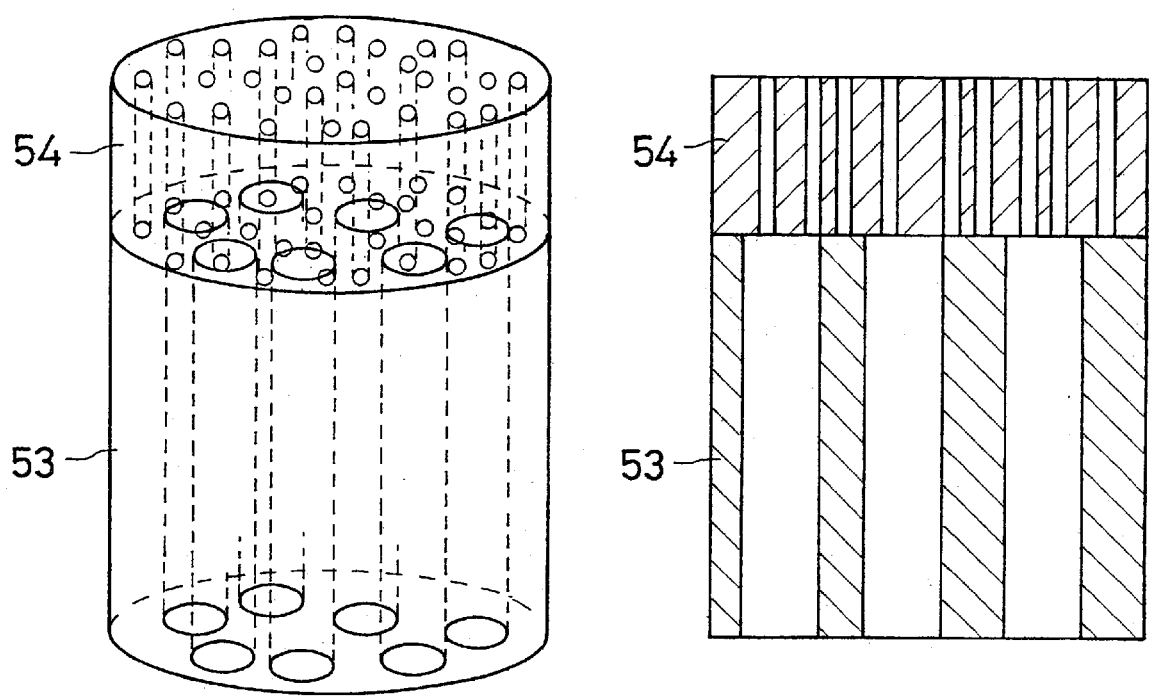
FIG. 22 is a perspective view of a model of first and second inorganic material layers and a structural view in section of the same according to the embodiment C of the invention.

FIGS. 20 through 25 are enlarged structural views in section of inorganic material layers which are formed with respect to the above-mentioned filters A through F. In these figures, FIG. 22 representatively includes a perspective view of a model of first and second inorganic material layers, for better understanding of the structure thereof. To be more specifically, each cross sectional view of the inorganic material layer corresponds to a sectional view of the inorganic material layer in the shape of a cylinder, which is partly cut out from such an inorganic material layer as shown in FIG. 6 or 9 in such a manner that the height of the cylinder corresponds to the thickness of the inorganic material layer. Each figure also conceptually illustrates the state of various pores distributed in the cylindrical inorganic material layer, namely micropores and mesopores capable of physically adsorbing gaseous organic impurities are indicated by thinner openings, while macropores which can hardly perform physical adsorption of such gaseous impurities, are indicated by thicker openings.

Figure 23:
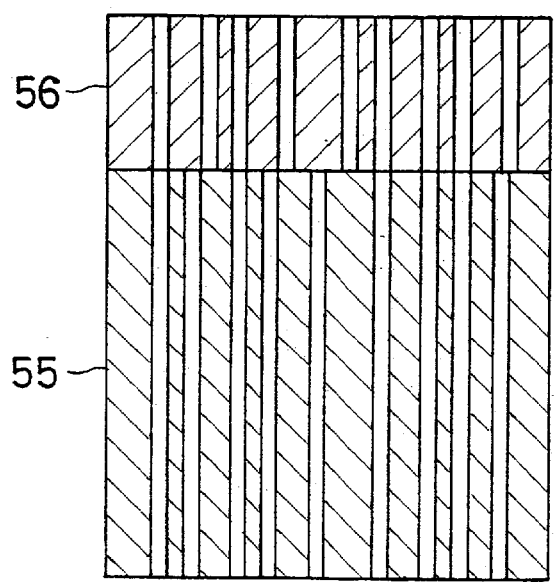
FIG. 23 is a structural view of first and second inorganic material layers in section according to the embodiment D of the invention.
Figure 24:
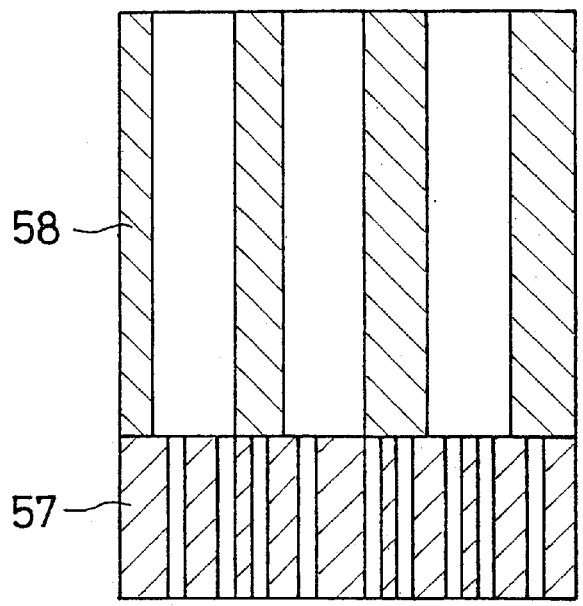
FIG. 24 is a structural view of first and second inorganic material layers in section according to the embodiment E of the invention.
Figure 25:
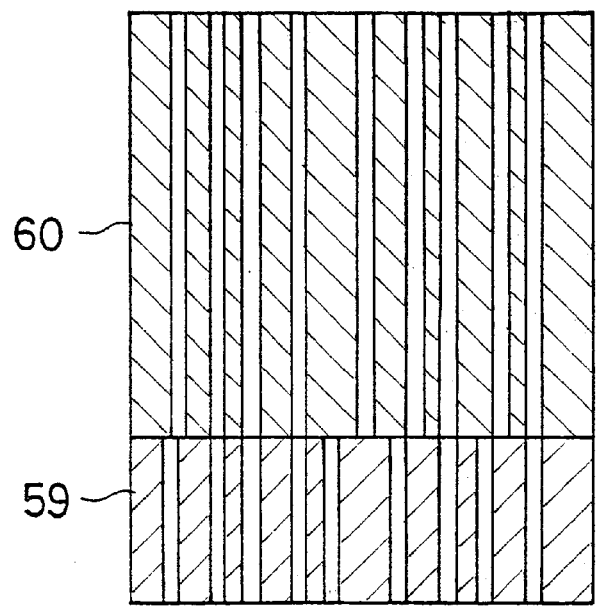
FIG. 25 is a structural view of first and second inorganic material layers in section according to the embodiment F of the invention.

In case of the filter A, as shown in FIG. 20, its inorganic material layer 51 including the powder of the fraipontite mineral has no other effective pore than air permeable pores having a size of 1000 angstroms or more, so that it hardly exhibits the function of physically adsorbing gaseous organic impurities. In case of the filter B, as shown in FIG. 21, its inorganic material layer 52 including the powder of the fraipontite mineral and the powder of acid-treated montmorillonite exhibits the function of physically adsorbing gaseous organic impurities because the particulate of acid-treated montmorillonite has on its surface pores having a size of 15 through 300 angstroms. In case of the filter C as shown in FIG. 22, its first inorganic material layer 53 including the powder of the fraipontite mineral has no other major effective pore than the air permeable pore having a size of 1000 angstroms or more, so that it hardly exhibits the function of physically adsorbing gaseous organic impurities. However, its second inorganic material layer 54 having no fraipontite mineral powder includes the powder of acid-treated montmorillonite, of which the particulate has on its surface pores in the pore diameter range of about 15 to 300 angstroms, thus the powder of acid-treated montmorillonite exhibiting the function of physically adsorbing gaseous organic impurities. In case of the filter D, as shown in FIG. 23, its first and second inorganic material layers 55 and 56 without include the powder of acid-treated montmorillonite, thus both of them exhibiting the function of physically adsorbing gaseous organic impurities. In case of the filter E, as shown in FIG. 24, its first inorganic material layer 57 having no fraipontite mineral powder includes the powder of acid-treated montmorillonite, thus having the function of physically adsorbing gaseous organic impurities. However, its second inorganic material layer 58 includes only the powder of the fraipontite mineral has no other effective pore than the air permeable pore having a size of 1000 angstroms or more, so that it hardly exhibits the function of physically adsorbing gaseous organic impurities. In case of the filter 1, as shown in FIG. 25, its first inorganic material layers 59 does not include the powder of the fraipontite mineral while the second inorganic material layers 60 includes the same. However, the powder of acid-treated montmorillonite is included in both material layers, thus they exhibiting the function of physically adsorbing gaseous organic impurities because of pores which are in the pore diameter range of about 15 to 300 angstroms and exist on the surface of the acid-treated montmorillonite particulate.

The protection efficiency against gaseous inorganic impurities and also the protection efficiency against surface contamination of gaseous organic impurities are examined with respect to each of the above-mentioned filters. All of the above-mentioned filters excellently performed in adsorption of gaseous inorganic impurities such as HCl and $NH_3$. However, with regard to the performance of adsorbing gaseous organic impurities such as DOP and decamethyl cyclopenta siloxane ($D_5$), the filter A is specially inferior to the others, and filters B through F are excellent in adsorbing such impurities. The reason that the filter A is inferior to the others exists in the inorganic material layer 51 which has no other major effective pore than the air permeable pore having a size of 1000 angstroms or more, thus hardly having the function of physically adsorbing gaseous organic impurities. Each of the other filters is provided with the inorganic material layer which includes the pore in the pore diameter range of about 15 to 300 angstroms, which is suitable for adsorbing gaseous organic impurities, thus being able to adsorb such impurities.

Needless to say, the object gas to be cleaned by the filter of the invention is not limited to only the air. The filter of the invention is applicable to other inert gases such as nitrogen gas and argon gas, which are preferably used in the manufacture of semiconductor devices and LCD's as well.

Two kinds of filters X and Y according to the invention are tested in order to evaluate respective protection efficiency thereof. The test gas is the clean room air containing hydrogen chloride gas of 50 vol ppb and gaseous boric compound of 80 $ng/m^3$ (weight concentration of boron B). The honeycomb structure of the filter X has the first inorganic material layer (the first adsorption layer) that is formed by fixing the powder of the fraipontite mineral to the honeycomb structure surface with a silica sol as a binder. The honeycomb structure of the filter Y has a double inorganic material layer, which includes the first adsorption layer similar to that of the filter X, and the second one (the second adsorption layer) that is formed by additionally fixing the powder of silica gel to the surface of the first adsorption layer. Both of honeycomb structures are formed of ceramic fiber that is made of alumina and silic acid. The first adsorption layer of each honeycomb structure is formed by immersing the honeycomb structure in a suspension in which the powder of the fraipontite mineral and an inorganic binder are dispersed, and then drying it. The second adsorption layer of the honeycomb structure for use in the filter Y is formed by immersing the honeycomb structure already having the first adsorption layer in a suspension in which the powder of silica gel is dispersed, and then drying it. Table 4 indicates constitution of these filters X and Y.

TABLE 4

| Filter | Filter X | Filter Y |
| --- | --- | --- |
| Nos. of Adsorption Layer | 1st layer | 1st & 2nd Layers |
| Vol. Density of Honeycomb | 0.16 $g/cm^3$ | 0.18 $g/cm^3$ |
| Constituent | Weight Ratio of Honeycomb Structure | |
| Honeycomb w/o Adsorption Layer | 48% (wt.) | 43% (wt.) |
| Fraipontite Clay Mineral Layer | 35% (wt.) | 32% (wt.) |
| 1st Adsorption Layer (Silica Sol) | 17% (wt.) | 15% (wt.) |
| 2nd Adsorption Layer (Silica Gel) | — | 10% (wt.) |

Figure 26:
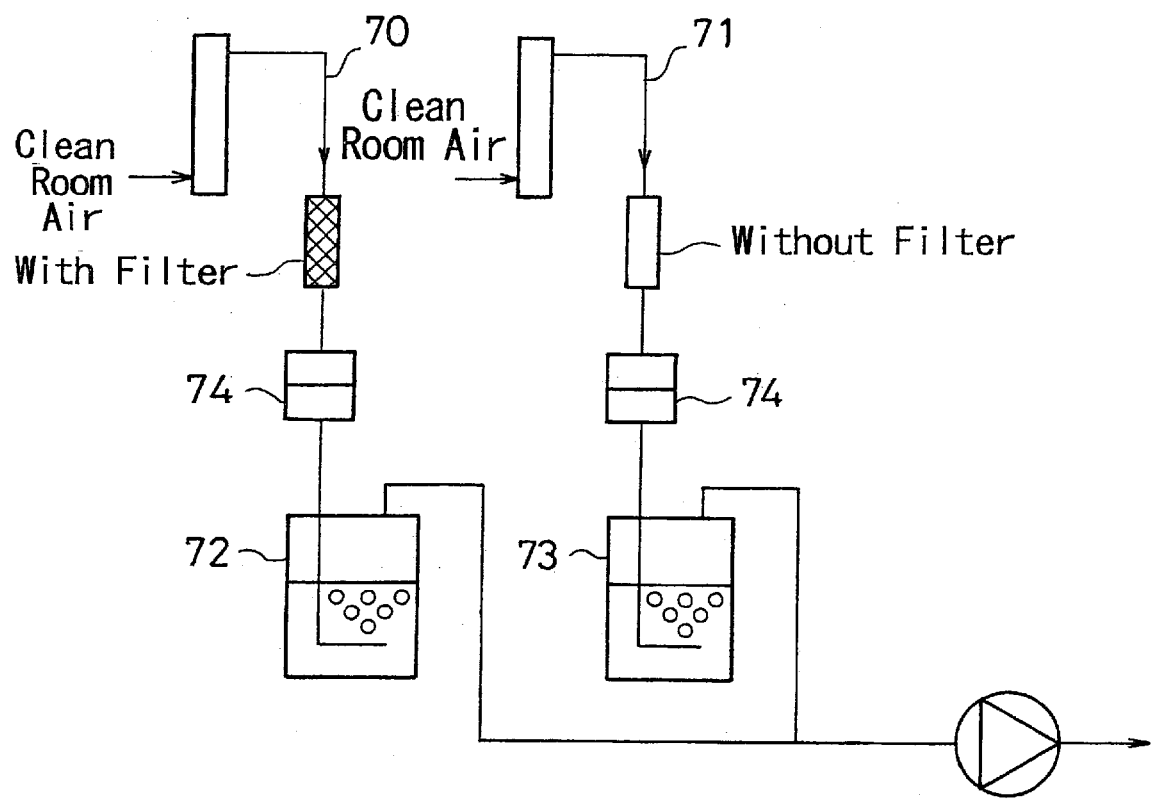
FIG. 26 is a circuit block diagram for measuring the protection efficiency against a hydrogen chloride gas and gaseous boric compounds.

Now, referring to FIG. 26 showing a test circuit which consists of two circuits 70 and 71 for evaluating the protection efficiency of the filter, the circuit 70 includes an object filter to be evaluated while the circuit 71 does not. The circuit 70 is provided with a bubble container 72 filled with ultra-pure water while the circuit 71 is provided with another bubble container 73 also filled with the same quality ultra-pure water as the above. Both of circuits 70 and 71 includes a particulate filter 74 made of polytetrafluoroethylene (trade name: Teflon) which causes no desorption of any gaseous boric compound. The above-mentioned test gas i.e. the clean room air respectively introduced to circuits 70 and 71, flows through bubble container 72 and 73 causing bubbles therein, during which hydrogen chloride gas and gaseous boric compound are captured. The concentration of the boron captured in ultra-pure water is measured by the Inductively Coupled Radio Frequency Plasma-Mass Spectrometry (ICP-MS). The protection efficiency of the object filter is determined by comparing the quantity of hydrogen chloride gas and gaseous boric compound contained in the clean room air after passing through the circuit 70, with the quantity of the same contained in the clean room air after passing through the circuit 71.

The above-mentioned filters X and Y are tested with the test circuit as arranged in the above under the following test conditions, which are:

Size of honeycomb structure: 7.5 mm(W)×7.5 mm(H)×50 mm(D)

Flow rate of the test gas: 4.1 lit/min

Face velocity: 1.2 m/s

Air Sampling duration: 5 days

Figure 27:
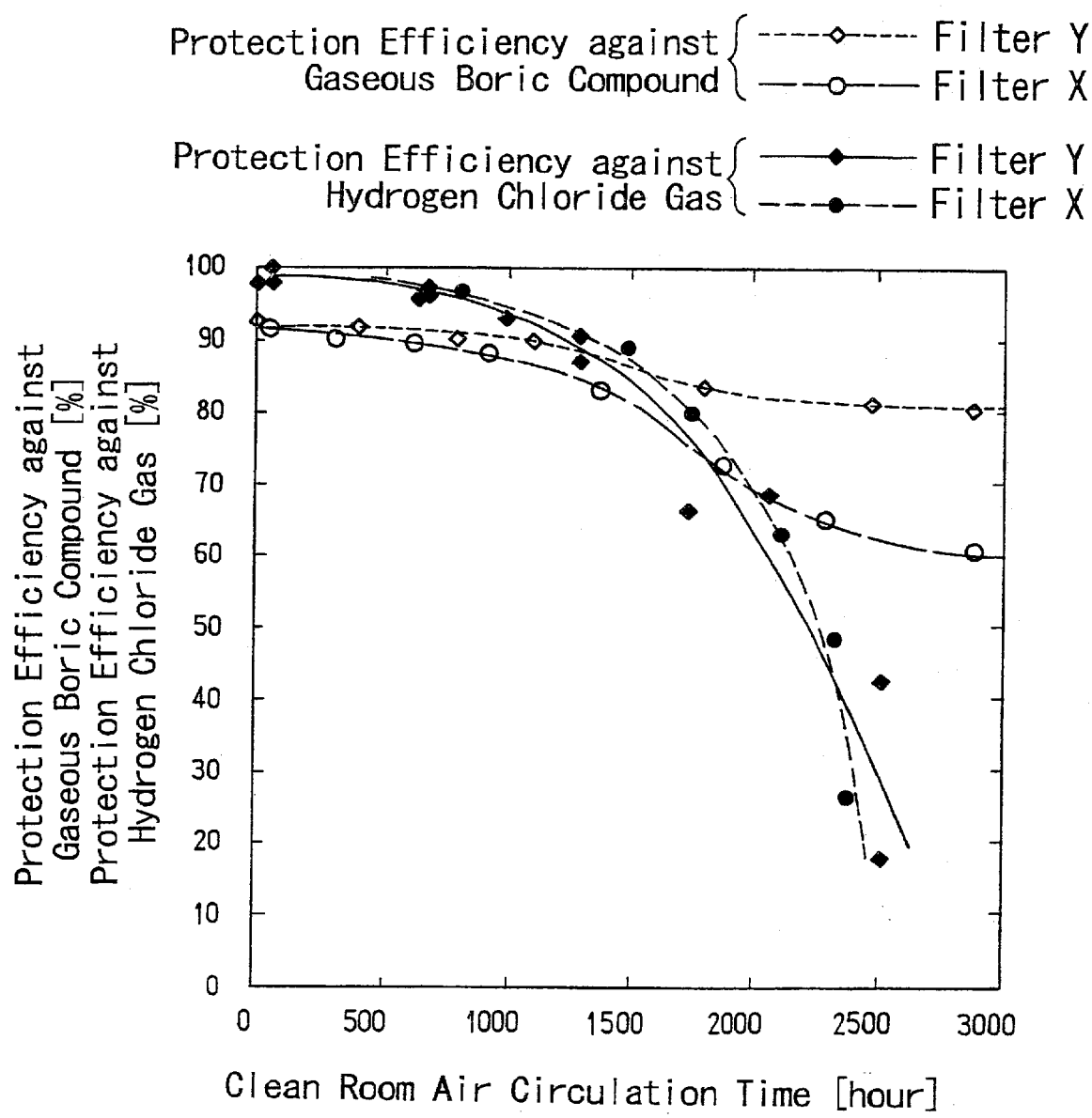
FIG. 27 is an comparative graphical illustration of the protection efficiency of filters X and Y against a hydrogen chloride gas and gaseous boric compounds.

FIG. 27 is a graphical illustration showing the change with the passage of time with regard to the protection efficiency of two filters X and Y when filtering hydrogen chloride gas and gaseous boric compound thereby. Two filters X and Y indicate not so remarkable difference with regard to their protection efficiency against hydrogen chloride gas until all the metal components (zinc or magnesium) contained in the fraipontite mineral are thoroughly spent for chemical reaction with hydrogen chloride gas, in other words, until the fraipontite mineral completely loses its adsorptive function. With regard to the protection efficiency against the boric compound, the filter Y is apparently more excellent than the filter X in view of their protection efficiency change with the passage of time. This is because the filter Y includes silica that exhibits strong affinity for the gaseous boric compound, in both of its first and second adsorption layers, so that the filter Y includes much silica in total than the filter X. Accordingly, it will be understood that the filter Y including silica in both of its two adsorption layers can act on gaseous boric compound for a relatively longer time.

In the next, the function and effect of the clean room according to the invention will be explained by way of an embodiment according to the invention.

First of all, there is prepared the clean room 100 as shown in FIG. 16, which is provided with the filter 111 (i.e. the filter 1 as shown in FIG. 3) according to the invention. The filter 111 includes the supporter (honeycomb structure), which is provided with the inorganic material layer that is formed by fixing a mixture of the powder of the fraipontite mineral and the powder of the inorganic binder to the surface thereof. Therefore, the filter 111 may remove gaseous inorganic impurities and gaseous organic impurities as well. The clean room is designed such that the object air is circulated through the clean room 100 at a rate of 5000 m$^3$/min. The quantity of the powder of the fraipontite mineral as the adsorbent is 500 Kg for dealing with the object air circulating at a rate of 5000 m$^3$/min, in other words, 0.1 Kg at a rate of 1 m$^3$/min. Two sorts of gas analyzers are arranged inside the clean room, one for measuring the concentration of HCl gas and the other for measuring the concentration of NH$_3$ gas. The concentration of these two gases contained in the clean room air is repeatedly measured every one month. Furthermore, the contact angle is measured using a test piece, which is a silicon wafer substrate covered with a silicon dioxide film free from any organic contaminant deposited thereon. The measurement is carried out by leaving the test piece in the clean room and exposing it to the objective clean room air for a predetermined period of time. More specifically, the contact angle is measured immediately after rinsing the test piece, and also measured after exposing it to the clean room air for 12 hours, thereby determining increase in the contact angle caused by the 12-hour exposure. This 12-hour exposure and measurement cycle i.e. rinsing→measurement of contact angle→12-hour exposure→measurement of contact angle, is repeated every one month. The contact angle is 3° at the measurement immediately after rinsing the test piece.

In the next, another measurement is carried out by substituting the filter 111 for three kinds of prior art chemical filters, namely the filter being formed by fixing fibrous activated charcoal to the nonwoven fabric supporter made of polyester, using a proper binder, the second one being formed by fixing activated charcoal particles to the supporter made of the air permeable urethane foam, using a proper binder, and the third one being formed by fixing ion exchange fiber to the supporter made of polyester, using a proper binder. The measurement is carried out in the same way as mentioned above. That is, the concentration of HCl and NH$_3$ gases contained in the clean room air is repeatedly measured every one month. The contact angle is measured using a test piece, which is a silicon wafer substrate covered with the silicon dioxide film free from any organic contaminant deposited thereon. The measurement is carried out immediately after rinsing the test piece, and also after exposing it to the clean room air for 12 hours, thereby determining increase in the contact angle caused by the 12-hour exposure. This 12-hour exposure and measurement cycle i.e. rinsing—measurement of contact angle—12-hour exposure—measurement of contact angle, is repeated every one month. The quantity of each adsorbent i.e. fibrous activated charcoal, activated charcoal particles, and ion exchange fiber, is made equal to the case of the filter 111 i.e. 0.1 Kg at an air flow rate of 1 m$^3$/min.

Furthermore, the concentration of HCl and NH$_3$ gases and the contact angle are measured with regard to the clean room that is provided with neither the filter 111 nor the prior art chemical filter as described above.

The concentration of HCl gas is in the range of 0.5 to 0.9 ppb in the clean room which is provided with neither the filter 111 nor the prior art chemical filter. On one hand, the concentration of HCl gas is kept in the range of 0.03 to 0.05 ppb while the clean room provided with either the filter 111 or the prior art chemical filter is operated for one year. However, the concentration of HCl gas exceeded 0.05 ppb after the passage of one year, due to the decrease in the adsorption function of the filter.

The concentration of NH$_3$ gas is in the range of 5 to 10 ppb in the clean room which is provided with neither the filter 111 nor the prior art chemical filter. On one hand, the concentration of NH$_3$ gas is kept in the range of 0.5 to 1.0 ppb while the clean room provided with either the filter 111 or the prior art chemical filter is operated for one year. However, the concentration of NH$_3$ gas exceeded 1.0 ppb after the passage of one year, due to the decrease in the adsorption function of the filter.

For comparatively studying the change with the passage of time with regard to the contact angle, the test piece is exposed to the air circulating through three kinds of clean rooms as described above, namely the first one being provided with the filter 111 including the powder of the fraipontite mineral, the second one being provided with the prior art chemical filter, and the third one being provided with neither the filter 111 nor the prior art chemical filter. The test is carried out according to the above-mentioned 12-hour exposure and measurement cycle.

After 12-hour exposure of the test piece to the air circulating through the clean room that is provided with the filter 111 of the invention, the contact angle is changed to 4° from the initial contact angle 3° that is obtained immediately after rinsing the test piece, thus the contact angle being increased by 1° in terms of the net value.

On one hand, after 12-hour exposure of the test piece to the air circulating through the clean room provided with the prior art chemical filter, the contact angle is increased by 10° from the initial contact angle. This means that the prior art chemical filter has the function capable of removing gaseous inorganic impurities, but has no function capable of removing gaseous organic impurities. What is worse, such chemical filter includes the material that would desorb gaseous organic impurities, for instance the filter media (e.g. a nonwoven fabric etc.), the adhesive (e.g. neoprene resin, urethane resin, epoxy resin, silicone resin, etc.) for fixing the activated charcoal to the filter media, and the sealing member (e.g. neoprene rubber, silicone rubber etc.) for securing the filter media to the peripheral frame thereof. Consequently, gaseous organic impurities desorbed therefrom are mixed up with the air once cleaned by passing through the chemical filter on its downstream side, which may cause such a large increase of 10° in the contact angle after 12-hour exposure. Contrary to this, the filter 111 can remove not only gaseous inorganic impurities but gaseous organic impurities. Furthermore, as briefly mentioned in connection with the method for manufacturing the filter 111, it includes no organic material desorbing gaseous organic impurities. This is the reason that the contact angle is increased only by 1° in terms of the net value.

After 12-hour exposure of the test piece to the air circulating through the clean room provided with neither the filter 111 nor the prior art chemical filter, the contact angle is changed to 7° from the initial contact angle 3°, thus the contact angle being increased by 4° in terms of the net value. Needless to say, this increase in the contact angle is caused by no removal of gaseous organic impurities due to presence of no filter.

To be brief, the filter 111 of the invention and the prior art chemical filter have not so big difference as far as the removal function of HCl gas and $NH_3$ gas is concerned. However, the filter 111 of the invention is superior to the prior art chemical filter at the point that the former can remove gaseous inorganic impurities and gaseous organic impurities at a time, and never acts as the new source of organic impurities. Especially, in case of the filter 111 of which both of the first and second adsorptive layers include silica having strong affinity for the gaseous boric compound, such filter can continue to remove the gaseous boric compound for a comparatively longer time. On one hand, the prior art chemical filter may remove gaseous inorganic impurities, but can not remove gaseous organic impurities. To make the matter worse, it disadvantageously works as the new contaminant source by itself. Furthermore, advantage of the filter 111 of the invention exists in its incombustibility. In contrast, drawback of the prior art chemical filter exists in its combustibility.

For comparatively studying performance of the particulate filter, the clean room as shown in FIG. 16 is additionally provided with two kinds of particulate filters, one excluding any material desorbing gaseous organic impurities and the other including at least one material desorbing gaseous organic impurities. Both of particulate filters are installed on the downstream side of the filter 111. Cleanliness of the filtered air circulating through the clean room is evaluated by measuring the change with the passage of time with regard to the contact angle. The test is carried out according to the above-mentioned 12-hour exposure and measurement cycle. After 12-hour exposure of the test piece to the air circulating through the clean room provided with the particulate filter excluding any material desorbing gaseous organic impurities, the contact angle is increased by only 1° from the initial contact angle 3°. The reason for this small increase in the contact angle is as follows. As described before, the filter 111 of the invention removes gaseous organic impurities causing the substrate surface contamination and also it never acts as the contaminant source by itself. In addition, the particulate filter arranged on the downstream side of the filter 111, would not desorb any of gaseous organic impurities. On one hand, after 12-hour exposure of the test piece to the air circulating through the clean room provided with the particulate filter including the material desorbing gaseous organic impurities, the contact angle is increased by 3° from the initial contact angle 3°. It is considered that the 1° among the increase of 3° might be caused by gaseous organic impurities that the filter failed to remove, but the remaining 2° is possibly caused by gaseous organic impurities originating from the particulate filter.

Figure 28:
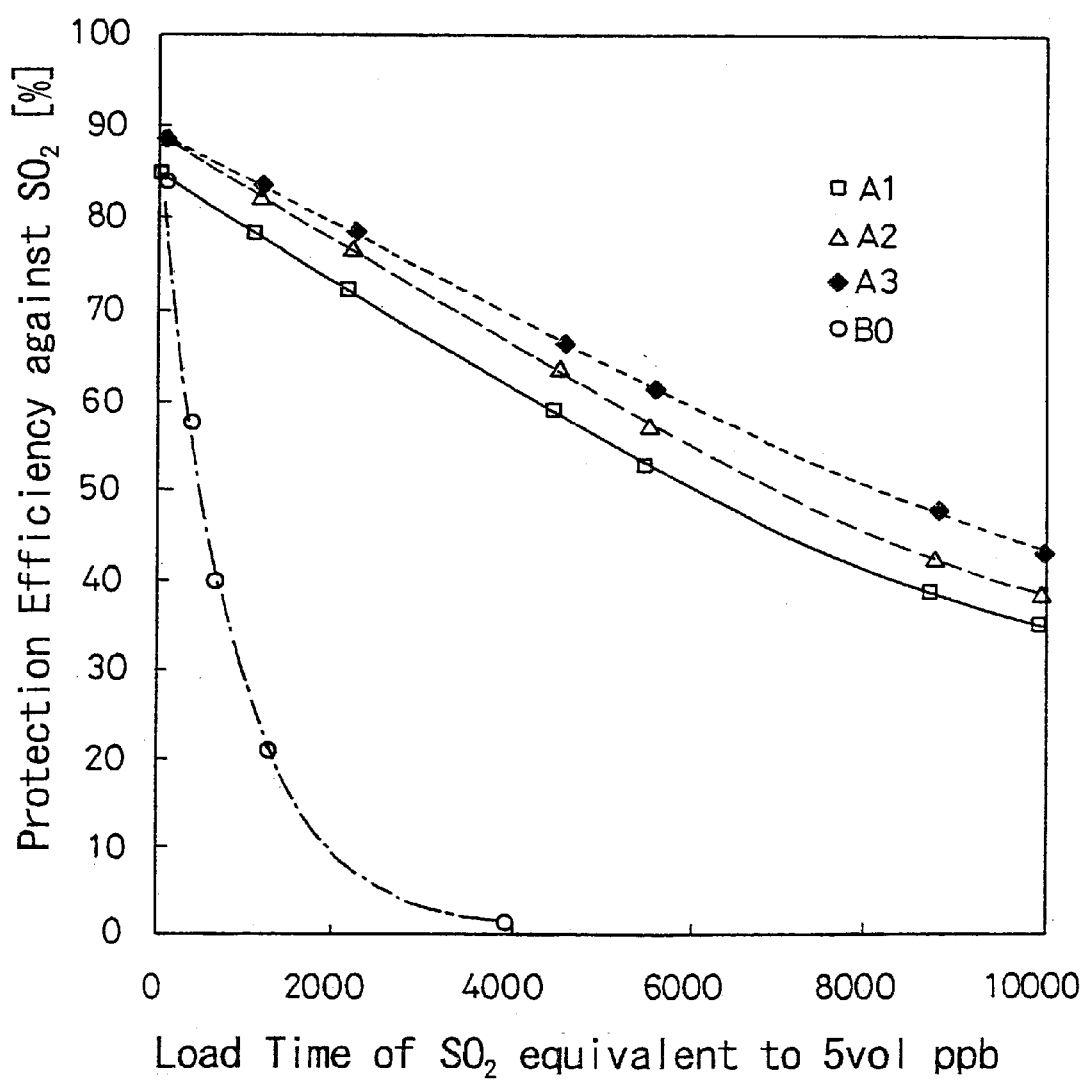
FIG. 28 is a comparative graphical illustration indicating the change with the passage of time with regard to the protection efficiency against sulfurous acid gas $SO_2$ of the filter according to the invention, when varying a mixing ratio (weight) of the powder of fraipontite mineral and the powder of manganese dioxide.

FIG. 28 is a comparative graphical illustration indicating the change with the passage of time with regard to the protection efficiency against sulfurous acid gas $SO_2$ of several filters of the invention, in which there is varied the mixing ratio (weight) of the powder of the fraipontite mineral and the powder of manganese dioxide. As shown in the figure, the change with the passage of time with regard to the protection efficiency against sulfurous acid gas $SO_2$ is measured with respect to four filters A1, A2, A3, and B0. The filter B0 is prepared and measured just for making comparison more clear-cut. The mixing ratio of the above two components in each filter is as follows. The powder of the fraipontite mineral: The powder of manganese dioxide= 5:1 (filter A1), 5:2 (filter A2), 5:4 (filter A3), and 5:0 (filter B0). In all of these four filters A1, A2, A3, and B0, the powder of the fraipontite mineral and the powder of manganese dioxide are fixed to the honeycomb structure surface of each filter, using the powder of inorganic substance as a binder. The honeycomb structure as used at that time is made to have a depth of 50 mm. Table 5 indicates the weight percent of each component (the powder of the fraipontite mineral, the powder of manganese dioxide, and the binder) held on the honeycomb structure surface to the entire weight of the honeycomb structure. The condition for filtering $SO_2$ gas is as follows. Concentration of $SO_2$ gas contained in the object clean room air: 900 vol ppb; Rate of filtration (face velocity): 1.2 m/s; Temperature: 23° C.; and Relative humidity: 45%. The concentration of $SO_2$ gas in the clean room air is typically around 5 vol ppb, so that the above-mentioned high concentration i.e. about 140 times of the ordinary one, is an intentionally selected overload just for the purpose of acceleration.

TABLE 5

Components Held on Honeycomb Structure (Wt. %)

| | $A_1$ | $A_2$ | $A_3$ | $B_0$ |
|---|---|---|---|---|
| Fraipontite mineral | 28.2 | 24.2 | 18.8 | 34.0 |
| Manganese oxide | 5.6 | 9.7 | 1.5 | 0.0 |
| Binder | 13.5 | 13.5 | 13.5 | 13.5 |

From the FIG. 28, it will be understood that removal of $SO_2$ gas can be made possible by mixing manganese dioxide having the function of oxidizing sulfurous acid gas $SO_2$, with the fraipontite mineral. In this case, however, mixing manganese dioxide with the fraipontite mineral does not cause any ill influence to the function of the fraipontite mineral i.e. the function of adsorbing acid gases such as hydrogen chloride, hydrogen sulfide, boric compound, and hydrogen fluoride.

Figure 29:
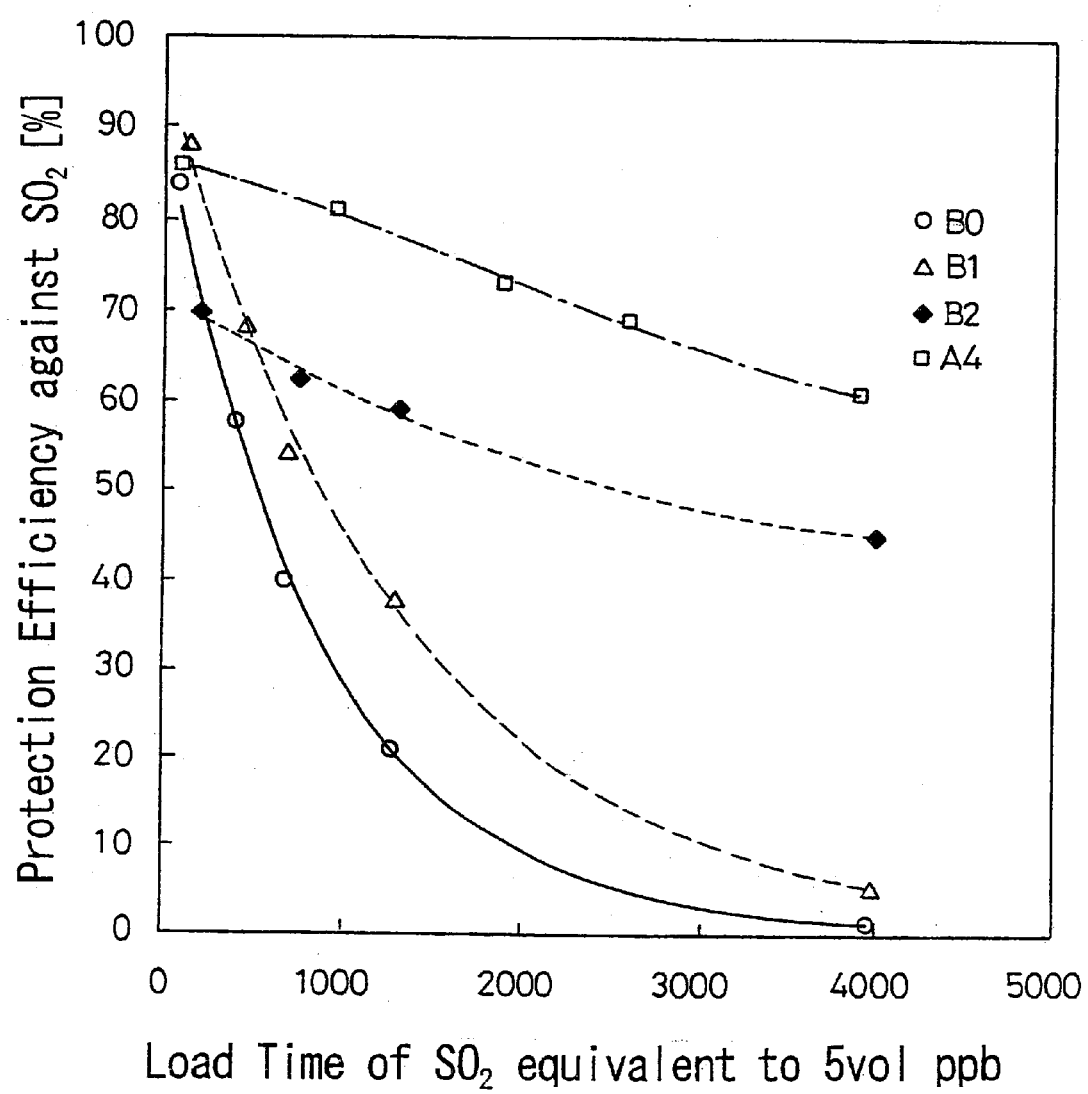
FIG. 29 is a comparative graphical illustration showing the change with the passage of time with regard to the protection efficiency against sulfurous acid gas $SO_2$ of the filter according to the invention and some other ordinary chemical filters.

FIG. 29 is a comparative graphical illustration showing the change with the passage of time with regard to the protection efficiency against sulfurous acid gas $SO_2$ of the filter according to the invention and some other ordinary chemical filters. In the figure, a filter A4 is formed according to the invention by fixing the powder of the fraipontite mineral and the powder of permanganate to the honeycomb structure surface, using the inorganic binder. A filter B0 is formed just for comparison by fixing only the powder of the fraipontite mineral to the honeycomb structure surface, using the inorganic binder. A filter B1 is an ordinary chemical filter that is formed by fixing the powder of activated charcoal impregnated with potassium carbonate to an air permeable urethane mat. A filter B2 is also an ordinary chemical filter including a honeycomb structure that is formed of activated charcoal fiber impregnated with potassium permanganate. All the filters as used in the above are made to have a depth of 50 mm. The condition for filtering $SO_x$ gas is as follows. Concentration of $SO_2$ gas contained in the object clean room air: 800 vol ppb; Rate of filtration (face velocity): 0.9 m/s; Temperature: 23° C.; and Relative humidity: 45%.

$SO_2$ gas makes a neutralization reaction with neither potassium carbonate of the chemical filter B1 nor zinc (or magnesium) of the filter B0, so that the protection efficiency against $SO_2$ gas of the filter B1 is reduced to 50% or less after only 900-hour filtration of the clean room air containing $SO_2$ gas of 5 vol ppb. In case of the filter B0, its protection efficiency against $SO_2$ gas of the filter B0 is also reduced to 50% or less after only 600-hour filtration of the same. On one hand, potassium permanganate of the chemical filter A4 of the invention and the prior art chemical filter B2 oxidizes $SO_2$ gas to transform it into sulfuric acid, so that the protection efficiency against $SO_2$ gas of the filter A4 and the same of the filter B2 are respectively reduced to 50% or less after 7000-hour and 2600-hour filtration of the clean room air containing $SO_2$ gas of 5 vol ppb. In case of filters A1, A2, and A3 described in connection with FIG. 28, their protection efficiency against $SO_2$ gas is reduced to 50% or less after 6000-hour to 8000-hour filtration of $SO_2$ gas. As will be apparent from comparison between the performance of filters A1, A2, A3, A4, B2 and that of the filter B0, $SO_2$ gas can not be sufficiently removed by the fraipontite mineral only, and existence of manganese oxide or permanganate is the indispensable requirement for removal of $SO_2$ gas.

Figure 30:
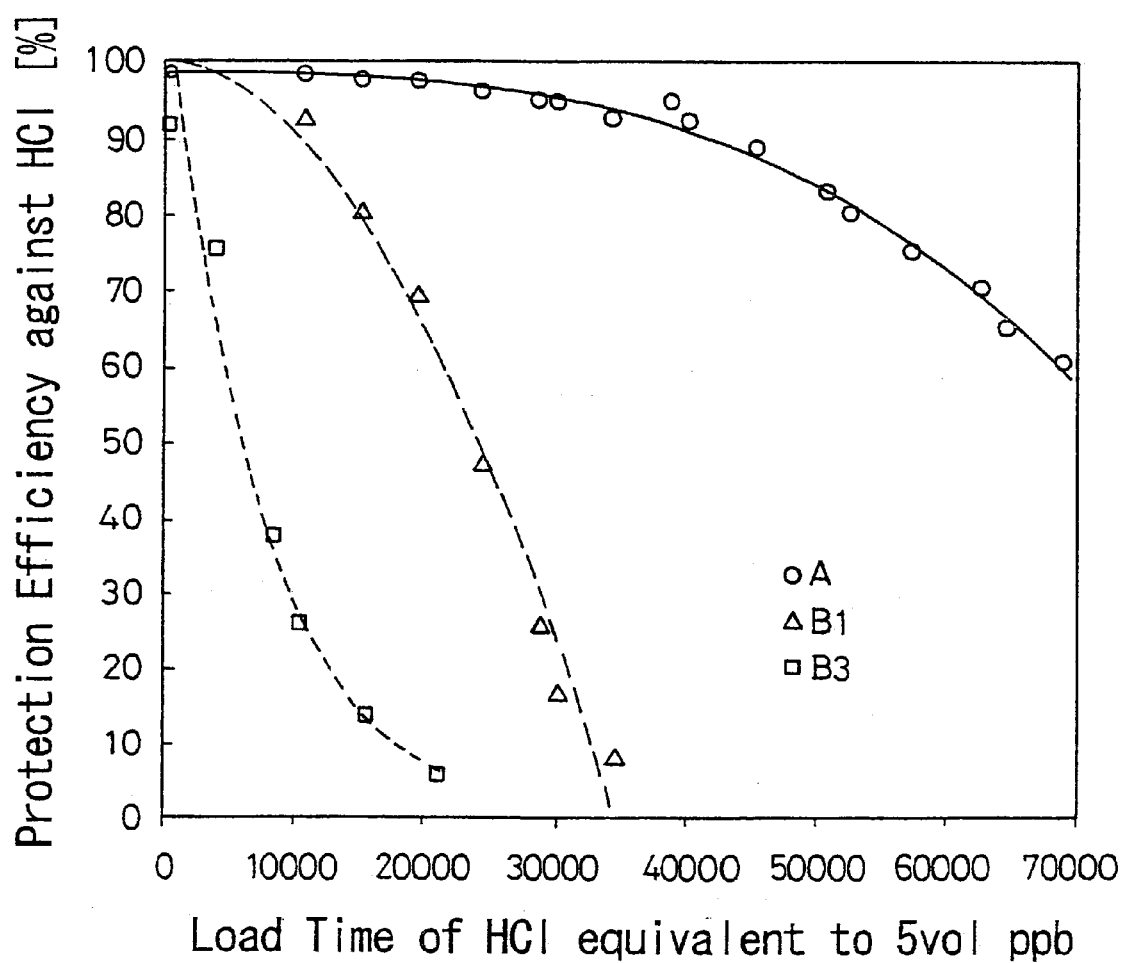
FIG. 30 is a comparative graphical illustration showing the change with the passage of time with regard to the protection efficiency against hydrogen chloride gas by the filter according to the invention and some other ordinary chemical filters.

FIG. 30 is a comparative graphical illustration showing the change with the passage of time with regard to the protection efficiency against hydrogen chloride gas by the filter according to the invention and some other ordinary chemical filters. In the figure, a filter A is formed according to the invention by fixing the powder of the fraipontite mineral and the powder of manganese oxide to the honeycomb structure surface, using the inorganic binder. A filter B1 is an ordinary chemical filter that is formed by fixing the powder of activated charcoal impregnated with potassium carbonate to an air permeable urethane mat. A filter B3 is also an ordinary chemical filter including a honeycomb structure that is formed of activated charcoal fiber impregnated with potassium carbonate. All the filters as used in the above are made to have a depth of 50 mm. The condition for filtering hydrogen chloride gas is as follows. Concentration of HCl gas contained in the object clean room air: 2 to 3 vol ppb; Rate of filtration (face velocity): 0.9 m/s; Temperature: 23° C.; and Relative humidity: 45%. From the figure, it will be understood that the filter A of the invention is superior to chemical filters B1 and B3 in respect of the protection efficiency against hydrogen chloride gas.

Figure 31:
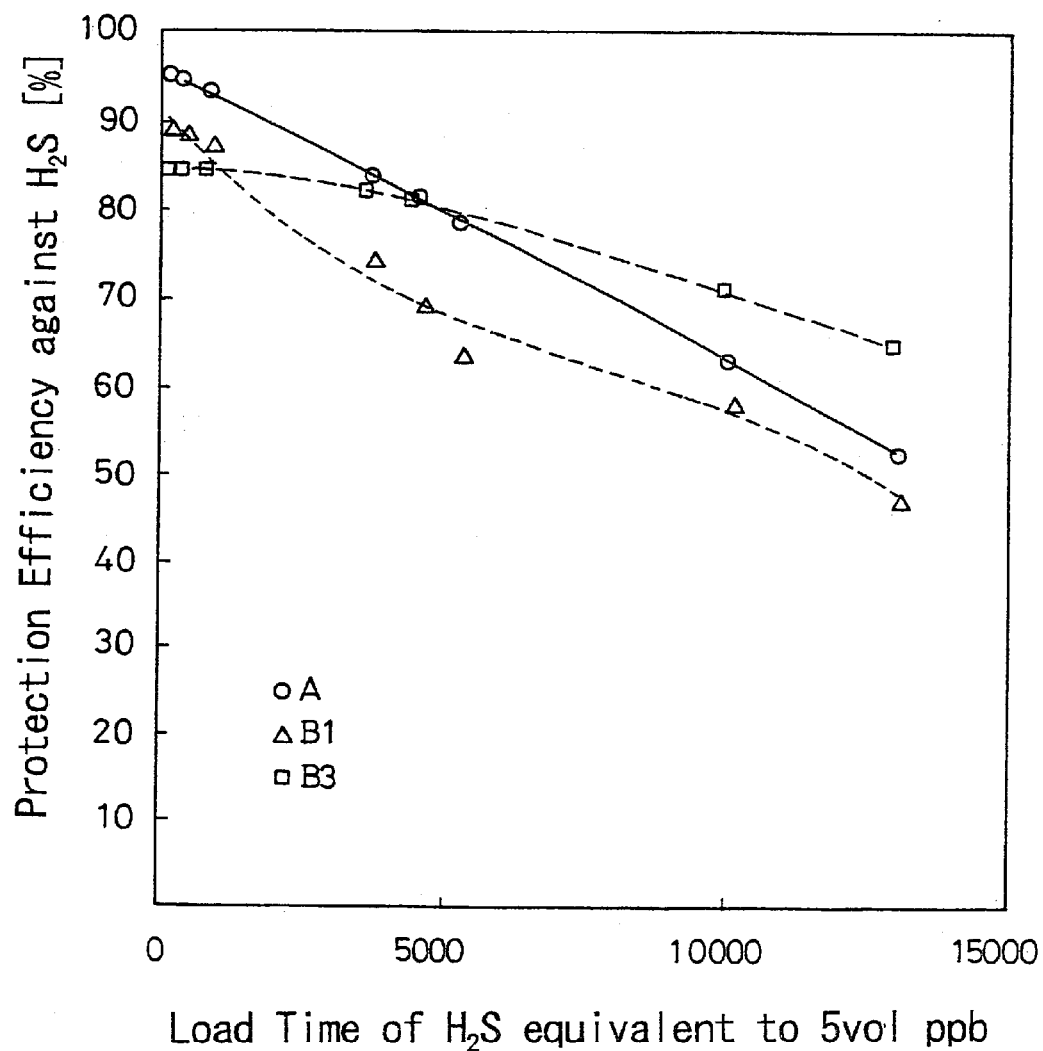
FIG. 31 is a comparative graphical illustration indicating the change with the passage of time with regard to the protection efficiency against hydrogen sulfide gas by the filter according to the invention and some other ordinary chemical filters.

FIG. 31 is a comparative graphical illustration indicating the change with the passage of time with regard to the protection efficiency against hydrogen sulfide gas by the filter according to the invention and some other ordinary chemical filters. In the figure, a filter A is formed according to the invention by fixing the powder of the fraipontite mineral and the powder of manganese oxide to the honeycomb structure surface, using the inorganic binder. A filter B1 is an ordinary chemical filter that is formed by fixing the powder of activated charcoal impregnated with potassium carbonate to an air permeable urethane mat. A filter B3 is also an ordinary chemical filter including a honeycomb structure that is formed of activated charcoal fiber impregnated with potassium carbonate. All the filters as used in the above are made to have a depth of 50 mm. The condition for filtering hydrogen sulfide gas is as follows. Concentration of hydrogen sulfide gas contained in the object clean room air: 900 vol ppb (intentional overload for acceleration); Rate of filtration (face velocity): 0.9 m/s; Temperature: 23° C.; and Relative humidity: 45%. From the figure, it will be understood that the filter A of the invention is by no means inferior to chemical filters B1 and B3 in respect of the protection efficiency against hydrogen sulfide gas.

Figure 32:
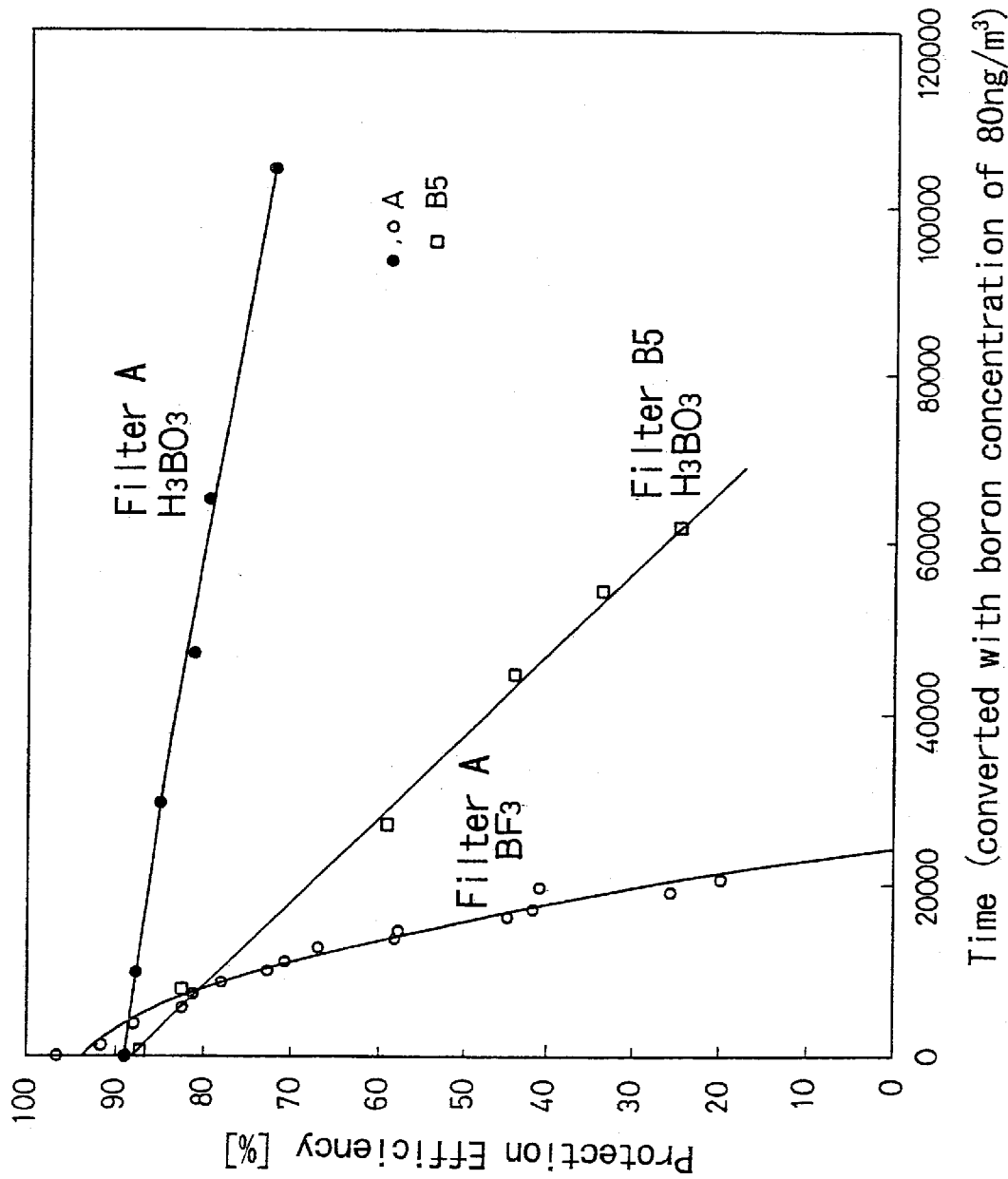
FIG. 32 is a comparative graphical illustration showing the change with the passage of time with regard to the protection efficiency against gaseous boric acid ($H_3BO_3$) and boron trifluoride gas ($BF_3$) of the filter according to the invention, and some other ordinary chemical filters.

FIG. 32 is a comparative graphical illustration showing the change with the passage of time with regard to the protection efficiency against gaseous boric acid ($H_3BO_3$) and boron trifluoride gas ($BF_3$) of the filter A according to the invention. This filter A is formed by fixing the powder of the fraipontite mineral and the powder of manganese oxide to the honeycomb structure surface, using the inorganic binder. A filter B5 is formed just for comparison by fixing only the powder of manganese oxide to the honeycomb structure surface, using the inorganic binder. The condition for filtering gaseous boric acid ($H_3BO_3$) and boron trifluoride gas ($BF_3$) is as follows. Concentration of gaseous boric acid ($H_3BO_3$) and boron trifluoride gas ($BF_3$) contained in the object air upstream the filter A: $H_3BO_3$ of 162 ppb (boron content: 80000 ng/m$^3$) and $BF_3$ of 17 ppb (boron content: 8560 ng/m$^3$), respectively; Rate of filtration (face velocity): 0.9 m/s. The honeycomb structure has a depth of 50 mm and indicates a pressure drop of 1.5 mmAq at the above face velocity. From the graphic illustration of FIG. 32, it will be understood that the protection efficiency of 80% or more of the filter A may be maintained for 6 years or more against gaseous boric acid ($H_3BO_3$), and for one year or more against boron trifluoride gas ($BF_3$) in terms of the boron content of 80 ng/m$^3$ as ordinarily contained in the clean room air. Furthermore, it will be seen from the graph of FIG. 32 that the protection efficiency against gaseous boric acid ($H_3BO_3$) of the filter B5 is considerably low in comparison with that of the filter A. Accordingly, it can be determined that existence of the powder of the fraipontite mineral pushes up the protection efficiency against gaseous boric acid ($H_3BO_3$) to a great extent.

Possible Application of Invention in Industries

The filter according to the invention and the clean room using the same, remove both of gaseous inorganic and organic impurities which cause the substrate surface contamination, thereby producing the preferable atmosphere suitable for manufacturing semiconductor devices and LCD's. Furthermore, the invention makes it possible to form the filter that may be constituted only with incombustible materials, except the case of using permanganate. Thus, the filter can answer for the safety requirement from the disaster protection standpoint.

The filter according to the invention and the clean room using the same, can remove not only both of acid and the basic inorganic impurities but also organic impurities. This contributes to reduction of the volume of adsorptive layer, the pressure drop of the filter, the cost for manufacturing the adsorptive layer, etc. Especially, if the inorganic substance such as silica, which has a larger affinity for the gaseous boric compound, is included in both of first and second inorganic layers of the filter, the increased quantity of silica has its protection efficiency against the gaseous boric compound less changed with the passage of time, so that the lifetime of the filter against the gaseous boric compound can be considerably prolonged.

Furthermore, the filter according to the invention and the clean room using the same, can remove sulfur oxides SOx which might give an unfavorable influence to the manufacture of semiconductor devices, liquid crystal substrates, magnetic record media, and so forth.

What is claimed is:

1. An air filter comprising: a supporter and an inorganic material layer that is formed by fixing powder of fraipontite mineral to the surface of the supporter, using powder of an inorganic substance as a binder.

2. An air filter comprising: a supporter, a first inorganic material layer formed of powder of fraipontite mineral and powder of an inorganic substance as a binder, and a second inorganic material layer formed of powder of an inorganic substance, wherein one of the first inorganic material layer and the second inorganic material layer is fixed to the surface of the supporter, and the other of the first inorganic material layer and the second inorganic material layer is fixed to the surface of the one inorganic material layer.

3. An air filter comprising: a supporter and a layer formed of a plurality of pellets fixed to the surface of the supporter, wherein the pellet is formed by pelletizing a mixture of powder of fraipontite mineral and powder of an inorganic substance as a binder.

4. An air filter comprising: a supporter and a layer formed of a plurality of pellets fixed to the surface of the supporter, wherein the pellet is formed by pelletizing a mixture of powder of fraipontite mineral and powder of an inorganic substance as a binder and is then coated with powder of an inorganic substance, or the pellet is formed by pelletizing powder of an inorganic substance and is then coated with powder of fraipontite mineral, using powder of an inorganic substance as a binder.

5. An air filter comprising: a casing filled with a plurality of pellets, wherein the pellet is formed by pelletizing powder of fraipontite mineral, using powder of an inorganic substance as a binder, or the pellet is formed by pelletizing powder of fraipontite mineral, using powder of an inorganic substance as a binder and is then coated with powder of an inorganic substance, or the pellet is formed by pelletizing powder of an inorganic substance and is then coated with powder of fraipontite mineral, using powder of an inorganic substance as a binder.

6. An air filter comprising: a supporter and an inorganic material layer that is formed by fixing a mixture to the surface of the supporter, using an inorganic substance as a binder, the mixture comprising powder of fraipontite mineral and one or both of powder of manganese oxide and permanganate.

7. An air filter comprising: a supporter, a first inorganic material layer formed of powder of fraipontite mineral and an inorganic substance as a binder, and a second inorganic material layer formed of one or both of powder of manganese oxide and permanganate, and powder of an inorganic substance as a binder, wherein one of the first inorganic material layer or the second inorganic material layer is fixed to the surface of the supporter, and the other inorganic material layer is fixed to the surface of the one inorganic material layer.

8. An air filter comprising: a supporter and a layer formed of a plurality of pellets fixed to the surface of the supporter, wherein the pellet is formed by pelletizing a mixture of powder of fraipontite mineral and one or both of powder of manganese oxide and permanganate, using powder of an inorganic substance as a binder.

9. An air filter comprising: a supporter and a layer formed of a plurality of pellets fixed to the surface of the supporter, wherein the pellet is formed by pelletizing powder of fraipontite mineral, using powder of an inorganic substance as a binder and is then coated with one or both of powder of manganese oxide and permanganate, using powder of an inorganic substance as a binder, or the pellet is formed by pelletizing one or both of powder of manganese oxide and permanganate, using powder of an inorganic substance as a binder and is then coated with powder of fraipontite mineral, using powder of an inorganic substance as a binder.

10. An air filter comprising: a casing filled with a plurality of pellets, wherein the pellet is formed by pelletizing a mixture of powder of fraipontite mineral and one or both of powder of manganese oxide and permanganate, using powder of an inorganic substance as a binder, or formed by pelletizing powder of fraipontite mineral, using the powder of an inorganic substance as a binder and is then coated with one or both of powder of manganese oxide and permanganate, using an inorganic substance as a binder, or the pellet is formed by pelletizing one or both of powder of manganese oxide and permanganate, using an inorganic substance as a binder and is then coated with powder of fraipontite mineral, using powder of an inorganic substance as a binder.

11. An air filter as claimed in claim 1, 2, 3, 4, 6, 7, 8, or 9, wherein said supporter is a honeycomb structure.

12. An air filter as claimed in claim 6, 7, 8, 9, or 10 wherein said manganese oxide is selected from the group consisting of tri-manganese tetraoxide ($Mn_3O_4$), di-manganese trioxide ($Mn_2O_3$), and manganese dioxide ($MnO_2$) and combinations thereof.

13. An air filter as claimed in claim 6, 7, 8, 9, or 10 wherein said permanganate is selected from the group consisting of $M^I MnO_4$ ($M^I$: alkali metal) and $M^{II} (MnO_4)_2$ ($M^{II}$: alkaline earth metal).

14. An air filter as claimed in claim 1, 2, 3, 4, 5, 6, 7, 8, 9, or 10, wherein said inorganic substance is selected from the group consisting of talc, kaolin mineral, bentonite, diatom earth, silica, alumina, mixture of silica and alumina, aluminum silicate, activated alumina, porous glass, hydrated magnesium silicate clay mineral having a crystal structure of the ribbon type, activated clay, and activated bentonite and combinations thereof.

15. An air filter as claimed in claim 1, 2, 3, 4, 5, 6, 7, 8, 9, or 10 wherein either or both of said inorganic material layer and said pellet may include an inorganic adhesion assisting agent.

16. A high efficiency air cleaning apparatus for keeping a space or room at a level of required cleanliness, comprising: an air circulation path, an air filter recited in claim 1, 2, 3, 4, 5, 6, 7, 8, 9, or 10, and a particulate filter, said air filter being installed within or adjacent to the space or room, and said particulate filter being positioned on the upstream side of said space or room and on the down stream side of said air filter, whereby said space or room is cleaned by circulating the air therein through said air circulation path.

17. A high efficiency air cleaning apparatus as claimed in claim 16, wherein said air filter and said particulate filter are installed on the ceiling portion of said space or room.

18. A method for manufacturing an air filter comprising the steps of:
immersing a supporter in a suspension in which powder of fraipontite mineral and powder of an inorganic substance as a binder are dispersed as the suspensoid, and
drying the supporter impregnated with the suspensoid, thereby forming an inorganic material layer fixed to the surface of the supporter.

19. A method for manufacturing an air filter comprising the steps of:
immersing a supporter in a suspension in which powder of fraipontite mineral and powder of an inorganic substance as a binder are dispersed as the suspensoid,
drying the supporter impregnated with the suspensoid, thereby forming a first inorganic material layer fixed to the surface of the supporter,
immersing the supporter with the first inorganic material layer in a suspension in which powder of an inorganic substance is dispersed as the suspensoid,
drying the supporter impregnated with the suspensoid, thereby forming a second inorganic material layer fixed to the surface of the first inorganic material layer; or forming said second inorganic material layer so as to be fixed to the surface of the supporter, and forming said first inorganic material layer so as to be fixed to the surface of said second inorganic material layer.

20. A method for manufacturing an air filter comprising the steps of:

immersing a supporter in a suspension in which powder of fraipontite mineral, one or both of powder of manganese oxide and permanganate, and powder of an inorganic substance as a binder are dispersed as the suspensoid, and drying the supporter impregnated with the suspensoid, thereby forming an inorganic material layer fixed to the surface of the supporter.

21. A method for manufacturing an air filter comprising the steps of:

immersing a supporter in a suspension in which powder of fraipontite mineral and powder of an inorganic substance as a binder are dispersed as the suspensoid, drying the supporter impregnated with the suspensoid, thereby forming a first inorganic material layer fixed to the surface of the supporter, immersing the supporter with the first inorganic material layer in a suspension in which one or both of powder of manganese oxide and permanganate, and powder of an inorganic substance as a binder are dispersed as the suspensoid, drying the supporter impregnated with the suspensoid, thereby forming a second inorganic material layer fixed to the surface of the first inorganic material layer; or forming said second inorganic material layer so as to be fixed to the surface of the supporter, and forming said first inorganic material layer so as to be fixed to the surface of said second inorganic material layer.

* * * * *